United States Patent
Matsuda et al.

(10) Patent No.: US 6,246,594 B1
(45) Date of Patent: Jun. 12, 2001

(54) SWITCHING POWER SUPPLY HAVING LOW LOSS CHARACTERISTICS

(75) Inventors: Yoshiaki Matsuda; Taisuke Endo, both of Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/618,729

(22) Filed: Jul. 18, 2000

(30) Foreign Application Priority Data

Jul. 23, 1999 (JP) .................................................. 11-209334
Jul. 23, 1999 (JP) .................................................. 11-209530

(51) Int. Cl.$^7$ .................................................. H02M 3/335
(52) U.S. Cl. .................................................. 363/17; 363/98
(58) Field of Search ................................. 363/17, 97, 98, 363/131, 132

(56) References Cited

U.S. PATENT DOCUMENTS 5,757,633 * 5/1998 Bowles .................................... 363/98
5,859,519 * 1/1999 Archer ................................ 363/17 X

OTHER PUBLICATIONS

Xiaoming Yuan et al. / "Control Simplification and Stress Reduction in a Modified PWM Zero Voltage Switching Pole Inverter" / IEEE Applied Power Electronics Conference and Exposition (1999) /pp. 1019–1025, (No Month).

* cited by examiner

*Primary Examiner*—Jessica Han
(74) *Attorney, Agent, or Firm*—Armstrong, Westerman, Hattori, McLeland & Naughton, LLP

(57) ABSTRACT

A switching power supply having low loss includes two sub switching elements connected in series, which are then connected in parallel with a bridge circuit. A resonance coil and a sub primary winding are connected between a connection point of the series connection circuits and an output terminal of the bridge circuit. Resonance capacitors are respectively connected in parallel with each main switching element constituting the bridge circuit so as to resonate with the resonance coil. Voltages across the two ends of A phase and B phase sub secondary windings magnetically coupled to the sub primary winding are clamped to the supply voltage. A fixed voltage in proportion to the turns ratio is generated in the sub primary winding. A voltage applied to the resonance coil becomes small, and current fluctuation becomes small. Also, two sub switching elements connected in series are then connected in parallel with a main bridge circuit; and a resonance coil and auxiliary primary winding are connected between a connection point C of the series connection circuits and an output terminal B of the main bridge circuit. Resonance capacitors are respectively connected in parallel with each main switching element constituting the main bridge circuit. The auxiliary primary winding is magnetically coupled to a main primary winding H-bridge connected to the main bridge circuit, the main bridge circuit being controlled during resonance of the resonance coil, and the resonance being terminated using a voltage induced in the auxiliary primary winding.

50 Claims, 42 Drawing Sheets

SWITCHING POWER SUPPLY HAVING LOW LOSS CHARACTERISTICS

BACKGROUND OF THE INVENTION

1. Field of the Invention

The present invention relates to the field of switching power supplies, and particularly to a switching power supply using the resonance phenomenon of a capacitor and a coil.

2. Description of the Related Art

Since power supplies having high efficiency compared to switching power supplies of the related art can be obtained, synchronous rectifier type power supplies have recently been receiving attention.

Reference numeral 501 in FIG. 36 represents a synchronous rectifier type power supply of the related art. This power supply comprises a primary side bridge circuit 510, a secondary side rectification and smoothing circuit 520, a main transformer 530, and a control circuit 540.

The primary side bridge circuit 510 has four bridge transistors 511a, 511b, 512a and 512b (in this case, they are all n-channel MOSFETs).

The operation of the primary side bridge circuit 510 is divided into an A phase and a B phase, with bridge transistors that conduct during A phase operation being represented by reference numerals 511a and 512a, and bridge transistors that conduct during the B phase operation being represented by reference numerals 511b and 512b.

A primary winding 531 and a secondary winding 532 (532a, 532b) magnetically coupled to the primary winding 531 are provided inside the main transformer 530.

Both ends of the primary winding 531 are connected to the output section of the primary side bridge circuit 510, and the primary winding 531 and the four bridge transistors 511a, 511b, 512a and 512b are H-bridge connected.

Reference numeral 519 is a D.C. voltage source exemplified by a D.C. voltage obtained by rectifying and smoothing a commercial voltage, or a D.C. voltage output from a storage battery. The high voltage side of the D.C. voltage source 519 is connected to supply voltage line 517, while a low voltage side is connected to a ground line 518.

The primary side bridge circuit. 510 is connected to the supply voltage line 517 and the ground line 518. When the A phase bridge transistors 511a and 512a are turned on with the B phase bridge transistors 511b and 512b turned off, A phase current $I_A$ is supplied from the D.C. voltage source 519 to the primary winding 531.

On the other hand, when the B phase bridge transistors 511b and 512b are turned on with the A phase bridge transistors 511a and 512a turned off, B phase current $I_B$ is supplied to the primary winding 531. The A phase current $I_A$ and the B phase current $I_B$ are opposite in direction to each other.

The secondary winding 532 has a terminal at its electrical center and an A phase secondary winding 532a and a B phase secondary winding 532b use the terminal as their common terminal (center tap).

The secondary side rectification and smoothing circuit 520 comprises a choke coil 525, an output capacitor 526 and two rectification transistors 523a and 523b.

The center tap of the A phase secondary winding 532a and the B phase secondary winding 532b is connected to a ground terminal 528, and the other terminals are connected to source terminals of respective rectification transistors 523a and 523b.

The drain terminals of both of the rectification transistors 523a and 523b are commonly connected to one terminal of the choke coil 525.

Reference numeral 527 represents the other end of the choke coil 525, and is connected to an output terminal. The output capacitor 526 is connected across the output terminal 527 and the ground terminal 528. Reference numeral 529 represents a load, which is also connected across output terminal 527 and the ground terminal.

The voltage on the output terminal 527 is isolated by a photocoupler 549 and input to the control circuit 540.

The control circuit 540 comprises a reference voltage source 541, a differential amplifier 542, an oscillator 543, a comparator 544, and a drive circuit 545. The differential amplifier 542 amplifies a difference between the voltage input from the photocoupler 549 and the output voltage of the reference voltage source 541, and supplies its output to the comparator 544.

The comparator 544 compares the voltage input from the differential amplifier 542 with the output waveform of the oscillator 543, and outputs the comparison result to the drive circuit 545.

The drive circuit 545 controls the time that the bridge transistors 511a, 512a, 511b and 512b are on so that a difference between the output voltage of the photocoupler 549 detected by the differential amplifier 542 and the output voltage of the reference voltage source 541 becomes small, based on the comparison result of the comparator 544.

Accordingly, even when the output voltage of the output terminal 527 fluctuates due, for example, to load variations, the primary side bridge circuit 510 is controlled by operation of the control circuit 540 so as to absorb these fluctuations, and the output voltage of the output terminal 527 is kept at a constant voltage.

Operation of the power supply 501 will now be described.

FIG. 37 shows the situation when the power supply 501 is operating, with the A phase and B phase bridge transistors 511a, 512a, 511b and 512b tuned off and current flowing in the secondary side due to energy stored in the choke coil 525.

Respective parasitic transistors 524a and 524b are formed inside the rectification transistors 523a and 523b. The parasitic diodes 524a and 524b are forward biased by electromotive force generated in the choke coil 525, and respective currents $I_{551}$ and $I_{552}$ flow.

FIG. 41 is a timing chart showing the operation of the power supply 501, and the above described state is represented as a waveform before time $t_1$ in the timing chart.

From this state, a positive voltage is applied to the gate terminals of the A phase bridge transistors 511a and 512a, and when they are turned on, the two ends of the primary winding 531 are connected the supply voltage line 517 and the ground line 518. As a result, current represented by $I_{553}$ in FIG. 38 flows.

The A phase secondary winding 532a is connected at a polarity to apply a positive voltage to a source terminal of the A phase rectification transistor 523a when the A phase bridge transistors 511a and 512a are on. In this state, a voltage of a polarity to apply a negative voltage to the source terminal of the B phase rectification transistor 523b is induced in the B phase secondary winding 532b.

The drive circuit 545 applies a positive voltage to the gate terminal of the A phase rectification transistor 523a and the gate electrodes of the A phase bridge transistors 511a and 512a.

In an n-channel MOSFET, when a voltage higher than the threshold voltage is applied to the gate terminal while the voltage on the source terminal is higher than the voltage on the drain terminal, current flows from the source terminal to the drain terminal in a direction that is the opposite of that for normal operation.

This operation is known as the third quadrant operation (in a p-channel MOSFET the condition where a voltage that is lower than the voltage on the drain terminal is applied to the source terminal and a voltage lower than the voltage on the drain terminal is applied to the gate terminal is called the third quadrant operation).

The solid line in FIG. 42 is a graph showing the characteristic of an n-channel MOSFET, with the horizontal axis representing drain terminal voltage $V_{DS}$ with reference to the source terminal, and the vertical axis representing drain current $I_D$ when a flow direction from the drain terminal to the source terminal is a positive direction.

The range in the first quadrant of this graph is normal MOSFET operation, and the solid line characteristic in the range of the third quadrant is the third quadrant operation. While the drain voltage $V_{DS}$ is small, a resistive characteristic is displayed, but as the drain voltage becomes large, when it becomes higher than a conducting voltage of the parasitic diode 524a, a diode characteristic is displayed.

The graph shown by the dotted line in the third quadrant of FIG. 42 is a parasitic diode characteristic when the MOSFET is not in a conducting state, and it will be understood that power loss becomes small during the third quadrant operation, compared to when current is flowing in the parasitic diode.

The A phase rectification transistor 523a has the internal parasitic diode 524a conducting and the source terminal voltage is higher than the drain terminal voltage.

In this state, since a positive voltage is applied to the gate terminal, the A phase rectification transistor 523a enters third quadrant operation and the current $I_{554}$ in FIG. 38 flows in the direction from the source terminal to the drain terminal.

Accordingly, loss arising in the A phase rectification transistor 523a at this time is small.

Current $I_{554}$ flowing in the A phase rectification transistor 523a is supplied through the choke coil 525 to the load 529 and the output capacitor 526, which means that magnetic energy is stored in the choke coil 525.

From this state, at time $t_2$, when the A phase bridge transistors 511a and 512a and the A phase rectification transistor 523a are turned off, electromotive force is generated in the choke coil 525, and respective currents $I_{555}$ and $I_{556}$ flow in the two parasitic diodes 524a and 524b due to the energy stored in the choke coil 525, as shown in FIG. 38.

Next, at time $t_3$, when the B phase bridge transistors 511b and 512b are turned on, current represented by $I_{557}$ is supplied from the D.C. voltage source 519 to the primary winding 531, as shown in FIG. 40. At this time, a positive voltage is applied to the gate terminal of the B phase rectification transistor 523b, which means that the B phase rectification transistor 523b is in the third quadrant operation, current $I_{558}$ flows in the choke coil 525 and energy is stored.

At time $t_4$, when all of the bridge transistors 511a, 512a, 511b and 512b, and the rectification transistors 523a and 523b are turned off, the initially described state is returned to. After that, the above described operations are repeated.

As has been described above, transistors are used in the secondary side rectification circuit, the gate terminals are controlled to achieve reduced loss compared to the case where current flows due to third quadrant operation and diode elements are used in the rectification circuit.

However, when the transistors 511a, 512a, 511b, 512b, 523a and 523b are turned on, there is a recovery effect in the parasitic diodes 524a and 524b that causes a large current to flow momentarily, giving rise to the waveforms shown by reference numerals 561a, 562a, 561b and 562b in the timing chart of FIG. 41. When this current flows, there is a voltage applied across the source and drain, which causes loss.

In recent years, there has been increased demand to make power supplies highly efficient, and it has become impossible to ignore the problem of loss.

SUMMARY OF THE INVENTION

The present invention has been produced in order to solve the above described drawbacks of the related art, and the object of the present invention is to provide a switching power supply having low loss.

In order to achieve the above described object, the present invention provides a power supply, comprising a main bridge circuit, having four main switching elements bridge connected, connected so as to supply current from a D.C. voltage source, a main primary winding located inside a main transformer and H-bridge connected to the main bridge circuit, A phase and B phase main secondary windings located inside the main transformer and magnetically coupled to the main primary winding, a main rectification and smoothing circuit for rectifying and smoothing a voltage induced in the A phase and B phase main secondary windings and supplying power to a load, a resonance capacitor connected in parallel with each of the main switching elements, a rectifier element inversely connected in parallel with the main switching elements, an A phase sub switching element and a B phase sub switching element connected in series with each other, with the series circuit connected in parallel with the main bridge circuit, a resonance coil between one end of the main primary winding and a connection point between the A phase sub switching element and the B phase sub switching element, a sub primary winding connected in series with the resonance coil and inserted between the connection point and the one end of the main primary winding, and a sub secondary winding magnetically coupled to the sub primary winding, and constructed so as to have a voltage induced by current flowing in the sub primary winding.

With the power supply of the present invention, the sub secondary winding is constructed so that current can be applied to the D.C. voltage source by the voltage induced in the secondary winding.

The power supply of the present invention can also have the sub secondary winding supplying power to a load using an induced voltage.

With the power supply of the present invention, a power consumption circuit can be connected to the sub secondary winding, current flows in the power consumption circuit due to an induced voltage, and power is consumed.

With the power supply of the present invention, a capacitance component of the main switching element can be used as the resonance capacitor.

With the power supply of the present invention, a leakage inductance component of the sub primary winding can used as the resonance coil.

The power supply of the present invention can further comprise an A phase secondary winding and a B phase secondary winding constituting the sub secondary winding and A phase and B phase sub rectifier elements for rectifying a voltage induced in the A phase and B phase sub secondary windings, wherein when the A phase sub rectifier elements or the B phase sub rectifier elements are conducting, approximately the output voltage of the D.C. voltage source is applied to both ends of the A phase sub secondary winding or the B phase sub secondary winding.

With the present invention, it is possible to use a MOSFET as each main switching element. In this case, parasitic diodes inside each of the MOSFETS can be used as the inversely parallel connected rectifier elements.

With the present invention, an IGBT can be used as each main switching element. In this case, a diode element can be inversely parallel connected to each IGBT.

With the present invention, the main rectification and smoothing circuit can be provided with A phase and B phase main rectifier elements for rectifying a voltage induced in the A phase and B phase main secondary windings. In this case, a choke coil for smoothing a voltage output by the A phase and B phase main rectifier elements and supplying the voltage to a load can be provided in the main rectification and smoothing circuit.

The present invention is constructed as described above, and has a main bridge circuit with four main switching elements and a main primary winding located inside a main transformer being H-bridge connected. The H bridge circuit is connected to a D.C. voltage source, so that an A phase current supplied from the voltage source to the main primary winding when two A phase main switching elements are turned on, and a B phase current supplied when the two B phase switching elements are turned on, of the 4 main switching elements, flow in opposite directions in the main primary winding.

A phase and B phase main secondary windings magnetically coupled to the main primary winding are provided in the main transformer, and a rectification and smoothing circuit is connected to the main secondary windings.

A voltage induced in the main secondary winding when A phase current is supplied to the main primary winding and a voltage induced when B phase current is supplied are smoothed by the rectification and smoothing circuit and supplied to a load.

With this power supply, a circuit having A phase and B phase sub switching elements connected in series is connected in parallel with the main bridge circuit, and a connection point of sub switching elements is connected to an output terminal of the main bridge circuit (one end of the main primary winding) via a resonance coil.

A resonance capacitor is connected in parallel with each main switching element, and the resonance capacitor and the resonance coil can resonate. Accordingly, the main switching elements can be turned off and turned on without a voltage being applied across both ends of the switching elements.

Also, when a sub primary winding is connected in series with the resonance coil, and when a connection point between the main primary winding and the sub switching elements connected via the resonance coil and the sub primary winding, a voltage applied to the resonance coil is reduced to the extent of the voltage arising across both ends of the sub primary winding. A sub secondary winding magnetically coupled to the sub primary winding is provided, and when a voltage at both ends of a sub secondary winding is clamped, a voltage that is a the voltage of the sub secondary winding multiplied by the turns ratio appears, and so the voltage applied to the resonance coil is smaller by the extent of that voltage.

Accordingly, variations in current flowing in the resonance coil are made smoother, and loss when the main switching elements are on is reduced.

Also, resonance current flowing due to electromotive force of the resonance coil flows in the sub primary winding, and energy is transferred from the sub primary winding to the sub secondary winding. The resonance current can be reduced by having the energy transferred to the sub secondary winding consumed in a resistor and a Zener diode, and supplying to the D.C. voltage source and the load etc. It is more efficient to supply the energy to the D.C. voltage source and the load than to have it consumed in a resistor and Zener diode.

Bipolar transistors, MOSFETs, and IGBTs etc. can be used in the main switching elements. When MOSFETs are used, it is possible to utilize a built-in parasitic diode as a rectifier element. When bipolar transistors or IGBTs are used in the main switching elements, rectifier elements (diode elements) are preferably inversely parallel connected to each of the main switching elements.

Also, an external resonance capacitor can be connected in parallel with each main switching element, but it is possible to use an internal capacitance component of each main switching element without having an external resonance coil. When the operating frequency is high, the capacitance value of the resonance capacitor is only small, which means that it is possible to use the internal capacitance component.

Leakage inductance of the sub primary winding can also be used as the resonance coil.

As a power supply differing from the above described power supply, a power supply of a further aspect of the present invention comprises a main bridge circuit, having four main switching elements bridge connected, connected so as to supply current from a D.C. voltage source; a main primary winding located inside a main transformer and H-bridge connected to an output point of the main bridge circuit; A phase and B phase main secondary windings located inside the main transformer and magnetically coupled to the main primary winding; a main rectification and smoothing circuit for rectifying and smoothing a voltage induced in the A phase and B phase main secondary windings; a resonance capacitor connected in parallel with each of the main switching elements; a rectifier element inversely connected in parallel with each of the main switching elements; a sub bridge circuit made up of a series connected circuit comprised of a sub switching element and an auxiliary rectifier element with these series circuits further connected in series with each other at a connecting point; and an auxiliary primary winding and a resonance coil connected in series with each other, wherein the sub bridge circuit is connected in parallel with the main bridge circuit, the circuit comprising the serially connected auxiliary primary winding and resonance coil is connected between the connecting point of the sub bridge circuit and the output point of the main bridge circuit, and the auxiliary primary winding is magnetically coupled to the main primary winding and the main secondary winding.

In this power supply, it is possible to arrange the auxiliary primary winding inside the main transformer.

In this power supply it is also possible to use a capacitance component of the main switching elements as the resonance capacitor.

It is also possible to use a leakage inductance of the auxiliary primary winding as the resonance coils in this power supply.

In this power supply it is possible to use MOSFETs in each main switching element. In this case, it is possible to use a parasitic diode inside each MOSFET as the inversely parallel connected rectifier element.

On the other hand, it is possible to use IGBTs in each main switching element in this power supply.

Further, in this power supply it is also possible to provide A phase and B phase main rectifier elements, for rectifying a voltage induced in the A phase and B phase main secondary windings, and a choke coil in which current rectified by the A phase and B phase main rectifier elements flows, in the main rectification and smoothing circuit.

In the above described power supply of the present invention, current is supplied from the D.C. voltage source, and current flowing in the main primary winding is in opposite directions when the two A phase main switching elements, of the four main switching elements, are turned on, and when the two B phase main switching elements are turned on.

It is also possible to cause current to flow in the auxiliary primary winding and the resonance coil by controlling the sub switching elements and the main switching elements.

When current flows in the resonance coil and the resonance coil and the resonance capacitor resonate, resonance current flows in the auxiliary primary winding and the auxiliary rectifier elements. The auxiliary primary winding is magnetically coupled to the main primary winding and the main secondary winding, which means that if current flowing in the main primary winding is controlled, a voltage is induced in the auxiliary primary winding and the auxiliary rectifier elements are reverse biased, it is possible to cause the resonance operation to be terminated.

It is possible to use bipolar transistors, MOSFETs or IGBTs in the main switching elements. When MOSFETs are used, it is possible to use a built-in parasitic diode as a rectifier element. When bipolar transistors or IGBTs are used in the main switching elements, the rectifier elements (diode elements) are preferably inverse parallel connected to each main switching element.

It is also possible to connect an external resonance capacitor in parallel with each main switching element. An internal capacitance component of the main switching elements can also be used instead of an external resonance capacitor. When the operating frequency is high, the capacitance value of the resonance capacitor only needs to be small, and so it is possible to use the internal capacitance component.

Still further, the resonance coil can also use leakage inductance of the sub primary coil.

DESCRIPTION OF THE DRAWINGS

FIG. 6 is a fifth drawing for describing current flow in the power supply of the first embodiment for the duration between $t_4$ and $t_5$ during which a ground line side switching element is turned on.

DESCRIPTION OF PREFFERED EMBODIMENTS

Figure 1:
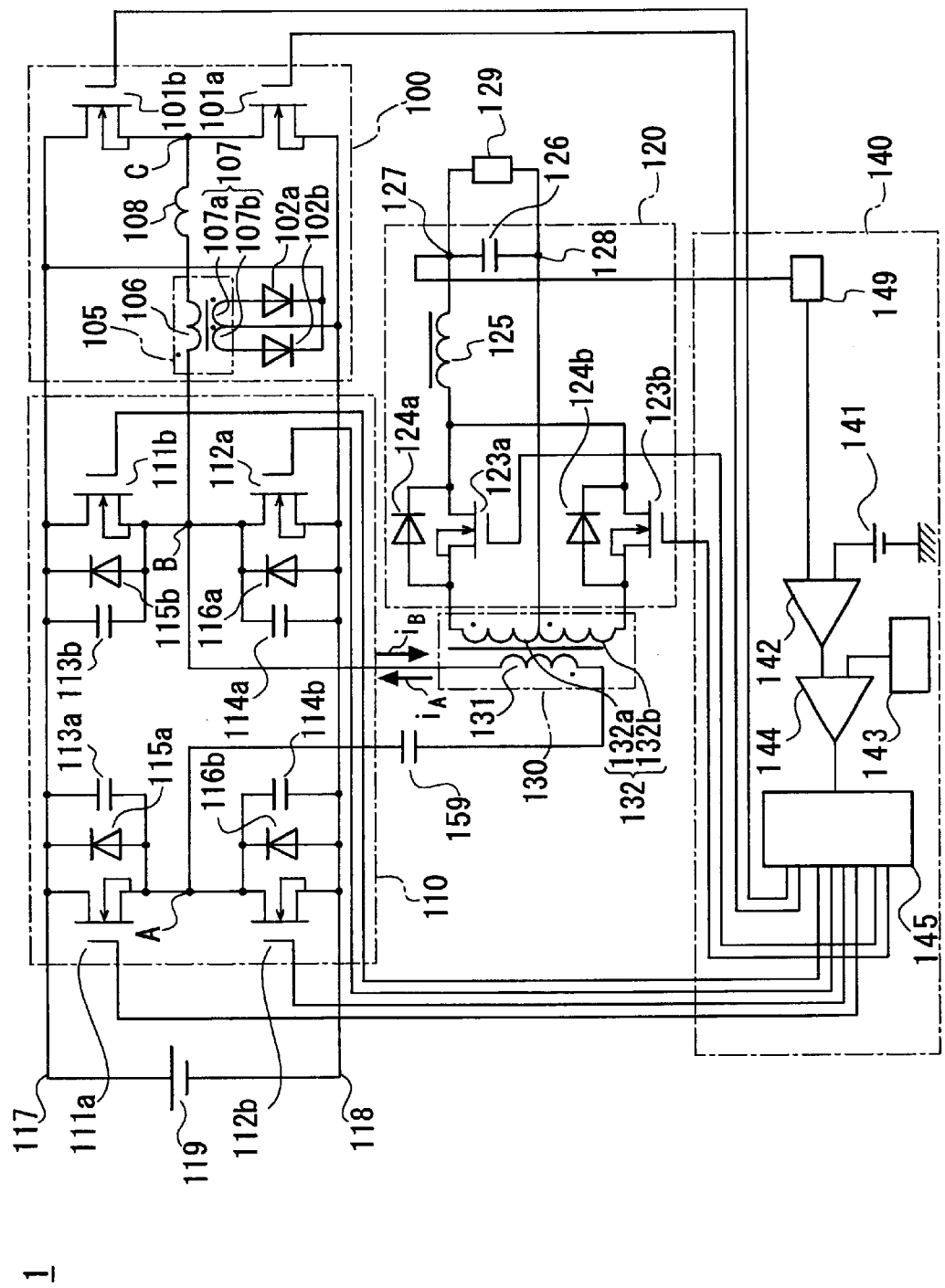
FIG. 1 is a circuit block diagram showing a first embodiment of the present invention.

Reference numeral 1 in FIG. 1 represents a power supply of a first embodiment of the present invention. This power supply 1 has a main bridge circuit 110, a secondary side rectification and smoothing circuit 120, a main transformer 130, a control circuit 140 and an optimization circuit 100.

First of all, the structure of the primary side circuit will be described. Reference numeral 119 is a D.C. voltage source which rectifies and smoothes commercial voltage or is supplied from a storage battery. A line connected to the high voltage side of this D.C. voltage source 119 is represented by a voltage line 117, and a line connected to a low voltage side is represented by a ground line 118.

The main bridge circuit 110 has four main switching elements 111a, 112a, 111b and 112b, constituted by n-channel MOSFETs.

The four main switching elements 111a, 112a, 111b and 112b are bridge connected (of the four main switching elements 111a, 112a, 111b and 112b, the two main switching elements 111a and 112b, and the other two main switching elements 111b, 112a are respectively connected in series, and the two ends of each of the series circuits are connected to the voltage line 117 and the ground line 118).

A main primary winding 131 is provided inside the main transformer 130.

Letters A and B represent mutually serially connected sections of the main switching elements 111a, 112a, 111b and 112b, and these sections constitute output terminals of the main bridge circuit 110. The two ends of the main primary winding 131 are respectively connected to the output terminals A and B, and the H bridge circuit is made up of the main bridge circuit 110 (the four main switching elements 111a, 112a, 111b and 112b) and the main primary winding 131.

A capacitor 159 for preventing offset excitation is inserted between the main primary winding 131 and one output terminal of the main bridge circuit 110, and a D.C. component flowing in the main primary winding 131 is isolated. Even if both ends of the capacitor 159 are short circuited, there is no effect on the operation of the power supply of the present invention, which will be described later, and so description of voltage variation relating to the capacitor 159 will be omitted.

Among the four main switching elements 111a, 112a, 111b and 112b, a group that supplies a current represented in the drawing by symbol $i_A$ from the D.C. voltage source 119 to the main primary winding 131 when they are turned on are A phase main switching elements 111a and 112a, while the group that supplies a current represented in the drawing by symbol $i_B$ from the D.C. voltage source 119 to the main primary winding 131 when they are turned on are B phase main switching elements 111b and 112b.

A phase current $I_A$ and B phase current $I_B$ flows in the direction from drain to source inside each of the main switching elements 111a, 112a, 111b and 112b.

Of the two output terminals A and B of the main bridge circuit 110, when the A phase main switching elements 111a and 112a are turned on, the first output terminal A becomes the high voltage side terminal, while when the B phase main switching elements 111b and 112b are turned on, the second output terminal B becomes the high voltage side terminal.

Also, respective resonance capacitors 113a, 113b, 114a and 114b are connected in parallel with each of the main switching elements 111a, 111b, 112a and 112b, so as to cause resonance with a resonance coil 108 inside a optimization circuit 100 that will be described later.

Reference numerals 115a, 116a, 115b and 116b represent parasitic diodes inside the main switching elements 111a, 112a, 111b and 112b. Each parasitic diode 115a, 116a, 115b and 116b is a rectifier element, and is inversely parallel connected with respect to the main switching elements 111a, 112a, 111b and 112b.

Next, the circuit structure of the secondary side will be described, with a secondary side rectification and smoothing circuit 120 having a choke coil 125, an output capacitor 126, and main rectifier elements 123a and 123b comprised of n-channel MOSFETs.

A main secondary winding 132 magnetically coupled to the main primary winding 131 is provided in the main transformer 130. The main secondary winding 132 has a terminal at its electrical center and an A phase main secondary winding 132a and a B phase main secondary winding 132b use the terminal as their common terminal (center tap).

Common ends of the A phase main secondary winding 132a and the B phase main secondary winding 132b (the center tap portion) are connected to a ground terminal 128, and the other ends are respectively connected to a source terminal of an A phase main rectifier element 123a and a source terminal of a B phase main rectifier element 123b.

A drain terminal of the A phase main rectifier element 123a and a drain terminal of the B phase main rectifier element 123b are commonly connected to one end of the choke coil 125. Reference numerals 124a and 124b represent parasitic diodes inside the main rectifier elements 123a and 123b.

Reference numeral 127 is an output terminal, and the other end of the choke coil 125 is connected to this output terminal 127. The output capacitor 126 is connected between the output terminal 127 and the ground terminal 128, and a voltage rectified by the main rectifier elements 123a and 123b is smoothed by the choke coil 125 and the output capacitor 126 and then supplied from the output terminal 127 to a load 129.

The voltage on the output terminal 127 is input to the control circuit 140 while being isolated by a photocoupler 149, etc.

The control circuit 140 comprises a reference voltage source 141, a differential amplifier 142, an oscillator 143, a comparator 144 and a drive circuit 145. The differential amplifier 142 amplifies a difference between an voltage input from a photocoupler 149 and the output voltage of the reference voltage source 141, and supplies its output to the comparator 144.

The comparator 144 compares the voltage input from the differential amplifier 142 and the output waveform from the oscillator 143, and outputs the comparison result to the drive circuit 145.

The drive circuit 145 controls the on time of the main switching elements 111a, 112a, 111b and 112b based on the comparison result from the comparator 144 so that a difference between an output voltage of the photocoupler 149 detected by the differential amplifier 142 and the output voltage of the reference voltage source 141 becomes smaller.

Accordingly, similarly to the power supply 501 described in the related art, this power supply 1 also keeps an output voltage on the output terminal 127 constant when the output voltage on the output terminal 127 fluctuates, by absorbing the fluctuating component by operation of the control circuit 140.

With this power supply 1, the optimization circuit 100 is connected to a connection point B (the output terminal of the main bridge circuit 110) between the main bridge circuit 110 and the main primary winding 131.

The optimization circuit 100 comprises a sub transformer 105, a resonance coil 108, A phase and B phase sub switching elements 101a and 101b comprised of n-channel MOSFETs, and A phase and B phase sub rectifier elements 102a and 102b comprised of diode elements.

The drain terminal of the A phase sub switching element 101a is connected to the supply voltage line 117, and the source terminal of the B phase sub switching element 101b is connected to the ground line 118.

The source terminal of the A phase sub switching element 101a and the drain terminal of the B phase sub switching element 101b are connected together at a connection point C. Gate terminals of the A phase and B phase sub switching elements 101a and 101b are connected to the drive circuit 145, and as will be described later, are controlled by the control circuit 140 together with the main bridge circuit 110 and the secondary side rectification and smoothing circuit 120.

A sub primary winding 106 is provided in the sub transformer 105, and one end of the sub primary winding 106 is connected to the output terminal of the main bridge circuit 110. Here, the B phase main switching element 115b having the drain terminal connected to the supply voltage line and the A phase main switching element 112a having the source terminal connected to the ground line 118 are both connected to a second output terminal B.

The other terminal of the sub primary winding 106 is connected to connection point C via the resonance coil 108.

A sub secondary winding 107 magnetically coupled to the sub primary winding 106 is provided in the sub transformer 105. The sub secondary winding 107 is formed with a terminal at its electrical center and an A phase sub secondary winding 107a and a B phase sub secondary winding 107b use the terminal as their common terminal (center tap).

A terminal at the A phase and B phase center tap portion is connected to the ground line 118, and the other terminals are respectively connected to an anode terminal of an A phase sub rectifier element 102a and an anode terminal of a B phase sub rectifier element 102b.

Cathode terminals of the A phase and B phase sub rectifier elements 102a and 102b are connected to the supply voltage line 117. Accordingly, when current flows in the sub primary winding 106 and a voltage is induced in the sub secondary winding 107, one of either the A phase sub rectifier element 102a or B phase sub rectifier element 102b is forward biased. In this way, current flowing in the sub secondary winding 107 is applied to the D.C. voltage source 119.

Operation of this power supply 1 will now be described. FIG. 8 is a timing chart for describing the operation of the power supply 1, and FIG. 2 to FIG. 7 are circuit diagrams for explaining currents flowing in the circuit of the power supply 1 and their directions. In FIG. 2 to FIG. 7, dotted lines representing circuit blocks of FIG. 1, and the associated reference numerals, are omitted.

In the timing chart of FIG. 8, $Vg_{111a}$, $Vg_{112a}$, $Vg_{111b}$ and $Vg_{112b}$, represent gate voltages of A phase and B phase main switching elements 111a, 112a, 111b and 112b.

$Vg_{101a}$ and $Vg_{101b}$ represent gate voltages of A phase and B phase sub switching elements 101a and 101b, and $Vg_{123a}$ and $Vg_{123b}$ represent gate voltages of A phase and B phase main rectifier elements 123a and 123b.

$Id_{101a}$ represents current flowing in the A phase sub switching element 101a. The current flowing in the B phase sub switching element 101b is omitted.

$Ic_{113a}$ and $Ic_{114a}$ represent currents flowing in resonance capacitors 113a and 114a connected in parallel with A phase main switching elements 111a and 112a. The charging direction is shown as positive and the discharge direction is shown as negative.

$Id_{111a}$ and $Id_{112a}$ represent drain currents of the A phase main switching elements 111a and 112a, and $Vds_{111a}$ and $Vds_{112a}$ represent voltages across the source and drain. Drain current and drain source voltages of the B phase main switching elements 111b and 112b are omitted.

$It_{131}$ represents current flowing in the main primary winding 131. When the A phase main switching elements 111a and 112a are on, the supply direction of current from the D.C. voltage source 119 to the main primary winding 131 is shown as positive, while the supply direction when the B phase main switching elements 111b and 112b are on is shown as negative.

$Vds_{123a}$ and $Vds_{123b}$ represent voltages across the drain and source of the A phase and B phase main rectifier elements 123a and 123b, whose direction is shown as positive when the voltage of the source terminal is higher than the voltage on the drain terminal.

$It_{132a}$ and $It_{132b}$ represent currents flowing in the A phase and B phase main secondary windings 132a and 132b.

Figure 2:
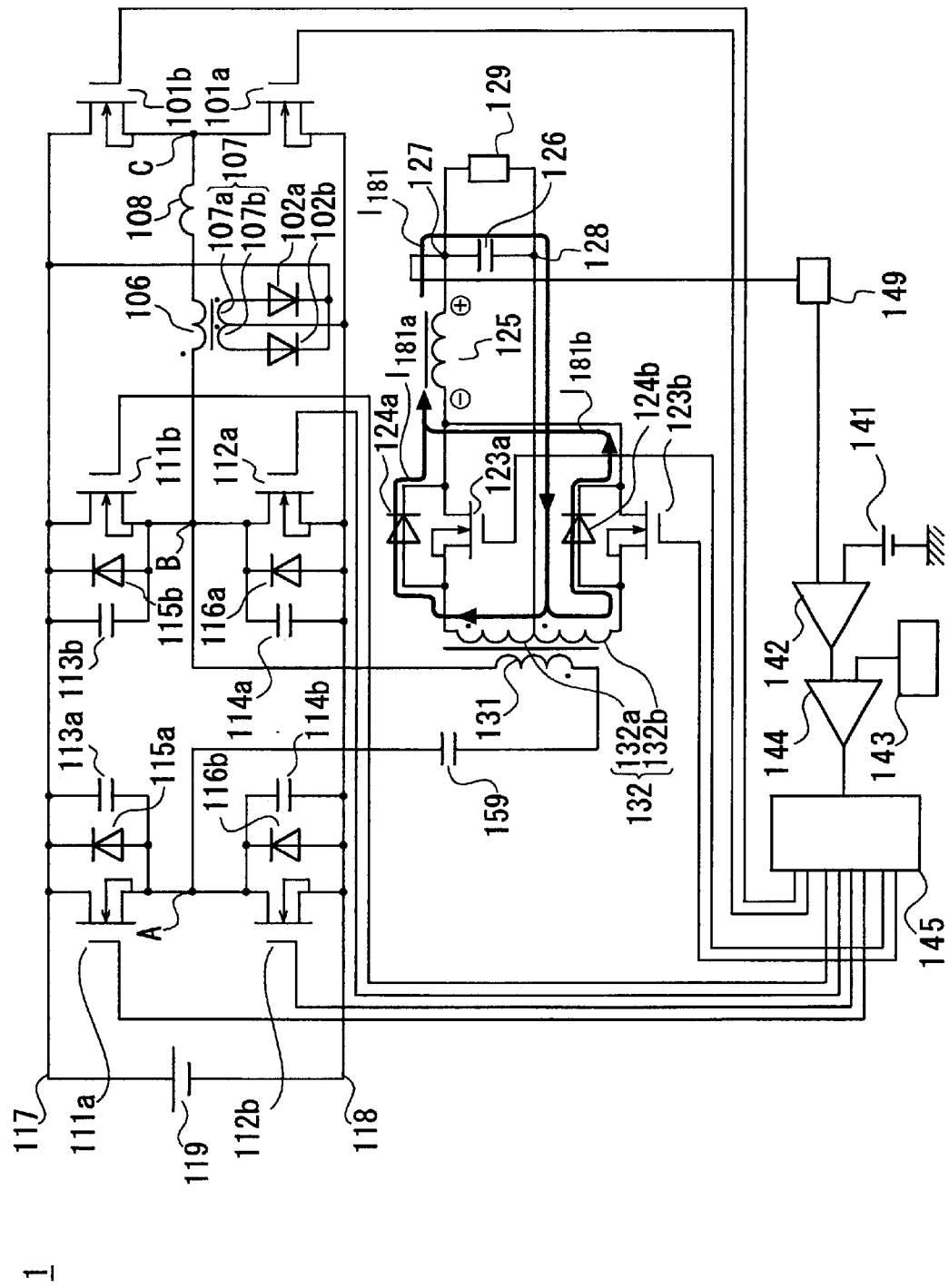
FIG. 2 is a first drawing for describing current flow in the power supply of the first embodiment, during time $t_0$–$t_1$.

FIG. 2 shows current flowing in the power supply 1 during time $t_0$ to time $t_1$ in the timing chart of FIG. 8. During time $t_0$ to time $t_1$, with the A phase and B phase main switching elements 111a, 112a, 111b and 112b, and the A phase and B phase sub switching elements in the off state, an electromotive force is generated in the choke coil 125 due to the energy stored in the secondary side choke coil 125 before time $t_0$, and current $I_{181}$ is flowing in the secondary side rectification and smoothing circuit 120.

From time $t_0$ to time $t_1$, the secondary side main rectifier elements 123a and 123b are off, which means current $I_{181}$ supplied from the choke coil 125 branches to the two parasitic diodes 124a and 124b, so that currents $I_{181a}$ and $I_{181b}$ respectively flow in the A phase and B phase main secondary windings 132a and 132b.

From this state, at time $t_1$, the main switching element for A phase supply voltage line side 111a, the A phase main rectifier element 123a and the A phase sub switching element 101a are turned on.

At the secondary side, since a voltage higher than the voltage on the drain terminal is applied to the source terminal of the A phase main rectifier element 123a, that A phase main rectifier element 123a operates in the third quadrant mode, and becomes low impedance. As a result, as shown in FIG. 3, current $I_{181}$ supplied by the choke coil 125 no longer flows in the parasitic diode 124b of the B phase main rectifier element 123b, and only flows in the A phase side (A phase main rectifier element 123a and A phase main secondary winding 132a).

Energy is returned to the primary side from the secondary side by current $I_{181}$ flowing in the A phase main secondary winding 132a, and a voltage is induced in the main primary winding 131. This voltage has the polarity of a positive voltage to be applied to the second output terminal B and forward biases the parasitic diode 115b of the high voltage side B phase main switching element 111b.

Figure 3:
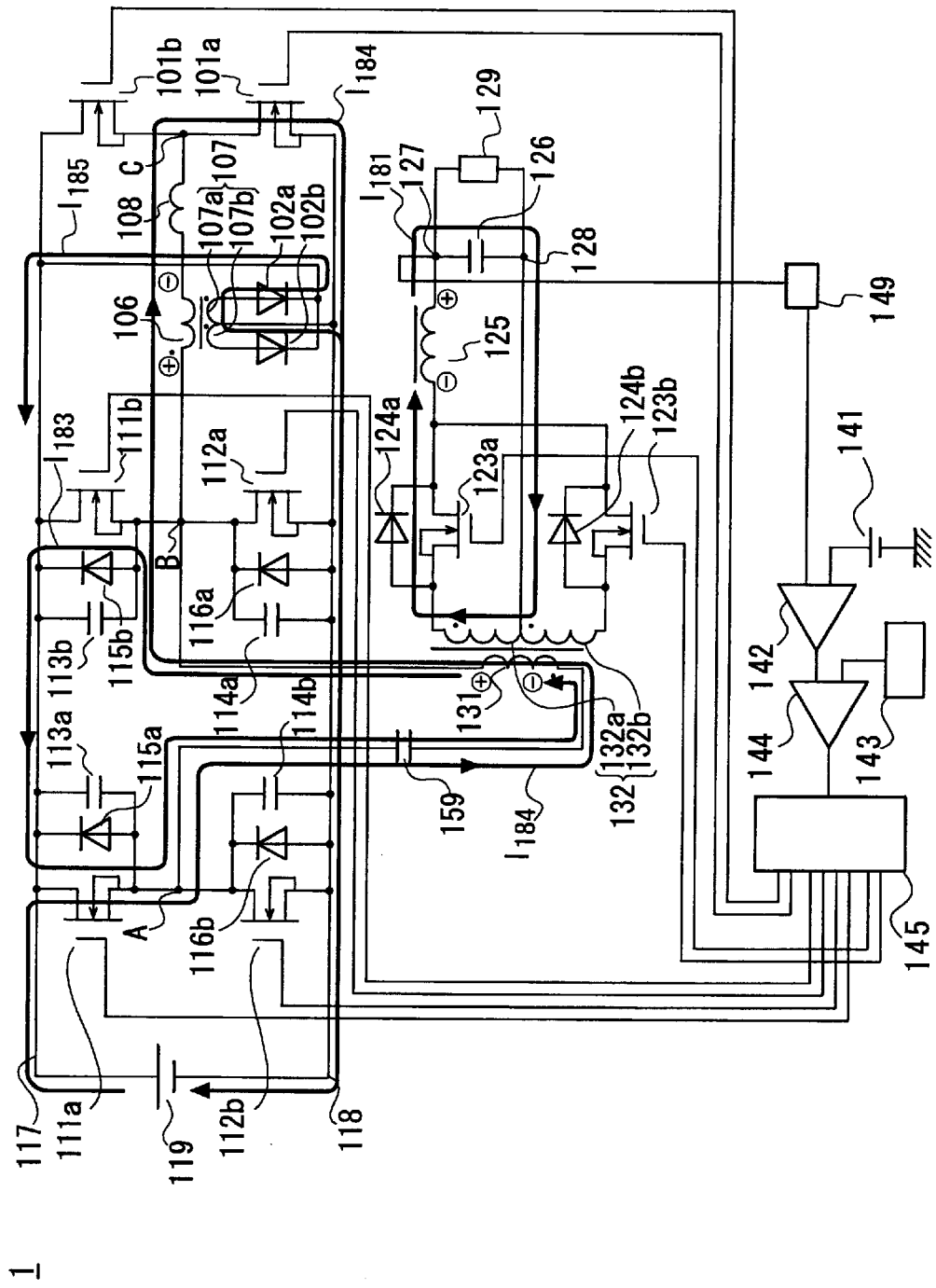
FIG. 3 is a second drawing for describing current flow in the power supply of the first embodiment, during time $t_1$–$t_2$.

As a result of this, current represented by $I_{183}$ in FIG. 3 flows in a closed loop made up of the main primary winding 131, the parasitic diode 115b, and the high voltage side A phase main switching element 111a because of the energy that has been returned to the main primary winding 131.

Also, a current $I_{184}$ is supplied from the D.C. voltage source 119 towards the main primary winding 131, passing sequentially through the supply voltage line 117, the high voltage side A phase main switching element 111a, the main primary winding 131, the sub primary winding 106 inside the sub transformer 105, the resonance coil 108, the A phase sub switching element 101a and the ground line 118.

Accordingly, current $I_{T1}$ flowing in the main primary winding 131 during time $t_1$ to time $t_2$ becomes $I_{T1}=I_{183}+I_{184}$.

When the number of turns of the main primary winding 131 is $n_1$ and the number of turns of the A phase main secondary winding 132a is $n_{2a}$, then $I_{T1} \times n_1 = I_{181} \times n_{2a}$.

Current is supplied from the choke coil 125 to the A phase main secondary winding 132a, and the choke coil 125 can be considered to approximate to a fixed current source, which means that current $I_{T1}$ flowing in the main primary winding 131 also has a fixed value.

Also, at time $t_1$, an electromotive force is generated in the sub primary winding 106 because current begins to flow in the sub primary winding 106 inside the sub transformer 105, as a result of which a voltage is induced in the sub secondary winding 107. The voltage induced in the sub secondary winding 107 is of a polarity to forward bias the A phase sub rectifier element 102a, energy is transmitted from the sub primary winding 106 to the A phase side sub secondary winding 107a, and current $I_{185}$ flows due to the electromotive force generated in the A phase side sub secondary winding 107a. This current $I_{185}$ is a regeneration current for charging the D.C. voltage source 119.

The number of turns of the A phase sub secondary winding 107a and the B phase sub secondary winding 107b are the same, and the ratio of the number of turns of the A phase sub secondary windings 107a or B phase sub secondary winding 107b to the number of turns of the sub primary winding 106 is m:1.

Because of the flow of the regeneration current $I_{185}$, the output voltage Vin of the D.C. voltage source 119 is applied to the A phase side sub secondary winding 107a, which means that the size of the counter-electromotive force generated in the sub primary winding 106 becomes clamped at a value of 1/m of the output voltage (Vin/m).

When the voltage arises in the main switching element 111a, main primary winding 131 and sub switching element 101a in the current path of current $I_{184}$ supplied from the D.C. voltage source 119 is ignored, voltage $V_{108}$ applied to the resonance coil 108 becomes $V_{108}=$Vin$-$Vin/m.

Since Vin and m are fixed values, voltage $V_{108}$ applied to the resonance coil 108 is a fixed value, and current $I_{184}$ supplied from the D.C. voltage source 119 and applied to the A phase main switching element 111a and the resonance coil 108 gradually increases.

Also, since it is possible to change the A phase main switching element 111a from the off state to the on state with the voltage across the drain and source of the A phase main switching element 111a at zero volts, loss becomes small.

Since the voltage applied to the resonance coil 108 is smaller than the output voltage Vin of the D.C. voltage source 119 by the extent of Vin/m, the increase in current $I_{184}$ is also slight.

The current $I_{T1}$ flowing in the main primary winding 131 is fixed, while the current $I_{183}$ returned from the secondary side to the primary side gradually reduces compared to the gradual increase in the current flowing in the resonance coil 108.

When the time when this current $I_{183}$ becomes zero is shown as $t_2$, then at time $t_2$ only current $I_{184}$ supplied from the D.C. voltage source 119 flows in the main primary winding 131. That is, at time $t_2$, $I_{181} \times n_{2a} = n_1 \times I_{184}$.

At this time, a resonance capacitor 114a connected in parallel with the A phase ground side main switching element 112a is charged with the same voltage as that of the D.C. voltage source 119. Current flowing in the main primary winding 131 at time $t_2$ becomes a fixed current. Then the current flowing in the resonance coil 108 is increased by the discharge current of the resonance capacitor 114a and the charge current of the resonance capacitor 113b.

Figure 4:
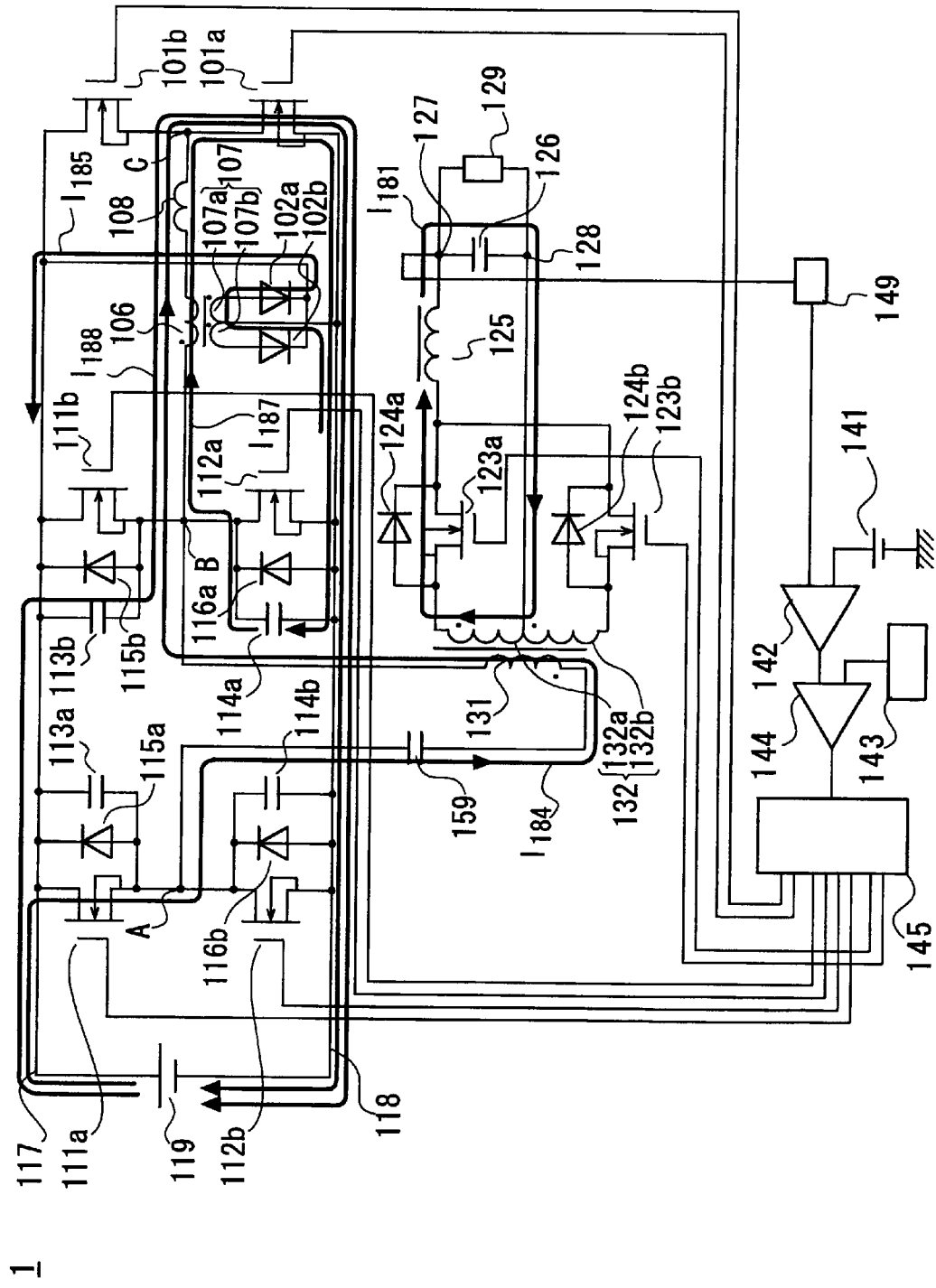
FIG. 4 is a third drawing for describing current flow in the power supply of the first embodiment for the duration between $t_2$ and $t_3$ during which the resonance capacitor 114a is discharged.

$I_{187}$ in FIG. 4 represent currents flowing due to this resonant operation, and the voltage at the high voltage side terminal (the second output terminal B of the main bridge circuit 110) of the resonance capacitor 114a is gradually lowered by discharge of the resonance capacitor 114a.

When the voltage of the second output terminal B is lowered, the resonance capacitor 113b connected across the second output terminal B and the supply voltage line 117 is charged up (this resonance capacitor 113b is a capacitor connected in parallel with the high voltage side B phase main switching element 111b.).

$I_{188}$ in FIG. 4 represents charging current to the resonance capacitor 113b, and flows from the high voltage side of the D.C. voltage source 119, through the resonance capacitor 113b, sub primary winding 106, resonance coil 108 and A phase sub switching element 101a to the ground line 118.

When discharge of the resonance capacitor 114a is terminated by the resonance action of the resonance coil 108 and the resonance capacitor 114a, the energy accumulated in the resonance capacitor 114a is transferred to the resonance coil 108. As a result, an electromotive force in a direction to reversely charge the resonance capacitor 114a is generated in the resonance coil 108.

Figure 5:
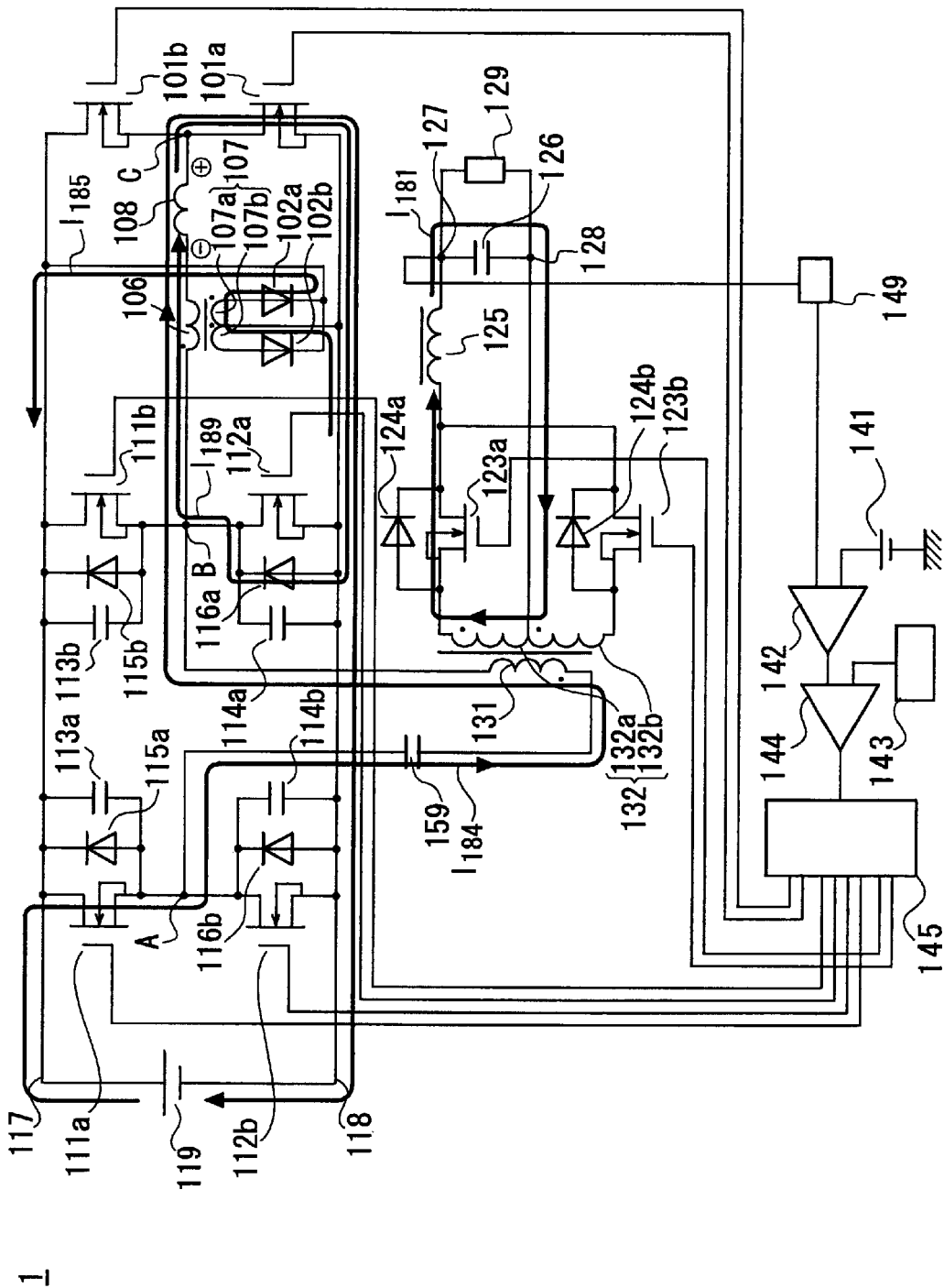
FIG. 5 is a fourth drawing for describing current flow in the power supply of the first embodiment for the duration between $t_3$ and $t_4$ during which current flow in the round line side parasitic diode.

This electromotive force is of a polarity to forward bias the internal parasitic diode 116a of the main switching element 112a connected in parallel with the resonance capacitor 114a, which means that the current shown by $I_{189}$ in FIG. 5 flows in the parasitic diode 116a due to the energy being stored in the resonance coil 108.

At this time, current $I_{184}$ and current $I_{189}$ flow in the sub primary winding 106 and the resonance coil 108, a voltage is induced in the sub secondary winding 107 by this current, and current $I_{185}$ is applied to the D.C. voltage source 119. By causing current $I_{185}$ to be applied to the D.C. voltage source 119 the energy of the resonance coil 108 is returned to the 119, and as a result, current $I_{189}$ flowing because of the electromotive force of the resonance coil 108 is gradually decreased. When energy of the resonance coil 108 is not applied in the D.C. voltage source 119 because of the sub primary winding 106 and the sub secondary winding 107 (or, as will be described later, energy of the resonance coil 108 is transferred to the secondary side or not consumed), current $I_{189}$ caused by the electromotive force of the resonance coil 108 is not reduced.

In the timing chart of FIG. 8, the time at which discharge of the resonance capacitor 114a is terminated and current $I_{189}$ starts to flow in the parasitic diode 116a is represented by $t_3$.

While current $I_{189}$ is flowing in the parasitic diode 116a after time $t_3$, the control circuit 140 turns on the A phase ground side main switching element 112a. At this time, voltage is not applied across the source and drain of the main switching element 112a, so no loss occurs.

Figure 6:
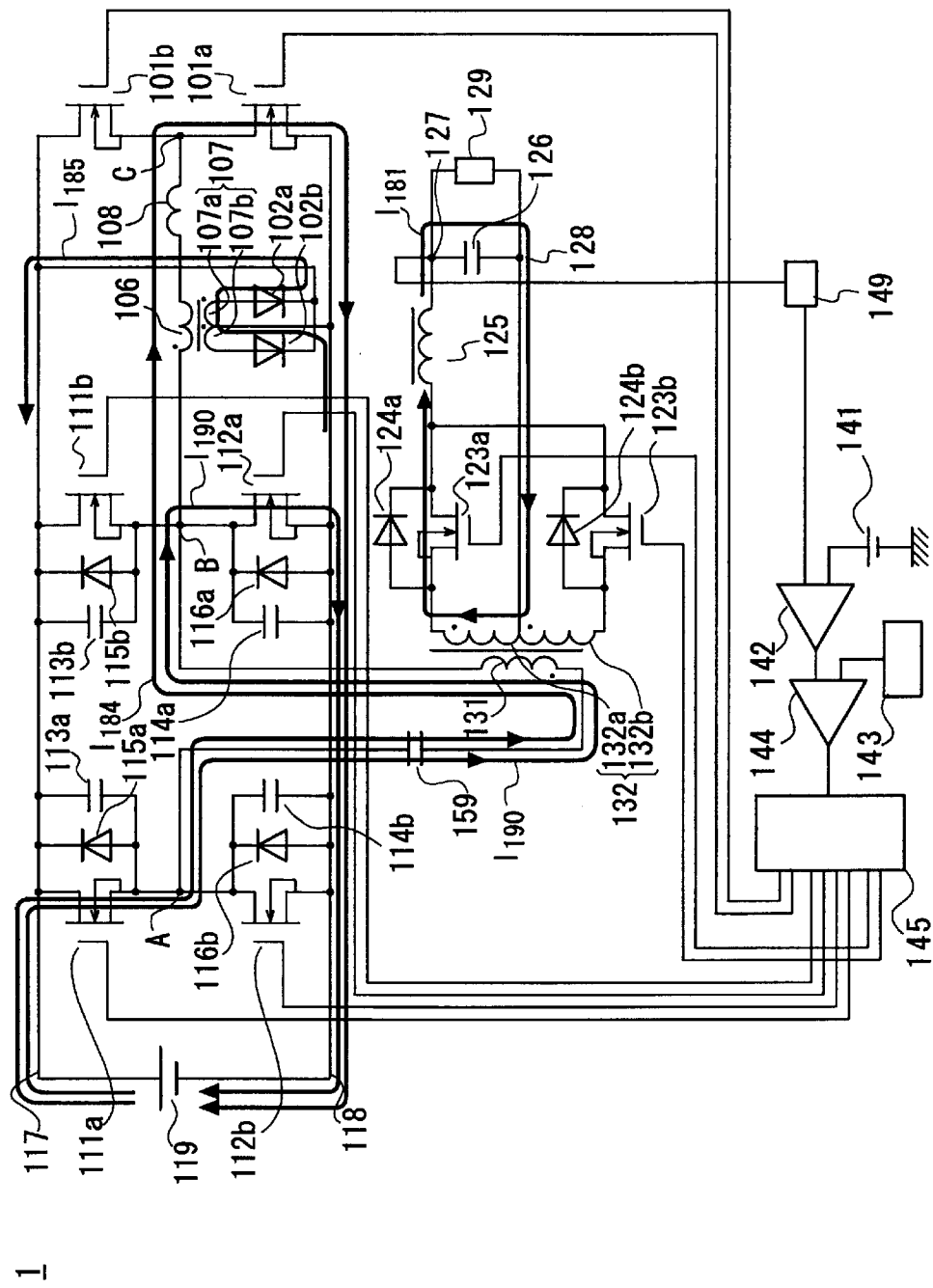

Accordingly, when the A phase ground side main switching element 112a is turned on with no voltage applied across the source and drain, current represented by $I_{190}$ in FIG. 6 flows in the main switching element 112a.

At this time, since a constant current flows in the main primary winding 131, the current $I_{190}$ flowing in the main switching element 112a gradually increases, while on the other hand current $I_{184}$ flowing in the sub switching element 101a gradually decreases.

After time $t_3$, even when current starts to flow in the sub switching element 101a discharge of the resonance coil 108 will continue.

At time $t_5$ when discharge is terminated, if current $I_{190}$ flowing in the A phase ground side main switching element 112a is e0expressed as $I_{190} \times n_1 = I_{181} \times n_{2a}$ ($I_{T1}=I_{190}$), then current $I_{184}$ flowing in the sub switching element 101a at this time becomes zero. At this time $t_5$ the sub switching element 101a is turned off by the control circuit 140.

Figure 7:
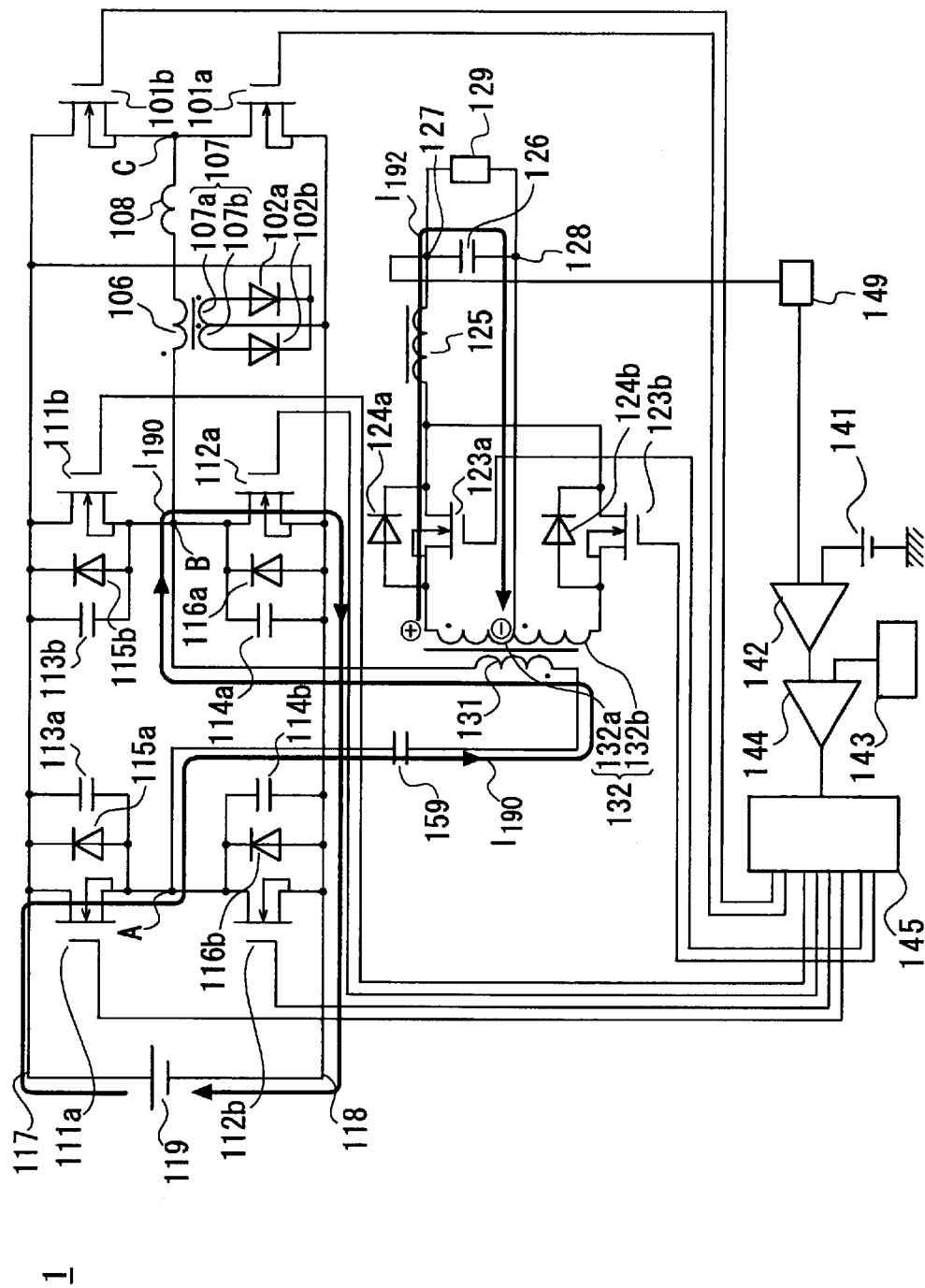
FIG. 7 is a sixth drawing for describing current flow in the power supply of the first embodiment, during time $t_5$–$t_6$.
Figure 8:
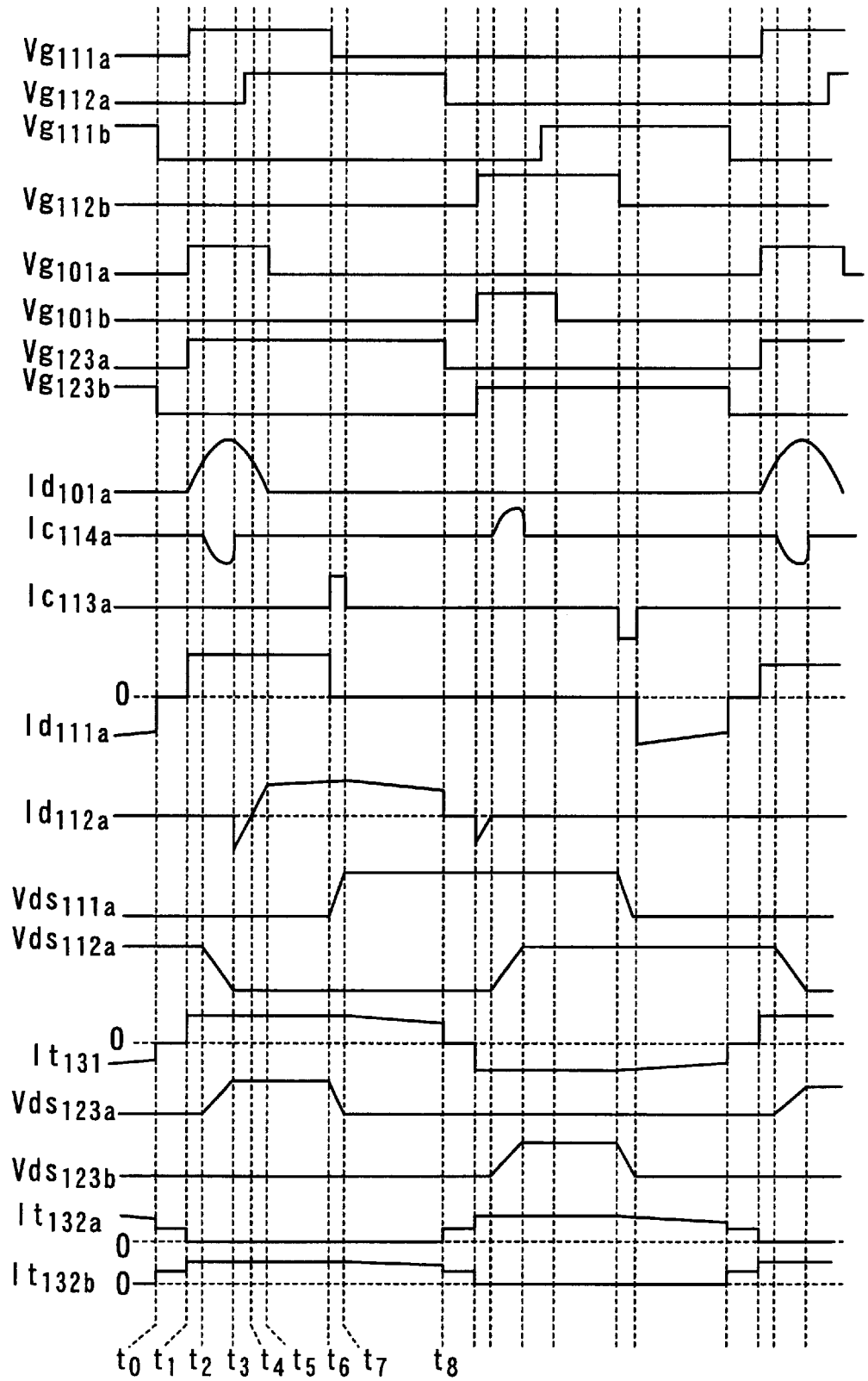
FIG. 8 is a timing chart showing operation of the power supply of the first embodiment.

In this state, as shown in FIG. 7, the two ends of the main primary winding 131 are connected to the supply voltage line 117 and the ground line 118 by the supply side and ground side A phase main switching elements 111a and 112a, and current $I_{190}$ is supplied from the D.C. voltage source 119.

After time $t_5$, energy is transmitted from the main primary winding 131 to the main secondary winding 132. At this time, a voltage of a polarity to apply a positive voltage to the source terminal of the A phase main rectifier element 123a is induced in the A phase main secondary winding 132a. Since a positive voltage is applied to the gate terminal of the A phase main secondary winding 132a, current represented by $I_{192}$ in FIG. 7 flows from the A phase main secondary winding 132a under the third quadrant operation, and energy is stored in the choke coil 125.

Next, at time $t_6$, first of all when the supply side A phase main switching element 111a is turned off, charging current flows in the resonance capacitor 113a connected in parallel with the main switching element 111a, and after the resonance capacitor 113a has been charged to the supply voltage Vin at time $t_7$, when the ground side A phase main switching element 112a is turned off at time $t_8$ all of the main switching elements 111a, 112a, 111b and 112b in the main bridge circuit 110 are turned off.

This state is the same as the state at time $t_0$, and this time current flows in the B phase side due to operation of the B phase side main switching elements 111b and 112b, main rectifier element 123b, and sub switching element 101b, similarly to when the A phase is in operation. The number of turns of the A phase main secondary winding 132a and the B phase main secondary winding 132b are made the same, and the size of the current flowing in the B phase side is the same as the current flowing in the A phase side.

However, when current flows in the B phase side, first of all, after the ground line side B phase main switching element 112b and the B phase sub switching element 101b have been turned on, the supply side B phase main switching element 111b is turned on, but this operation is symmetrical to that of the A phase, and so description will be omitted.

Figure 9:
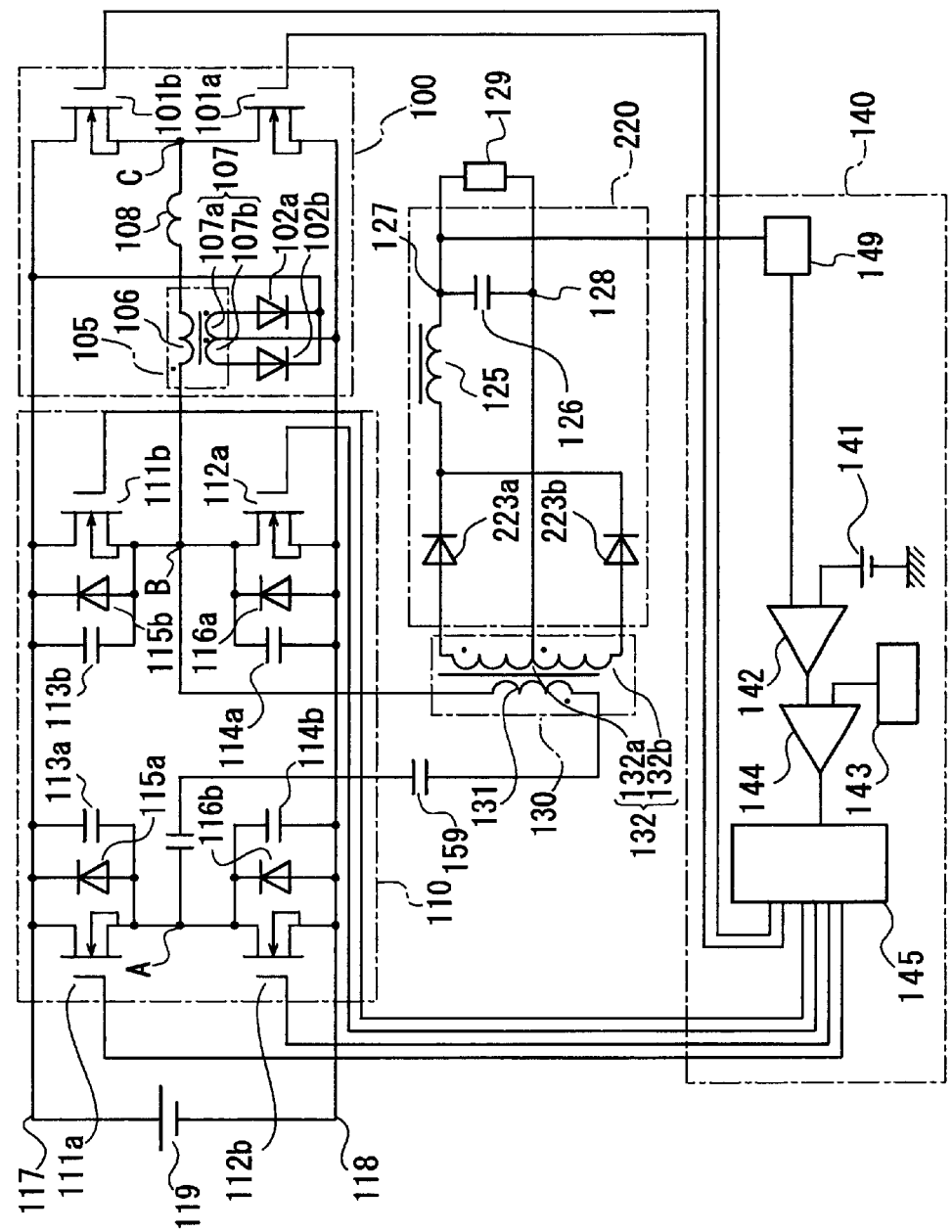
FIG. 9 is a circuit block diagram showing a second embodiment of the present invention.

The above described power supply 1 uses n-channel MOSFETs in the secondary side main rectifier elements 123a and 123b, but it is also possible to use diode elements. The power supply 2 of FIG. 9 is a power supply of a second embodiment of the present invention, and the rectification and smoothing circuit 220 of that power supply has main rectifier elements 223a and 223b comprised of diode elements, compared to the rectification and smoothing circuit 120 of the power supply 1 of FIG. 1 that has main rectifier elements 123a and 123b comprised of n-channel MOSFETs. These main rectifier elements 223a and 223b do not have gate terminals, so they are not connected to the control circuit 140.

In the power supply 2 of the second embodiment in FIG. 9, other circuitry and wiring is the same as the power supply 1 in FIG. 1, the same circuits have the same reference numerals attached thereto, and description will be omitted.

Figure 10:
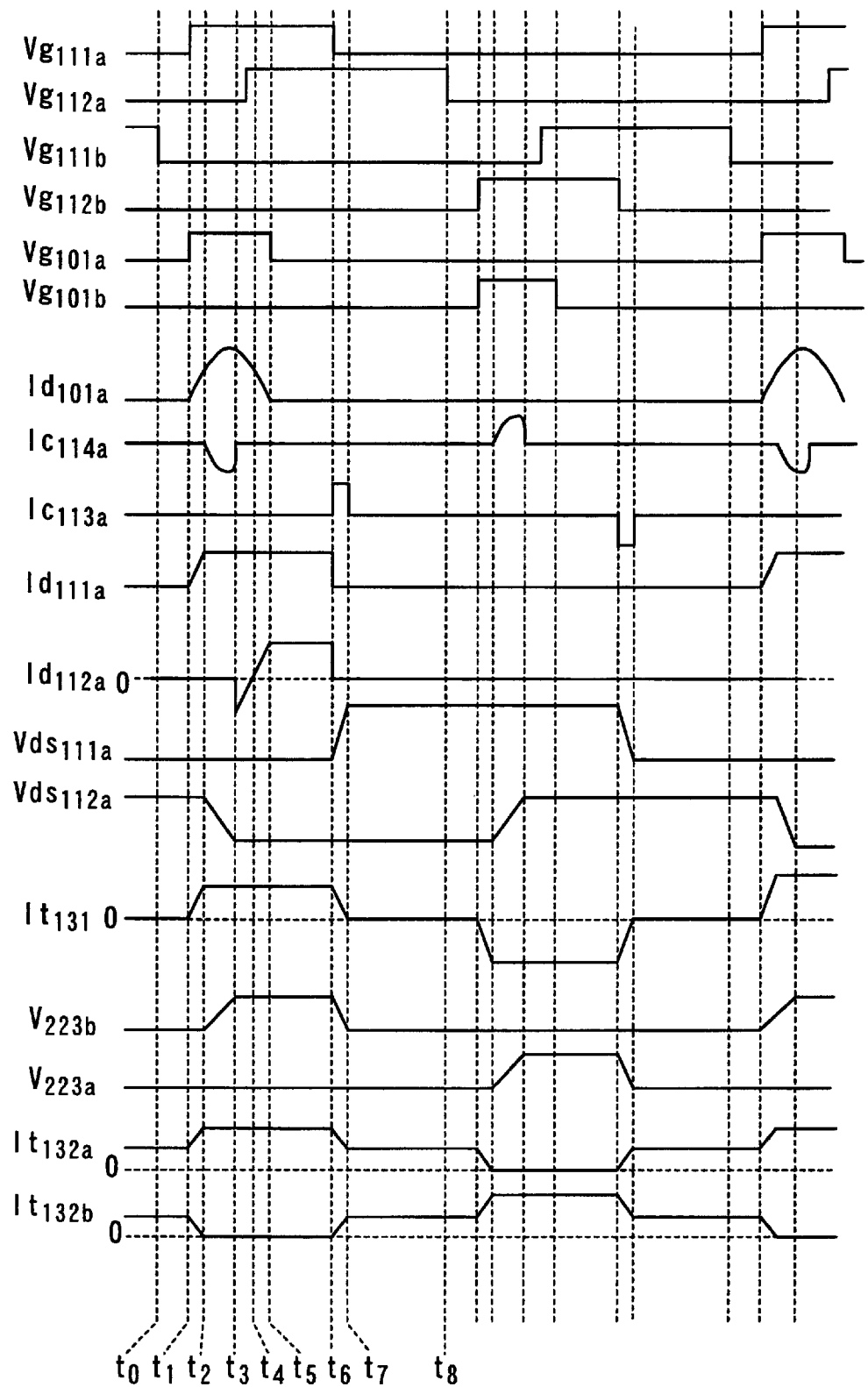
FIG. 10 is a timing chart showing the operation of the power supply of the second embodiment.

In this power supply 2 also, as shown in the timing chart of FIG. 10, the main switching elements 111a, 112a, 111b and 112b are changed from off to on in the state where a voltage is not applied across the source and drain, which means that loss becomes small. In the timing chart of FIG. 10, $V_{223a}$ and $V_{223b}$ represent voltages on the two terminals of the A phase and B phase main rectifier elements 223a and 223b.

Operation of the main bridge circuit 110 and the optimization circuit 100 are the same as the operation of the power supply 1 of FIG. 1.

In each of the above described embodiments, one end of the sub primary winding 106 is connected to the second output terminal B of the main bridge circuit 110, and the other end is connected via the resonance coil 108 to a connection point C, but conversely to this it is also possible to connect one end of the resonance coil 108 to the second output terminal B and the other end to connection point C via the sub primary winding 106.

Also, in each of the above described embodiments, one end of the main primary winding 131 is connected to the first output terminal A of the main bridge circuit 110 via a capacitor 159 for preventing offset excitation, but the capacitor 159 can also be inserted at one end of the main primary winding 131 and either one or both of the first and second output terminals A and B. Further, when there is no offset excitation, the capacitor 159 can be omitted altogether.

In each of the above described embodiments, energy transferred from the sub primary winding 106 to the sub secondary winding 107 caused regeneration in the D.C. voltage source 119, but the present invention is not limited in this respect.

Figure 11:
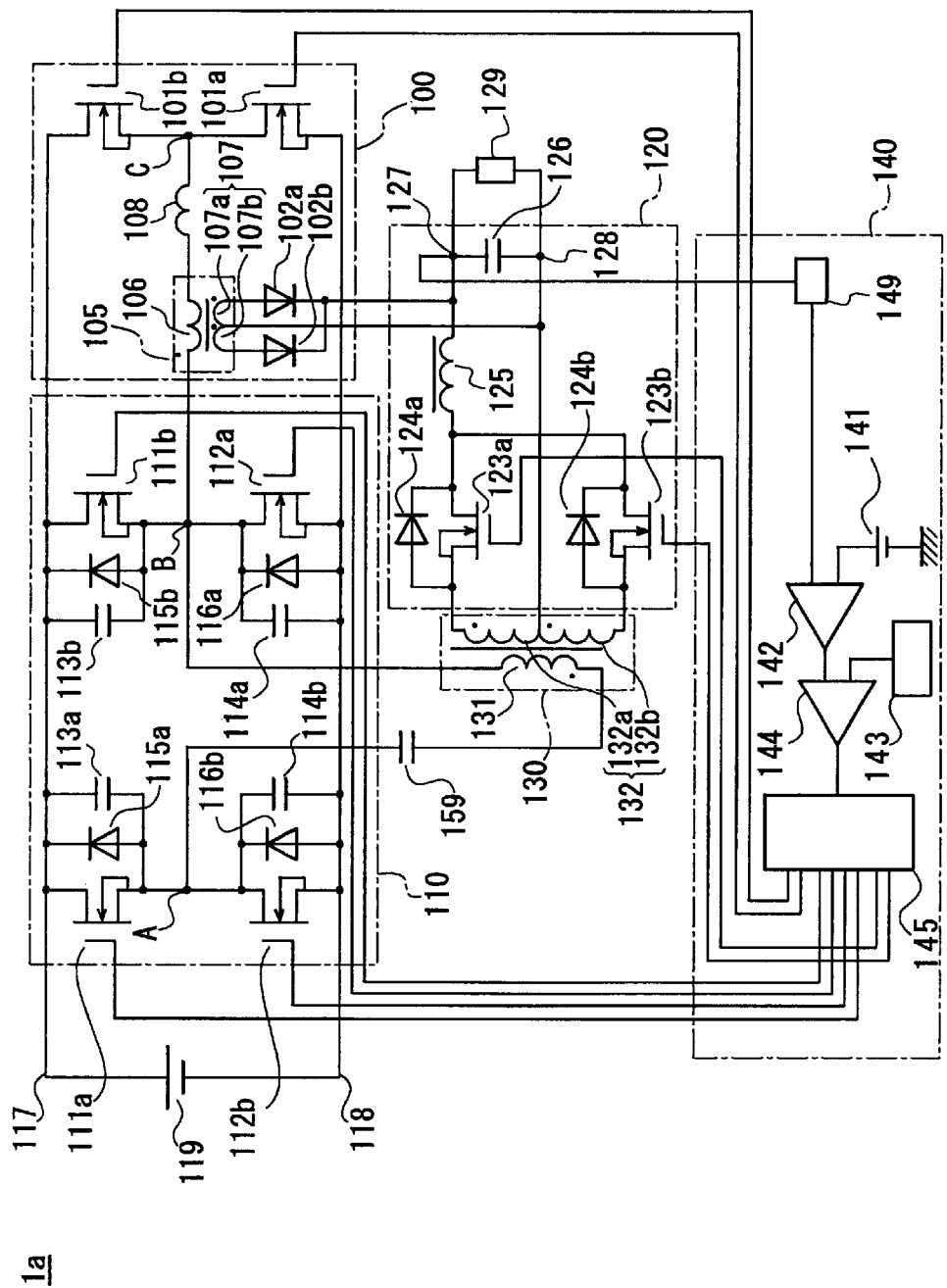
FIG. 11 is a drawing showing the power supply of a modified example of the present invention when current is supplied to a load side.

In the power supply 1a in FIG. 11, cathode side terminals of sub rectifier elements 102a and 102b are connected to high voltage side terminals of the output capacitor 126 (connecting sections of the output capacitor 126 and the choke coil 125), and a center tap portion of the sub secondary winding 107 is connected to a low voltage side terminal of the output capacitor 126 (the ground line of the secondary side).

In this power supply 1a, energy transferred from the sub primary winding 106 to the sub secondary winding 107 is supplied to a load 129, which means that energy of a resonance current flowing due to the electromotive force of the resonance coil 108 can be supplied not to the primary side but to the secondary side.

It is also possible to consume the energy transferred to the sub secondary winding 107 instead of supplying it to the D.C. voltage source 119 or load 129.

Figure 12:
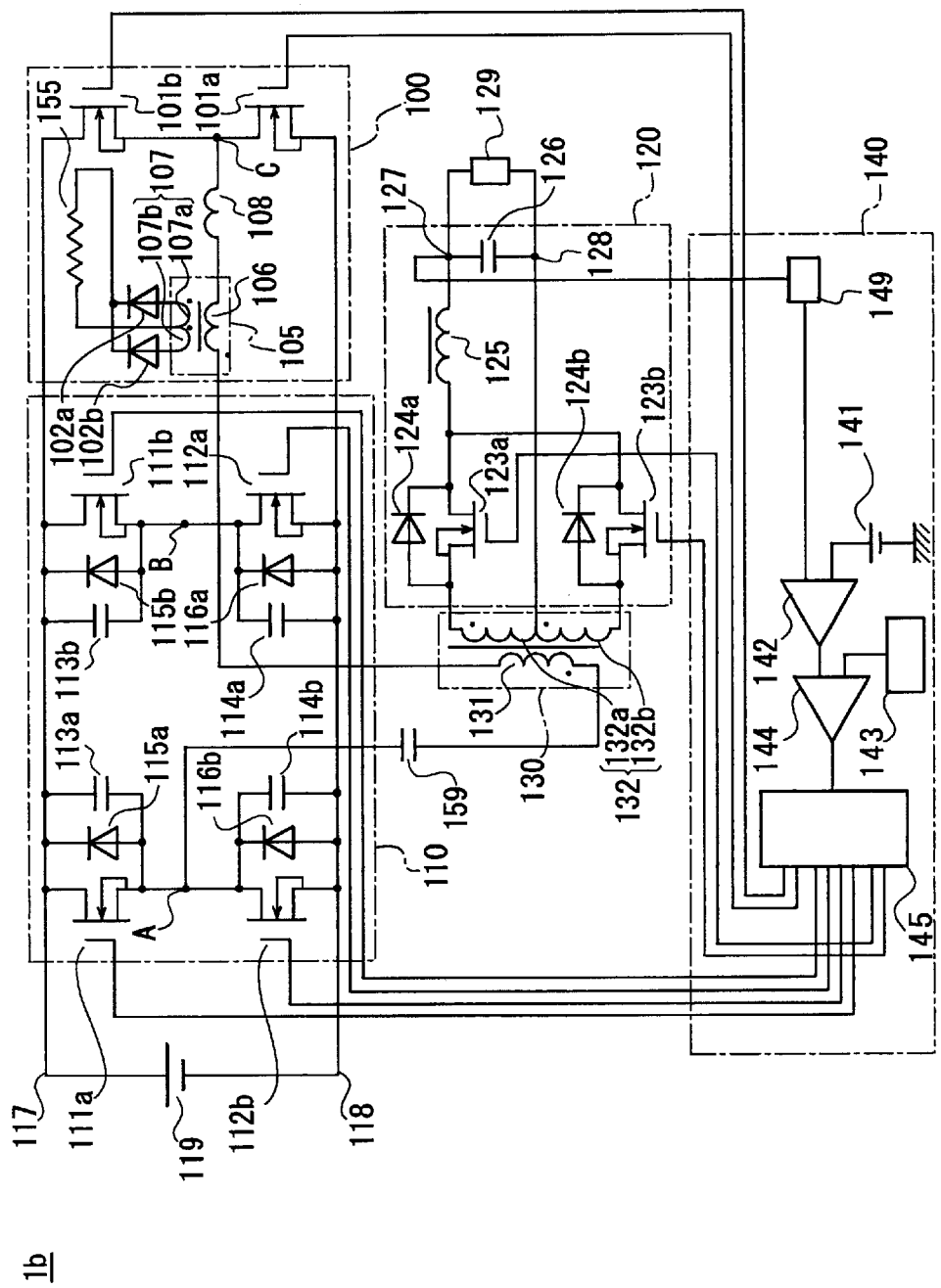
FIG. 12 is a drawing showing the power supply of a modified example of the present invention when power is consumed by a resistive element.

1b in FIG. 12 is a power supply having a power consumption circuit 155 constituted by resistive elements connected across the cathode terminals of the sub rectifier elements 102a and 102b and the center tap portion of the sub secondary winding 107.

In this power supply 1b, because by electromotive force generated at the sub secondary winding 107 a current flows into the power consumption circuit (resistive element) 155, an energy transferred from the sub primary winding 106 to the sub secondary winding 107 is consumed by power consumption circuit (resistive element) 155.

Figure 13:
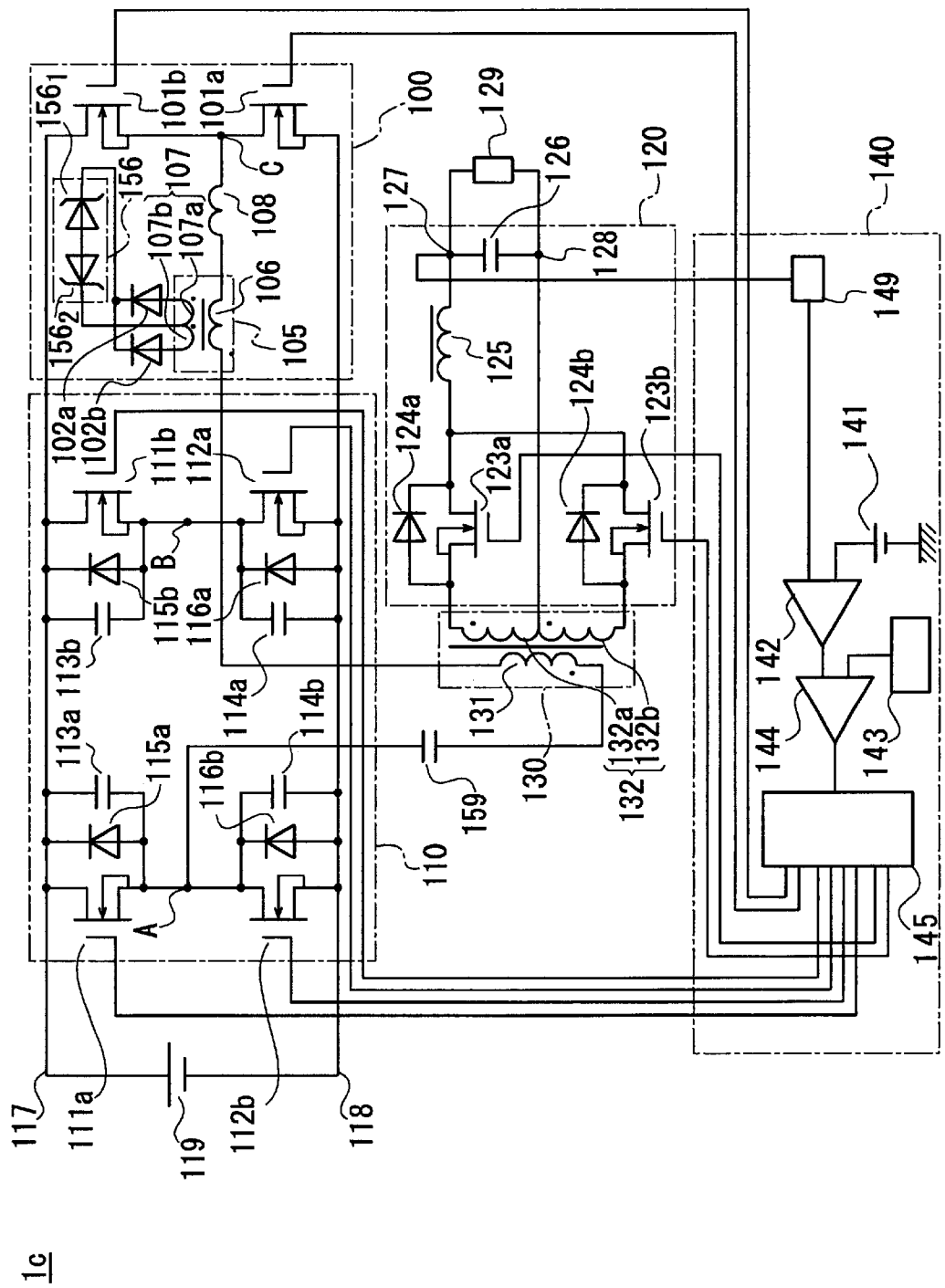
FIG. 13 is a drawing showing the power supply of a modified example of the present invention when power is consumed by a Zener element.

The power supply 1c shown in FIG. 13 has a power consumption circuit 156 constituted by a pair of Zener diodes $156_1$ and $156_2$ connected in series in opposite directions, instead of the resistive element. This power consumption circuit 156 is connected between cathode terminals of the sub rectifier elements 102a and 102b and the center tap portion of the sub secondary winding 107.

In this power supply 1c, energy transferred to the sub secondary winding 107 is consumed by the Zener diodes $156_1$ and $156_2$ in the power consumption circuit 156.

In this way, energy transferred to the sub secondary winding 107 can be consumed by the resistive element 155 or the Zener diodes $156_1$ and $156_2$, or a combination of the resistive element 155 and the Zener diodes $156_1$ and $156_2$. It is also possible to use resistive components of other elements or constant voltage elements etc. In short, it is preferable that the resonance current generated by the electromotive force of the resonance coil 108 is reduced by utilizing consumption or regeneration in the sub secondary winding 107 side.

In each of the above described embodiments, The MOSFETs used have been n-channel type MOSFETs, but it is also possible to use p-channel MOSFETS, or to use both n-channel MOSFETs and p-channel MOSFETs in a single power supply.

Figure 14:
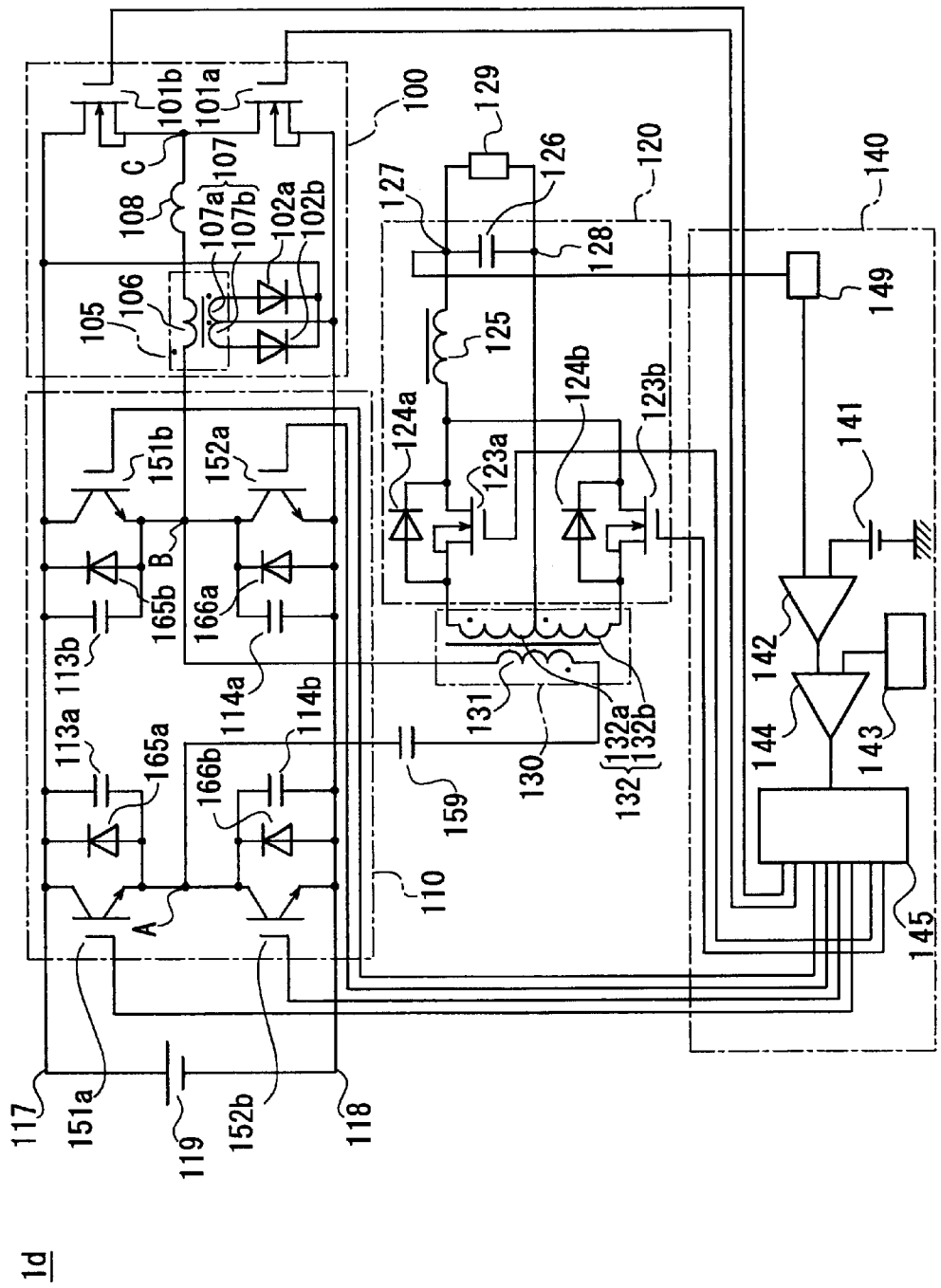
FIG. 14 is a drawing showing the power supply of a modified example of the present invention when IGBTs are used.

Also, the main switching elements are not limited to using MOSFETs. Reference numeral 1d in FIG. 14 shows a power supply in which IGBTs are used in the main switching elements, and four IGBTs 151a, 151b, 152a and 152b are bridge connected.

With IGBTs, since an internal parasitic diode can not be used, external diode elements 165a, 165b, 166a and 166b are inversely parallel connected across each of the IGBTs 151a, 151b, 152a and 152b, so as to enable similar operation to the case where MOSFETs are used.

It is also possible to use bipolar transistors instead of IGBTs. In this case also, it is necessary to inversely parallel connect a diode element across each bipolar transistor, but since the IGBTs of the power supply 1d in FIG. 14 can simply be replaced by bipolar transistors (NPN type bipolar transistors), the circuit diagram will be omitted.

Figure 15:
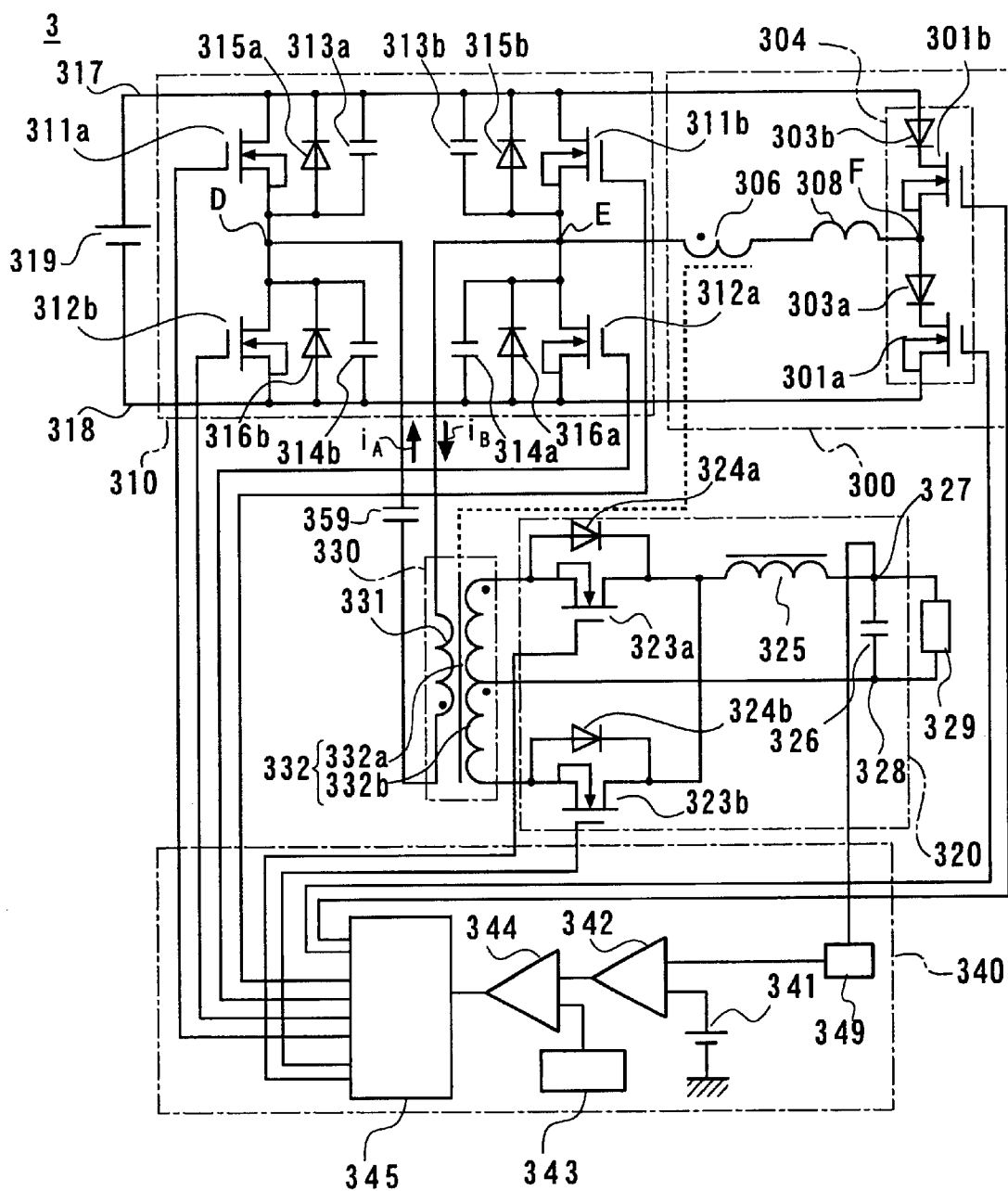
FIG. 15 is a circuit block diagram showing a third embodiment of the present invention.

Reference numeral 3 in FIG. 15 represents a power supply of a third embodiment of the present invention. This power supply 3 comprises a primary side of main bridge circuit 310, a secondary side of main rectifier smoothing circuit 320, a main transformer 330 a control circuit 340 and an optimization circuit 300.

First of all, the circuit structure of the primary side will be described. Reference numeral 319 is a D.C. voltage source which rectifies and smoothes a commercial voltage supply. The high voltage side of the D.C. voltage source 319 is connected to a supply voltage line 317, while the low voltage side is connected to a ground line 318.

The main bridge circuit 310 has four main switching elements 311a, 311b, 312a, 312b constituted by n-channel MOSFETs.

The four main switching elements 311a, 311b, 312a, 312b are bridge connected of the four main switching elements 311a, 311b, 312a, 312b, two main switching elements 311a and 312b, and the other two main switching elements 311b and 312a are respectively connected in series, and the two ends of the series connected circuits are connected to the supply voltage line 317 and the ground line 318.

A main primary winding 331 is provided in the main transformer 330.

Letters D and E represent parts where the main switching elements 311a, 311b, 312a, 312b are connected together in series, and these parts constitute output points of the main bridge circuit 310. The two ends of the main primary winding 331 are respectively connected to output points D and E, and a H-bridge circuit is made up of the main bridge circuit 310 (four main switching elements 311a, 311b, 312a, 312b) and the main primary winding 331.

In this embodiment, a capacitor 359 for preventing offset excitation is inserted between the main primary winding 331 and one output terminal A of the main bridge circuit 310, so as to stop a D.C. component flowing in the main primary winding 331. Even when the two ends of this capacitor 359 are short-circuited there will be no effect on the operation of the power supply 3 of this embodiment, as will be described later, so voltage variations relating to the capacitor 359 will not be described.

Among the four main switching elements 311a, 311b, 312a, 312b, those supply a current represented in the drawing by symbol $i_A$ from the D.C. voltage source 319 to the main primary winding 331 when they are turned on are A phase main switching elements 311a and 312a, while the group that supplies a current represented in the drawing by symbol $i_B$ from the D.C. voltage source 319 to the main primary winding 331 when they are turned on are B phase main switching elements 311b and 312b.

A phase current $I_A$ and B phase current $I_B$ flows in the direction from drain to source inside each of the main switching elements 311a, 312a, 311b and 312b.

Of the two output terminals D and E of the main bridge circuit 310, when the A phase main switching elements 311a and 312a are turned on, the first output terminal D becomes the high voltage side terminal, while when the B phase main switching elements 311b and 312b are turned on, the second output terminal E becomes the high voltage side terminal.

Also, respective resonance capacitors 313a, 313b, 314a and 314b are connected in parallel with each of the main switching elements 311a, 311b, 312a and 312b, so as to cause resonance with a resonance coil 308 inside a optimization circuit 300 that will be described later.

Reference numerals 315a, 316a, 315b and 316b represent parasitic diodes (rectifier elements) inside the main switching elements 311a, 311b, 312a and 312b. Each parasitic diode 315a, 316a, 315b and 316b is a rectifier element, and is inversely parallel connected with respect to the main switching elements 311a, 312a, 311b and 312b.

Next, the circuit structure of the secondary side will be described, with a secondary side rectification and smoothing circuit 320 having a choke coil 325, an output capacitor 326, and main rectifier elements 323a and 323b comprised of n-channel MOSFETs.

A main secondary winding 332 magnetically coupled to the main primary winding 331 is provided in the main transformer 330. The main secondary winding 332 has a terminal at its electrical center and an A phase main secondary winding 332a and a B phase main secondary winding 332b use the terminal as their common terminal (center tap).

Common end of the A phase main secondary winding 332a and the B phase main secondary winding 332b (the center tap portion) is connected to a ground terminal 328, and the other ends of the A phase main secondary winding 332a and the B phase main secondary winding 332b are respectively connected to a source terminal of an A phase main rectifier element 323a and a source terminal of a B phase main rectifier element 323b.

A drain terminal of the A phase main rectifier element 323a and a drain terminal of the B phase main rectifier element 323b are commonly connected to one end of the choke coil 325. Reference numerals 324a and 324b represent parasitic diodes inside the main rectifier elements 323a and 323b.

Reference numeral 327 is an output terminal and the other end of the choke coil 325 is connected to this output terminal 327. The output capacitor 326 is connected between the output terminal 327 and the ground terminal 328, and a voltage rectified by the main rectifier elements 323a and 323b is smoothed by the choke coil 325 and the output capacitor 326 and then supplied from the output terminal 327 to a load 329.

The voltage on the output terminal 327 is input to the control circuit 340 while being isolated by a photocoupler 349 etc.

The control circuit 340 comprises a reference voltage source 341, a differential amplifier 342, an oscillator 343, a comparator 344 and a drive circuit 345. The differential amplifier 342 amplifies a difference between a voltage input from a photocoupler 349 and the output voltage of the reference voltage source 341, and supplies its output to the comparator 344.

The comparator 344 compares the voltage input from the differential amplifier 342 and the output waveform from the oscillator 343, and outputs the comparison result to the drive circuit 345.

The drive circuit 345 controls the on time of the main switching elements 311a, 312a, 311b and 312b based on the comparison result from the comparator 344 so that a difference between an output voltage of the photocoupler 349 detected by the differential amplifier 342 and the output voltage of the reference voltage source 341 becomes smaller.

Accordingly, similarly to the power supply 501 described in the related art, this power supply 3 also keeps an output voltage on the output terminal 327 constant when the output voltage on the output terminal 327 fluctuates, by absorbing the fluctuating component by operation of the control circuit 340.

This power supply 3 has an optimization circuit 300, comprising an auxiliary primary winding 306, a resonance coil 308 and a sub bridge circuit 304.

The sub bridge circuit 304 comprises A phase and B phase sub switching elements 301a and 301b constituted by n-channel MOSFETs, and A phase and B phase auxiliary rectifier elements 303a and 303b constituted by diode elements.

The anode terminal of the B phase auxiliary rectifier element 302b is connected to supply voltage line 317, while the cathode terminal is connected to the drain terminal of the B phase sub switching element 301b.

On the other hand, the cathode terminal of the A phase auxiliary rectifier element 303a is connected to the drain terminal of the A phase sub switching element 301a, and the source of this sub switching element 301a is connected to the ground line 318.

Also, the anode terminal of the A phase auxiliary rectifier element 303a is connected to the source terminal of the B phase sub switching element 301b.

Therefore, the sub bridge circuit 304 is made up of a series connected circuit of the A phase sub switching element 301a and the A phase auxiliary rectifier element 303a, a series circuit of the B phase sub switching element 301b and the B phase auxiliary rectifier element 303b, with these series circuits further connected in series with each other. The main bridge circuit 310 is connected in parallel across the supply voltage line 317 and the ground line 318. A point of connection between the two series circuits is designated by letter F.

The resonance coil 308 and the auxiliary primary winding 306 are connected in series, with one end of this series circuit being connected to the second output point E, and the other end being connected to the connection point F.

Gate terminals of the A phase and B phase sub switching elements 301a and 301b are connected to the drive circuit 345, and as will be described later are controlled by the control circuit 340 together with the main bridge circuit 310 and the main rectification and smoothing circuit 320.

Operation of this power supply 3 will now be described. FIG. 24 is a timing chart for explaining the operation of the power supply 3, and FIG. 16 to FIG. 23 are circuit diagrams for describing currents flowing in the circuit of the power supply 3 and their directions. In FIG. 16 to FIG. 23, dotted lines representing circuit blocks of FIG. 15, and the associated reference numerals, are omitted.

In the timing chart of FIG. 24, $Vg_{311a}$, $Vg_{312a}$, $Vg_{311b}$ and $Vg_{312b}$, represent gate voltages of A phase and B phase main switching elements 311a, 312a, 311b and 312b.

$Vg_{301a}$ and $Vg_{301a}$ represent gate voltages of A phase and B phase sub switching elements 301a and 301b, and $Vg_{323a}$ and $Vg_{323a}$ represent gate voltages of A phase and B phase main rectifier elements 323a and 323b.

$Id_{301a}$ represents current flowing in the A phase sub switching element 301a. The current flowing in the B phase sub switching element 301b is omitted.

$Ic_{313a}$ and $Ic_{314a}$ represent currents flowing in resonance capacitors 313a and 314a connected in parallel with A phase main switching elements 311a and 312a. The charging direction is shown as positive and the discharge direction is shown as negative.

$Id_{311a}$ and $Id_{312a}$ represent drain currents of the A phase main switching elements 311a and 312a, and $Vds_{311a}$ and $Vds_{312a}$ represent voltages across the source and drain of the A phase main switching elements 311a and 312a. Drain current and drain source voltage of the B phase main switching elements 311b and 312b are omitted.

$It_{331}$ represents current flowing in the main primary winding 331. When the A phase main switching elements 311a and 312a are on, the supply direction of current from the D.C. voltage source 319 to the main primary winding 331 is shown as positive, while the supply direction when the B phase main switching elements 311b and 312b are on is shown as negative.

$Vds_{323a}$ and $Vds_{323b}$ represent voltages across the drain and source of the A phase and B phase main rectifier elements 323a and 323b, with a direction when the voltage of the drain terminal is higher than the voltage on the source terminal being shown as positive (upwards in the drawing).

$It_{332a}$ and $It_{332b}$ represent currents flowing in the A phase and B phase main secondary windings 332a and 332b.

Figure 16:
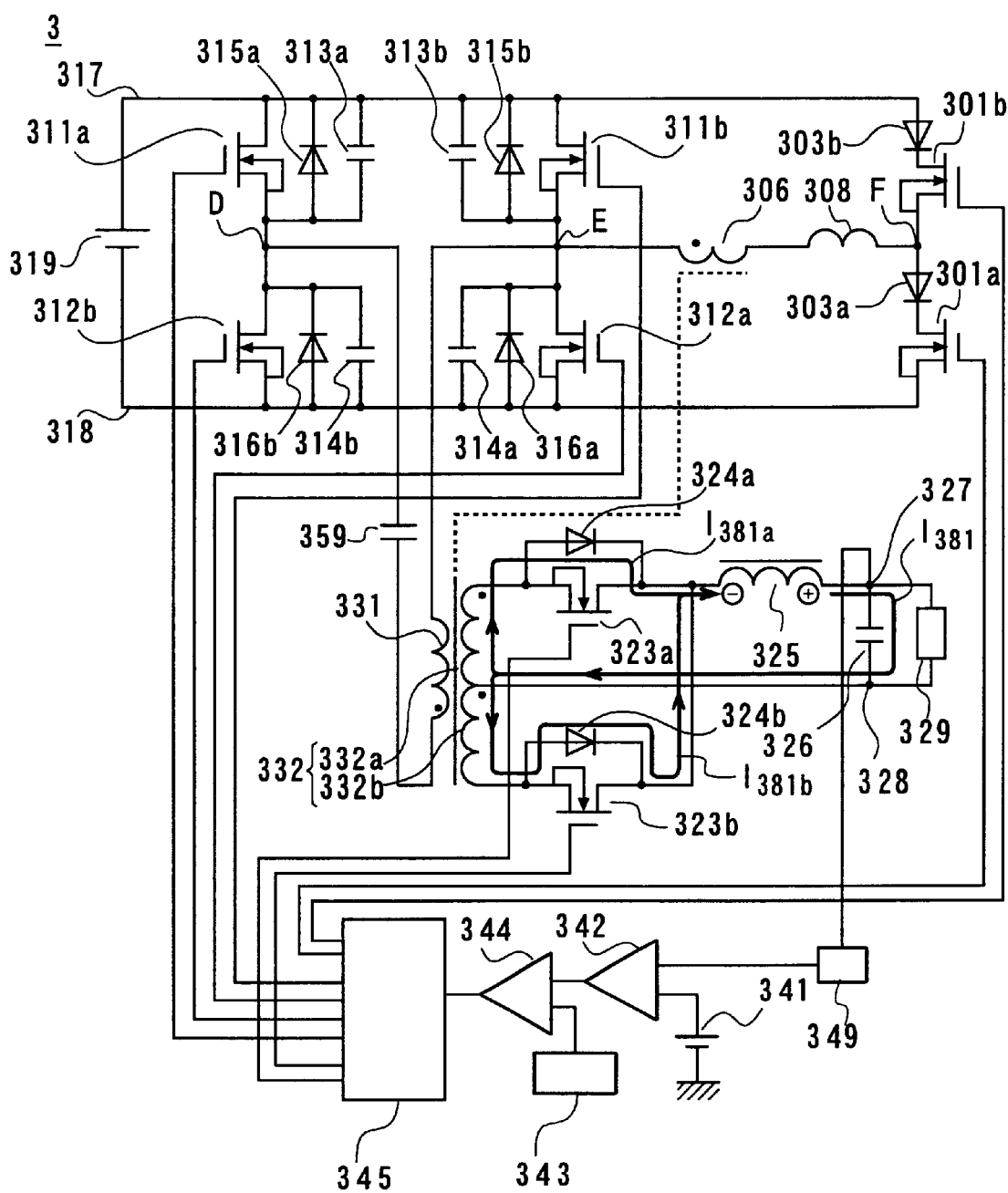
FIG. 16 is a first drawing for describing current flow in the power supply of the third embodiment.

FIG. 16 shows current flowing in the power supply 3 during time $t_0$ to time $t_1$ in the timing chart of FIG. 24, during time $t_0$ to time $t_1$, with the A phase and B phase main switching elements 311a, 312a, 311b and 312b, and the A phase and B phase sub switching elements 301a and 301b in the off state.

Energy is stored in the secondary side choke coil 325 before time $t_0$, and during time $t_0$ to time $t_1$ an electromotive force is generated in the choke coil 325 due to this energy, and current $I_{381}$ is flowing in the main rectification and smoothing circuit 320.

From time $t_0$ to time $t_1$, the secondary side main rectifier elements 323a and 323b are off.

The electrical characteristics of the parasitic diodes 324a and 324b in each of the main rectifier elements 323a and 323b are the same, which means current $I_{381}$ supplied from the choke coil 325 branches to the two parasitic diodes 324a and 324b, and currents $I_{381a}$ and $I_{381b}$ respectively flow in the A phase and B phase main secondary windings 332a and 332b.

From this condition, at time $t_1$, the main switching element for A phase supply voltage line side 311a, the A phase main rectifier element 323a and the A phase sub switching element 301a are turned on.

Figure 17:
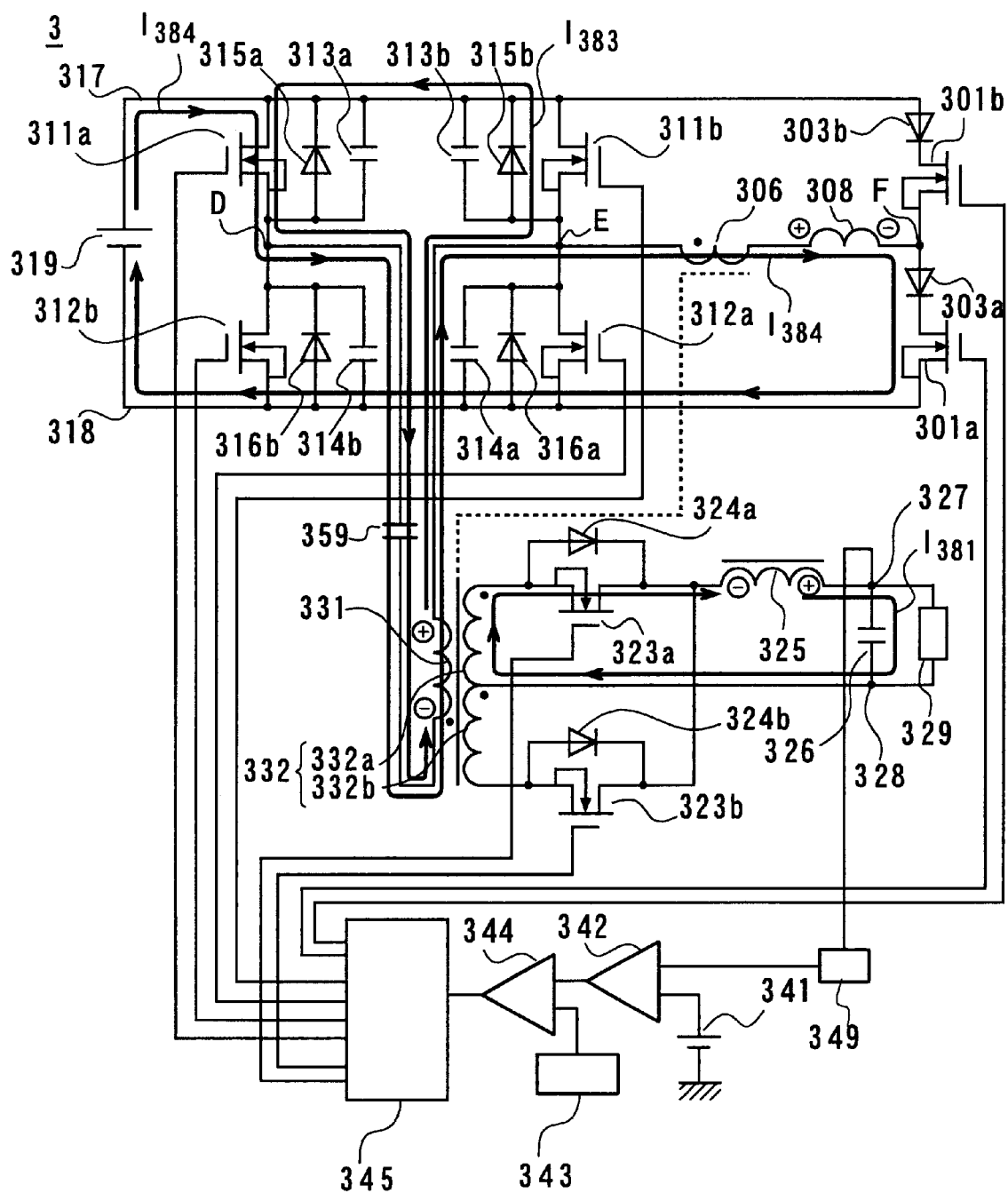
FIG. 17 is a second drawing for describing current flow in the power supply of the third embodiment.

At the secondary side, since a voltage higher than the voltage on the drain terminal is applied to the source terminal of the A phase main rectifier element 323a, that A phase main rectifier element 323a operates in the third quadrant mode, and becomes low impedance. As a result, as shown in FIG. 17, current $I_{381}$ supplied by the secondary side choke coil 325 no longer flows in the parasitic diode 324b of the B phase main rectifier element 323b, and only flows in the A phase side (A phase main rectifier element 323a and A phase main secondary winding 332a side).

A voltage is induced in the main primary winding 331 due to the fact that current $I_{381}$ flows in the A phase main secondary winding 332a. This voltage has the polarity of a positive voltage to be applied to the second output terminal E and forward biases the parasitic diode 315b of the high voltage side B phase main switching element 311b.

As a result of this, current $I_{383}$ flows in a closed loop made up of the main primary winding 331, the parasitic diode 315b, and the high voltage side A phase main switching element 311a because of the energy that has been returned to the main primary winding 331 from the A phase main secondary winding 332a.

Also, a current $I_{384}$ flows from the D.C. voltage source 319 in sequence through the high voltage side A phase main switching element 311a, the main primary winding 331, the auxiliary primary winding 306, the resonance coil 308, and the A phase sub switching element 301a because the A phase main switching element 311a and the A phase sub switching element 301a are on.

Accordingly, current $I_{T1}$ flowing in the main primary winding 331 during time $t_1$ to time $t_2$ becomes $I_{T1}=I_{383}+I_{384}$.

The auxiliary primary winding 306 is magnetically coupled to the main primary winding 331 and the A phase and B phase main secondary windings 332a and 332b, and when the number of turns of the main primary winding 331 is designated $n_1$, the number of turns of the auxiliary primary winding 306 designated $n_s$ and the number of turns of the A phase main secondary winding 332a designated $n_{2a}$, the following equation is established.

$$I_{T1} \times n_1 + I_{384} \times n_s = I_{381} \times n_{2a}$$

Current is supplied from the choke coil 325 to the A phase main secondary winding 332a, and since the choke coil 325 can be considered approximate to a constant current source, the right side of the above equation is a fixed value. Accordingly, when the current $I_{384}$ flowing in the auxiliary primary winding 306 is increased, the current $I_{383}$ flowing in the parasitic diode 315b is reduced.

Since the secondary side choke coil 325 is a constant current source, when the current $I_{383}$ that flows in the parasitic diode 315b becomes zero at time $t_2$, current $I_{384}$ supplied from the D.C. voltage source 319 to the resonance coil 308 cannot increase. Specifically, at time $t_2$ $I_{381} \times n_{2a} = I_{384} \times n_1$, and the current $I_{384}$ supplied from the D.C. voltage source 319 becomes a fixed value.

At this time, the resonance capacitor 314a connected in parallel with the A phase ground side main switching element 312a is charged to the voltage Vin of the D.C. voltage source 319 because the parasitic diode 315b is off until time $t_2$, and when the current $I_{384}$ supplied from the D.C. voltage source 319 is made a fixed current the current flowing in the resonance coil 308 cannot be increased with only this current $I_{384}$.

In this state, the resonance capacitor 314a and the resonance coil 308 start to resonate, the resonance capacitor 314a is discharged, and by supplying current to the resonance coil 308 current flowing in the resonance coil 308 is increased.

Figure 18:
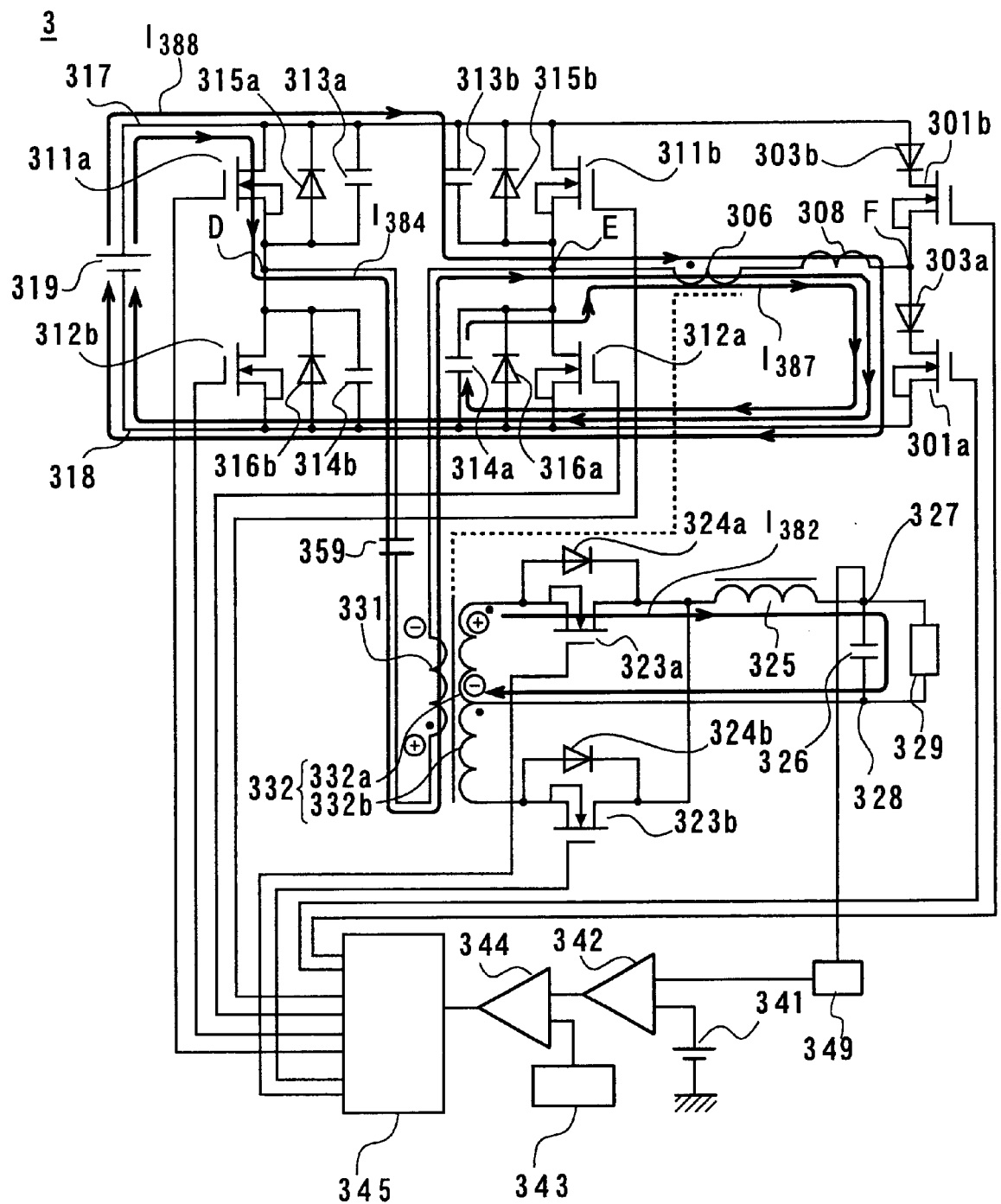
FIG. 18 is a third drawing for describing current flow in the power supply of the third embodiment.

$I_{387}$ in FIG. 18 represent currents flowing due to this resonant operation. The voltage at the high voltage side terminal (the second output terminal E of the main bridge circuit 310) of the resonance capacitor 314a is gradually lowered by discharge of the resonance capacitor 314a.

When the voltage of the second output terminal E is lowered, the resonance capacitor 313b connected across the second output terminal E and the supply voltage line 317 is charged up (this resonance capacitor 313b is a capacitor connected in parallel with the high voltage side B phase main switching element 311b.).

$I_{388}$ in FIG. 18 represents charging current to the resonance capacitor 313b, which flows from the high voltage side of the D.C. voltage source 319, through the resonance capacitor 313b, auxiliary primary winding 306, resonance coil 308 and A phase sub switching element 301a to the ground line 318.

When discharge of the resonance capacitor 314a is terminated by the resonance of the resonance coil 308, the resonance capacitor 314a and the resonance capacitor 313b, the energy accumulated in the resonance capacitor 314a is transferred to the resonance coil 308. As a result, an electromotive force in a direction to reverse charge the resonance capacitor 314a is generated in the resonance coil 308.

Figure 19:
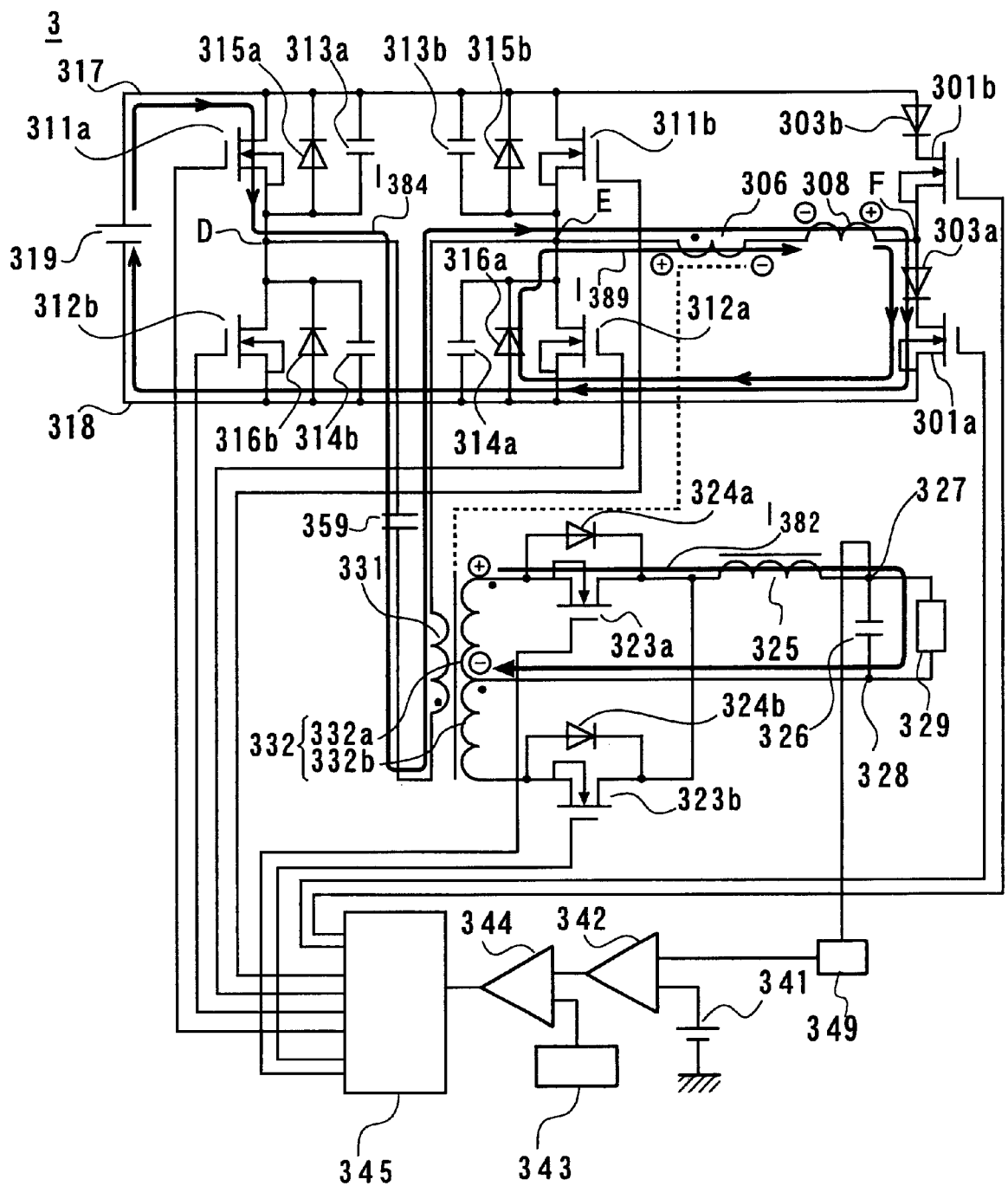
FIG. 19 is a fourth drawing for describing current flow in the power supply of the third embodiment.
Figure 20:
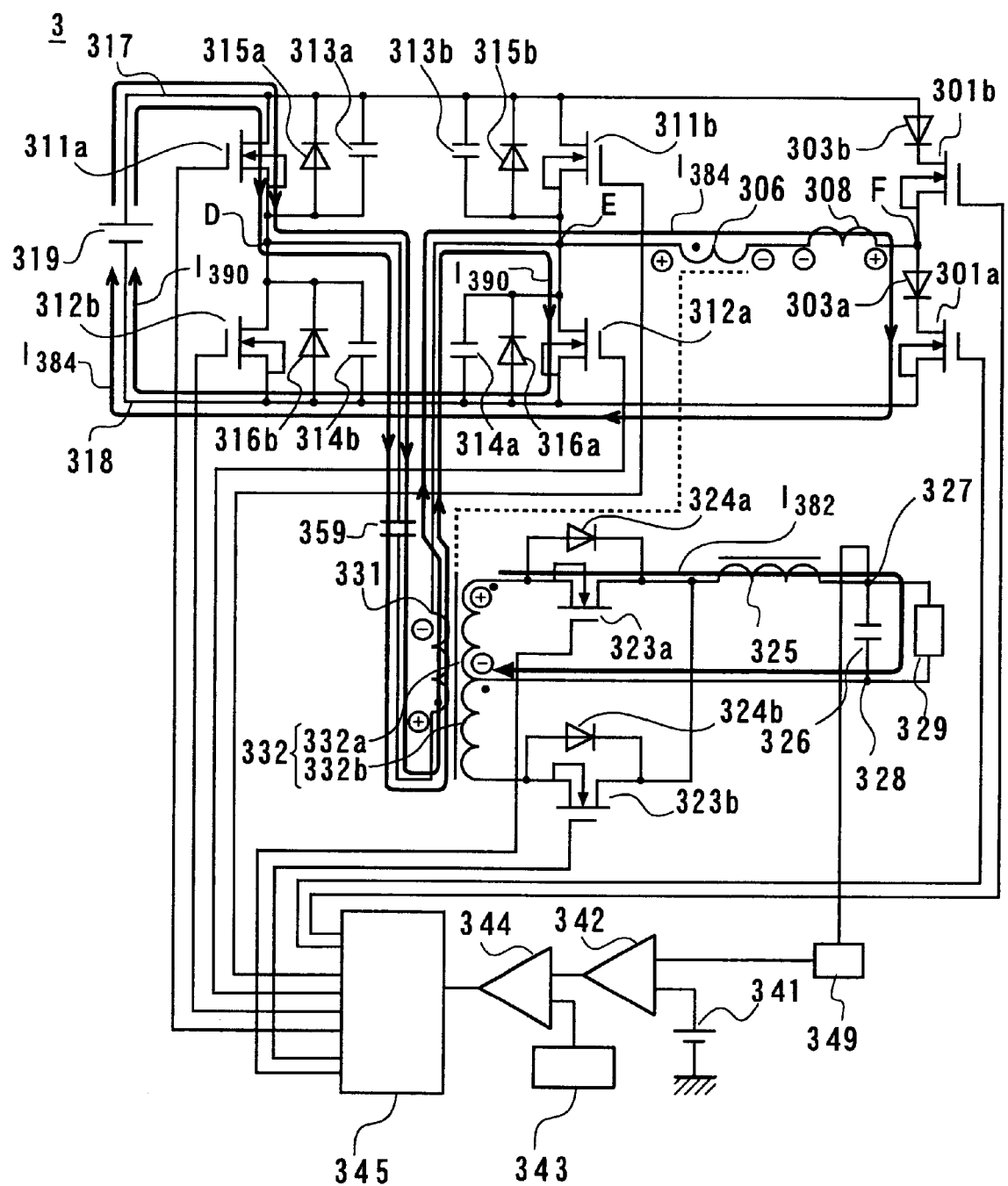
FIG. 20 is a fifth drawing for describing current flow in the power supply of the third embodiment.

This electromotive force is of a polarity to forward bias the internal parasitic diode 316a of the main switching element 312a connected in parallel with the resonance capacitor 314a, which means that the current shown by $I_{389}$ in FIG. 19 flows in the parasitic diode 316a due to the energy being stored in the resonance coil 308. When the parasitic diode 316a is forward biased, the supply voltage Vin is applied to the main primary winding 331. At this time, a substantially constant current $I_{382}$ is flowing in the secondary side.

Since this is the earth potential of the D.C. voltage source 319, the voltage at the output point E at time $t_3$ is substantially zero volts, and a voltage across the output points D and E of the main primary winding 331, in other words at the two ends of the main primary winding 331 in the main transformer 330, is the output voltage Vin of the D.C. voltage source 319.

Because of this, a voltage depending on the turns ratio of the main primary winding 331 and the auxiliary primary winding 306 is generated across the two ends of the auxiliary primary winding 306. The polarity of this voltage is reverse to the voltage generated in the resonance coil 308, and energy being stored in the resonance coil 308 is reduced in proportion to the voltage generated in the auxiliary primary winding 306. Because the output voltage Vin of the D.C. voltage source 319 is being applied to the main primary winding 331, energy is supplied from the primary side to the secondary side.

In the timing chart of FIG. 24, the time at which discharge of the resonance capacitor 314a is terminated and current $I_{389}$ begins to flow in the parasitic diode 316a is shown by $t_3$.

The control circuit 340 causes the A phase ground side main switching element 312a to be on when current $I_{389}$ is flowing in the parasitic diode 316a. In this case, voltage is not being applied across the source and drain of the main switching element 312a, which means that loss does not occur in the main switching element 312a due to turning on. Because this main switching element 312a is on, current represented by $I_{390}$ in FIG. 20 begins to flow.

A voltage induced in the auxiliary primary winding 306 has a polarity for causing a reduction in the current $I_{384}$ that flows in the resonance coil 308. Therefore, a current $I_{390}$ flowing in the main switching element 312a increases, a voltage induced in the auxiliary primary winding 306 reduces the amount of the current flowing in the A phase sub switching element 301a and at time $t_5$, the current flowing in the resonance coil 308 becomes zero.

At this time, a voltage having a polarity to cause third quadrant operation of the A phase main rectifier element 324a is induced in the main secondary winding 332, energy is transferred from the main primary winding 331 to the A phase main secondary winding 332a and current $I_{382}$ flows. A time $t_3$ in FIG. 24 represents the time at which the resonance current of the resonance coil 308 and the resonance capacitor 314a becomes zero, while time $t_4$ represents the time at which the current $I_{389}$ flowing in the parasitic diode 316a in the main switching element 312a becomes zero and forward direction current begins to flow in the main switching element 312a.

Figure 21:
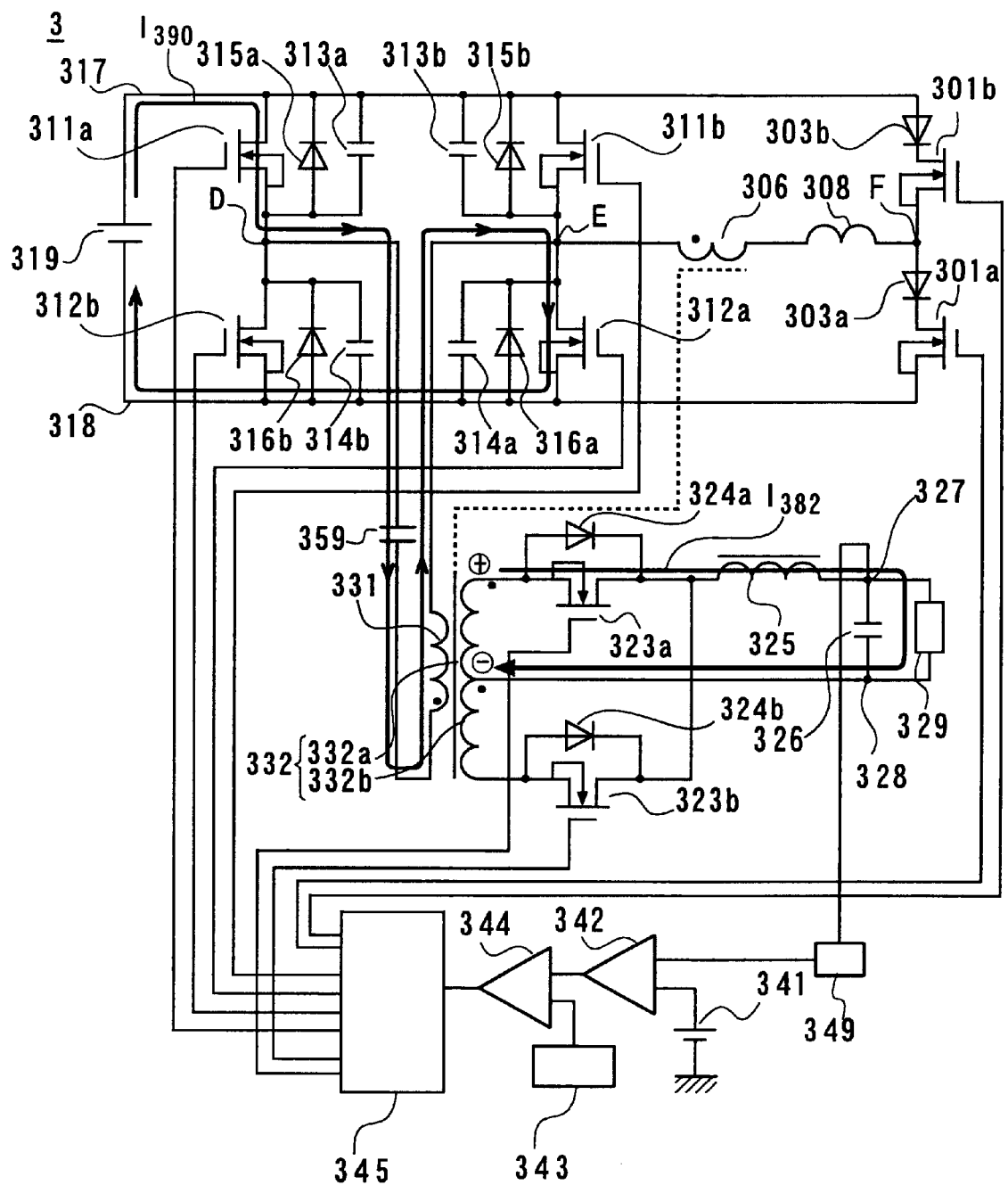
FIG. 21 is a sixth drawing for describing current flow in the power supply of the third embodiment.

Next, at time $t_5$, current stops flowing in the auxiliary primary winding 306 as described above, due to the A phase ground side main switching element 312a being on. In this state, as shown in FIG. 21, current $I_{390}$ flows in the main primary winding 331, current $I_{382}$ flows in the A phase main secondary winding 332a, and so the following equation is true.

$$I_{390} \times n_1 = I_{382} \times n_{2a}$$

The control circuit 340 causes the sub switching element 301a to be turned off at time $t_5$, which means that the sub switching element 301a is changed from an on state to an off state without any current flowing, and so there is no loss. At this time, the B phase resonance capacitor 313b is being charged up to Vin of the D.C. voltage source 319.

After time $t_3$, energy is transferred from the main primary winding 331 to the main secondary winding 332, a voltage is induced in the A phase main secondary winding 332a and the A phase main rectifier element 323a enters third quadrant operation.

Current $I_{382}$ flowing in the A phase main secondary winding 332a flows in the choke coil 325, and the choke coil 325 and the output capacitor 326 are charged up.

Figure 22:
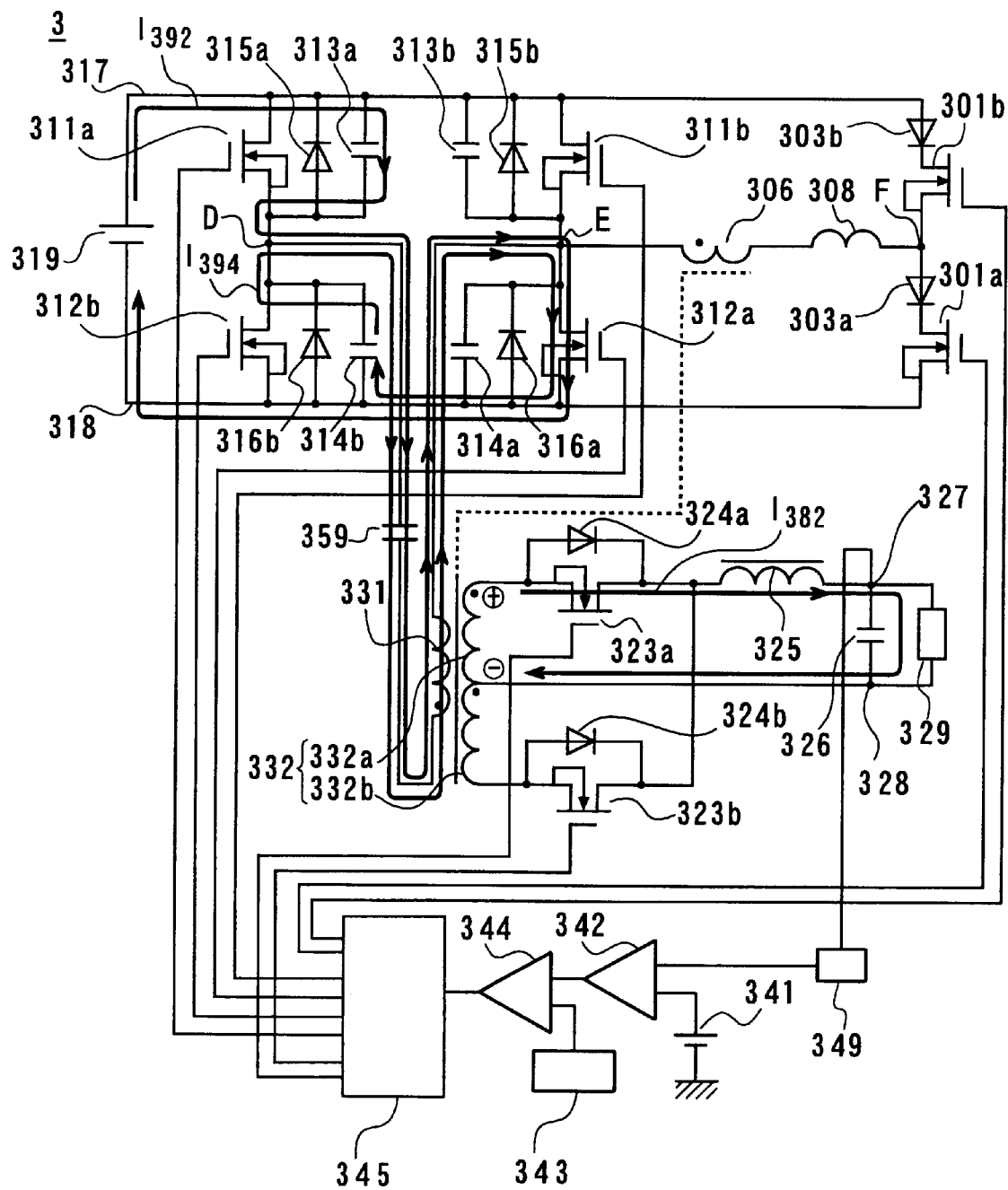
FIG. 22 is a seventh drawing for describing current flow in the power supply of the third embodiment.

With the A phase main switching elements 311a and 312a being on, the resonance capacitors 313a and 314a connected in parallel with these main switching elements are not being charged up. In this state, first of all when the A phase supply side main switching element 311a is turned off by the control circuit 340 at time $t_6$, as shown in FIG. 22, current $I_{392}$ charging the resonance capacitor 313a connected in parallel with the main switching element 311a, and current $I_{394}$ due to discharge of the B phase ground side resonance capacitor 314b flow.

When the voltage at the first output point D is lowered and current flowing to the resonance capacitors 313a and 314b is reduced, the current flowing in the main primary winding 331 is also reduced.

Figure 23:
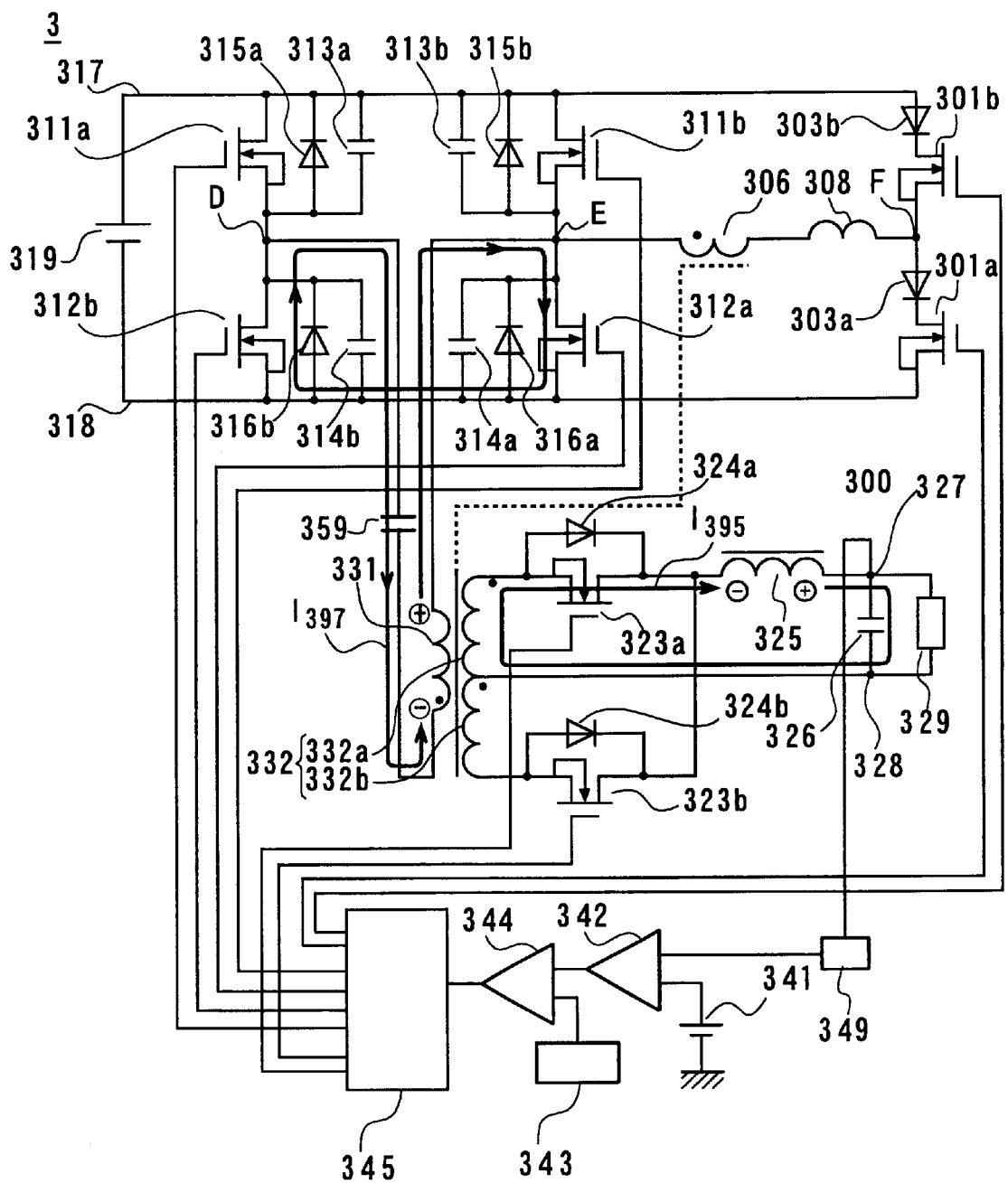
FIG. 23 is an eighth drawing for describing current flow in the power supply of the third embodiment.
Figure 24:
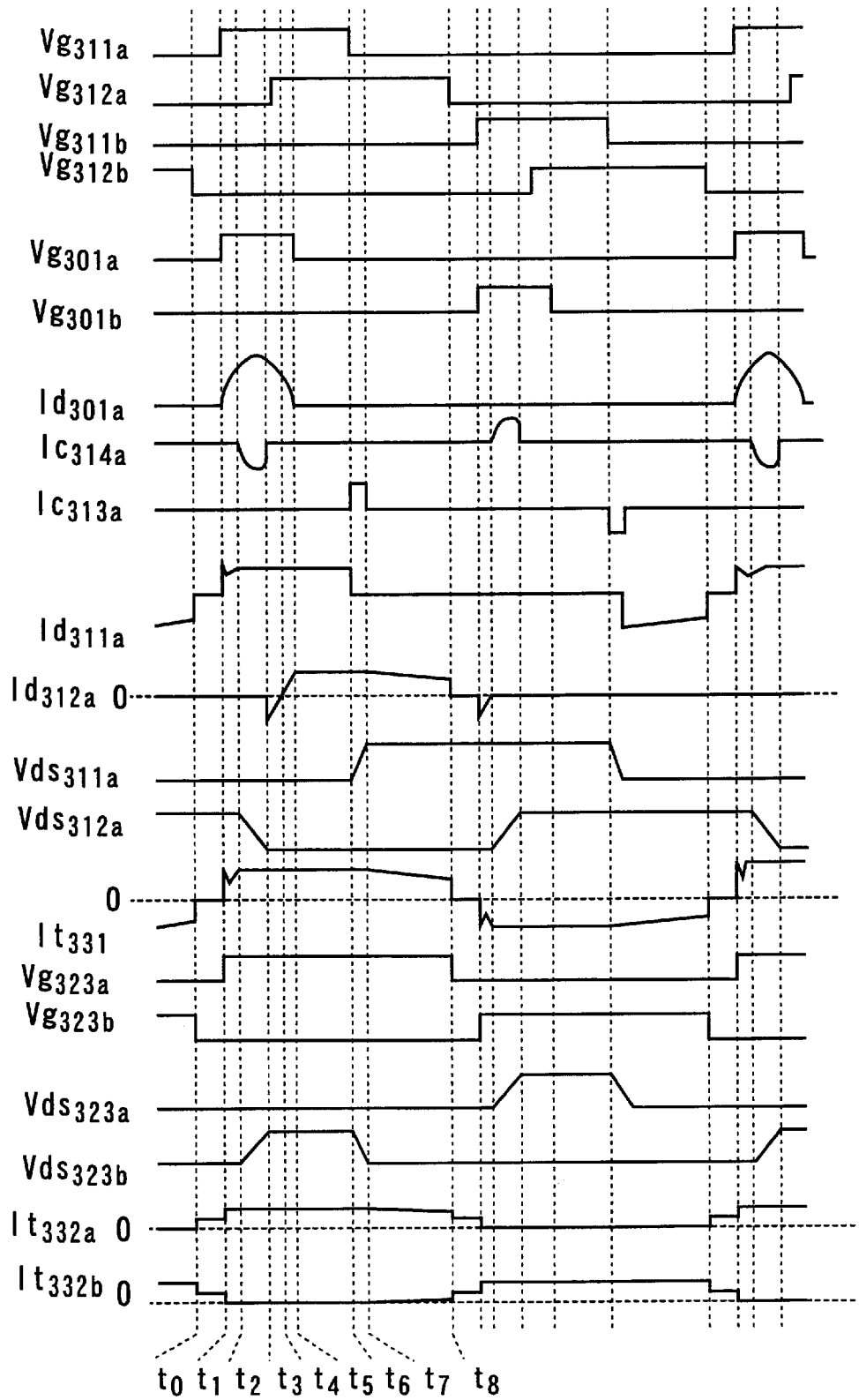
FIG. 24 is a timing chart showing operation of the power supply of the third embodiment.

In this state, as shown in FIG. 23, current $I_{395}$ due to the electromotive force of the choke coil 325 flows in the A phase main secondary winding 332a, and a voltage is induced in the main primary winding 331 as a result of the current $I_{395}$.

This voltage is of a polarity to forward bias the parasitic diode 316b in the B phase ground side main switching element 312b, and current $I_{397}$ flows inside the parasitic diode 316b (time $t_7$).

In that state, when the control circuit 340 causes the A phase ground side main switching element 312a to be off at time $t_8$, all main switching elements 311a, 312a, 311b and 312b in the main bridge circuit 310, and the secondary side rectifier elements 323a and 323b are put in the off state.

This state is the same as the state at time $t_0$, and this time current flows in the B phase side using operation of main switching elements 311b and 312b, the main rectifier elements 323b and the sub switching element 301b of the B phase side, similarly to the A phase operation.

The number of turns of the A phase main secondary winding 332a and the B phase main secondary winding 332b are the same, and the size of the current flowing in the B phase side is equal to the current flowing in the A phase side.

However, when current flows in the B phase side, first of all the B phase ground side main switching element 312b and the B phase sub switching element 301b are turned on, and then the supply side B phase main switching element 311b is turned on, but since that operation is symmetrical to that of the A phase, description will be omitted.

Figure 25:
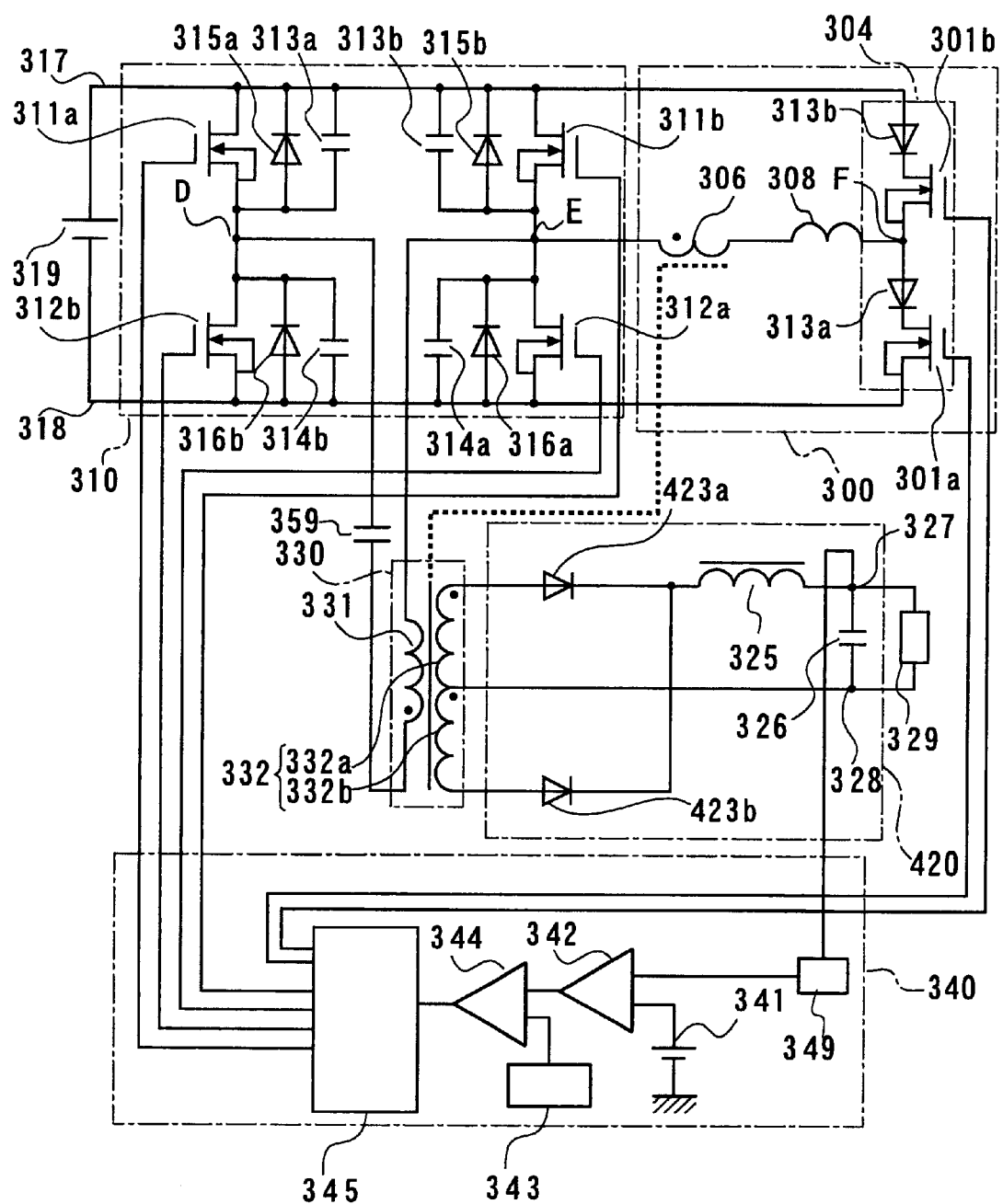
FIG. 25 is a circuit block diagram showing a fourth embodiment of the present invention.

The above described power supply 3 uses n-channel MOSFETs in the secondary side main rectifier elements 323a and 323b, but it is also possible to use diode elements, as in the power supply 4 of a fourth embodiment of the present invention shown in FIG. 25.

Compared to the case where the main rectifier elements 323a and 323b are constituted by n-channel MOSFETs in the main rectification and smoothing circuit 320 of the power supply 3 of FIG. 15, in the power supply 4 shown in FIG. 25 main rectifier elements 423a and 423b constituted by diode elements are used in a rectification and smoothing circuit 420.

Anode terminals of the A phase and B phase main rectifier elements 423a and 423b are respectively connected to one end of A phase and B phase main secondary windings 332a and 332b.

On the other hand, cathode terminals of the A phase main rectifier elements 423a and 423b are connected to the same end of the choke coil 325, and the other end of the choke coil 325 is connected to an output terminal 327.

Common terminals of the A phase and B phase main secondary windings 332a and 332b act as a ground terminal 328.

An output capacitor 326 and a load 329 are connected in parallel across the output terminal 327 and the ground terminal 328.

The secondary side of main rectification and smoothing circuit 420 is constructed as described above, and since the A phase and B phase main rectifier elements 423a and 423b do not have gate terminals, they are not connected to the control circuit 340.

The remaining circuit blocks and wiring of the power supply 4 of FIG. 25 are the same as in the power supply 3 of FIG. 15, and so the same circuit blocks and the same elements have the same reference numerals attached thereto, and description will be omitted.

Figure 34:
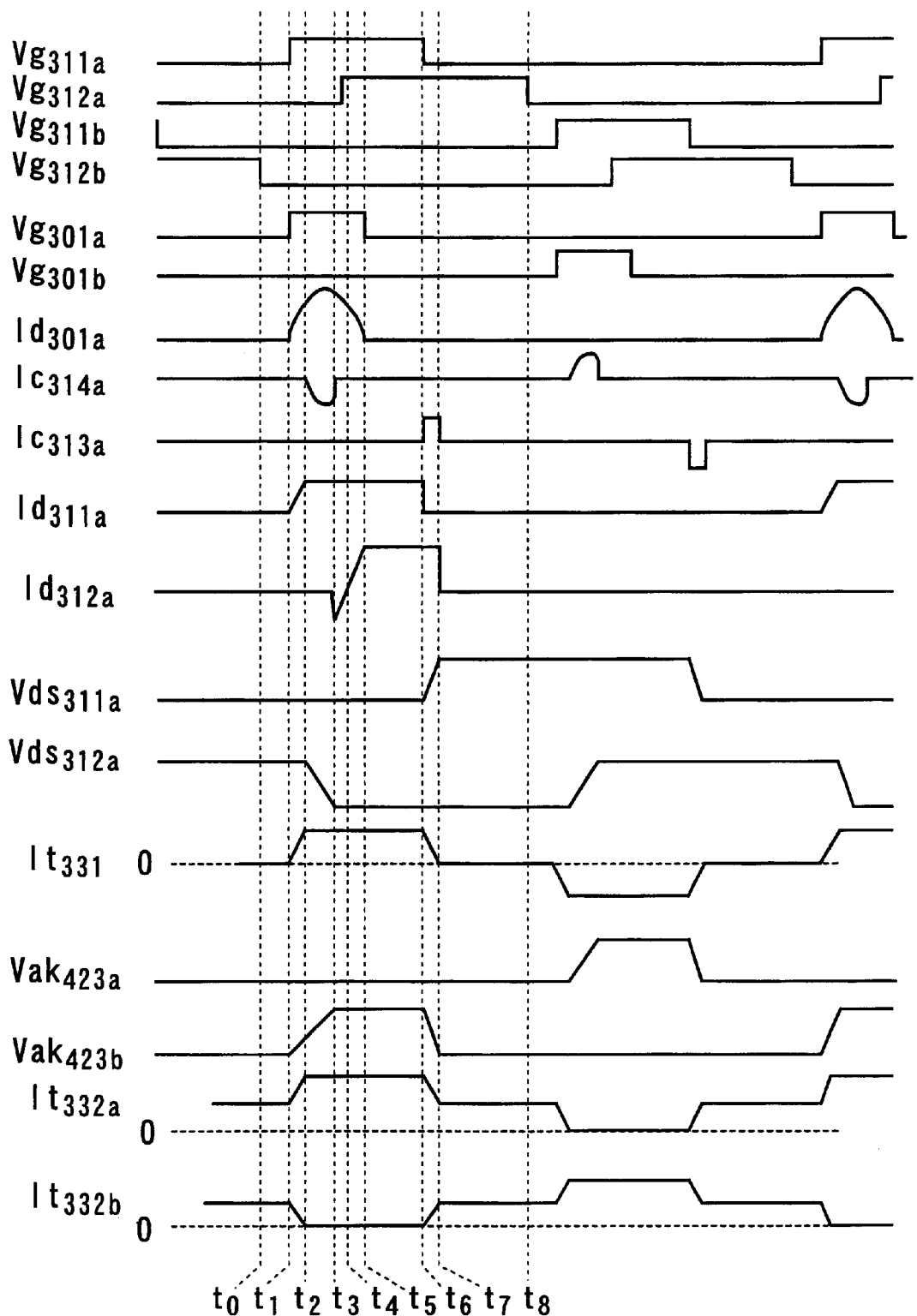
FIG. 34 is a timing chart showing operation of the power supply of the fourth embodiment.

FIG. 34 is a timing chart showing circuit operation of this power supply 4. $Vak_{423a}$ and $Vak_{423b}$ represent voltages across the anodes and cathodes of the main rectifier elements 423a and 423b, with a reverse bias condition being positive. Also in FIG. 34, $t_0$–$t_8$ represent times for the same states as times $t_0$–$t_8$ in the timing chart of FIG. 24.

Figure 26:
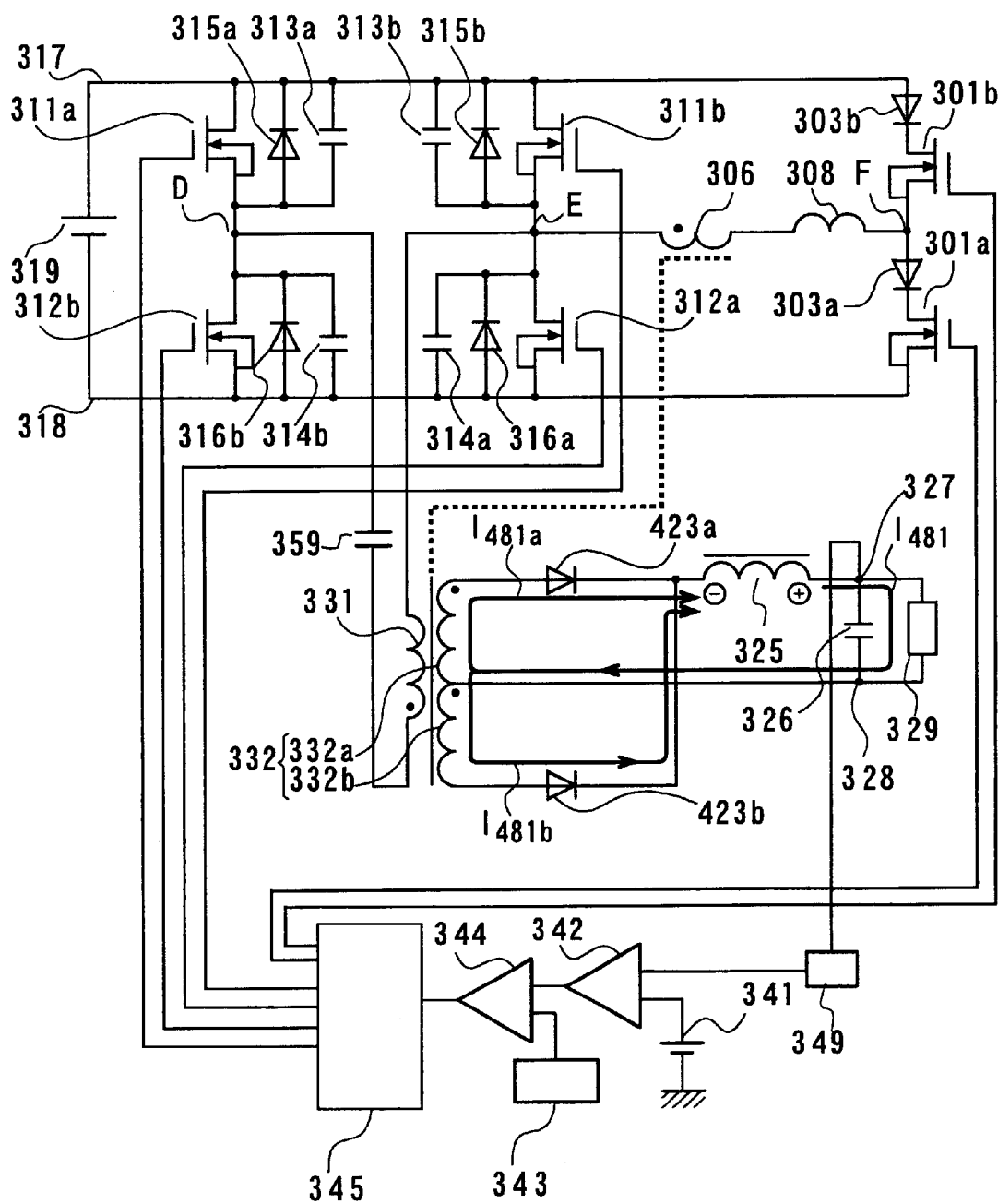
FIG. 26 is a first drawing for describing current flow in the power supply of the fourth embodiment.

The operation of this power supply 4 will now be described. First of all, in a steady operation, with the main switching elements 311a, 311b, 312a and 312b being off, currents $I_{481a}$ and $I_{482b}$ of equal magnitude respectively flow in the main rectifier elements 423a and 423b, as shown in FIG. 26, due to energy stored in the choke coil 325.

Figure 27:
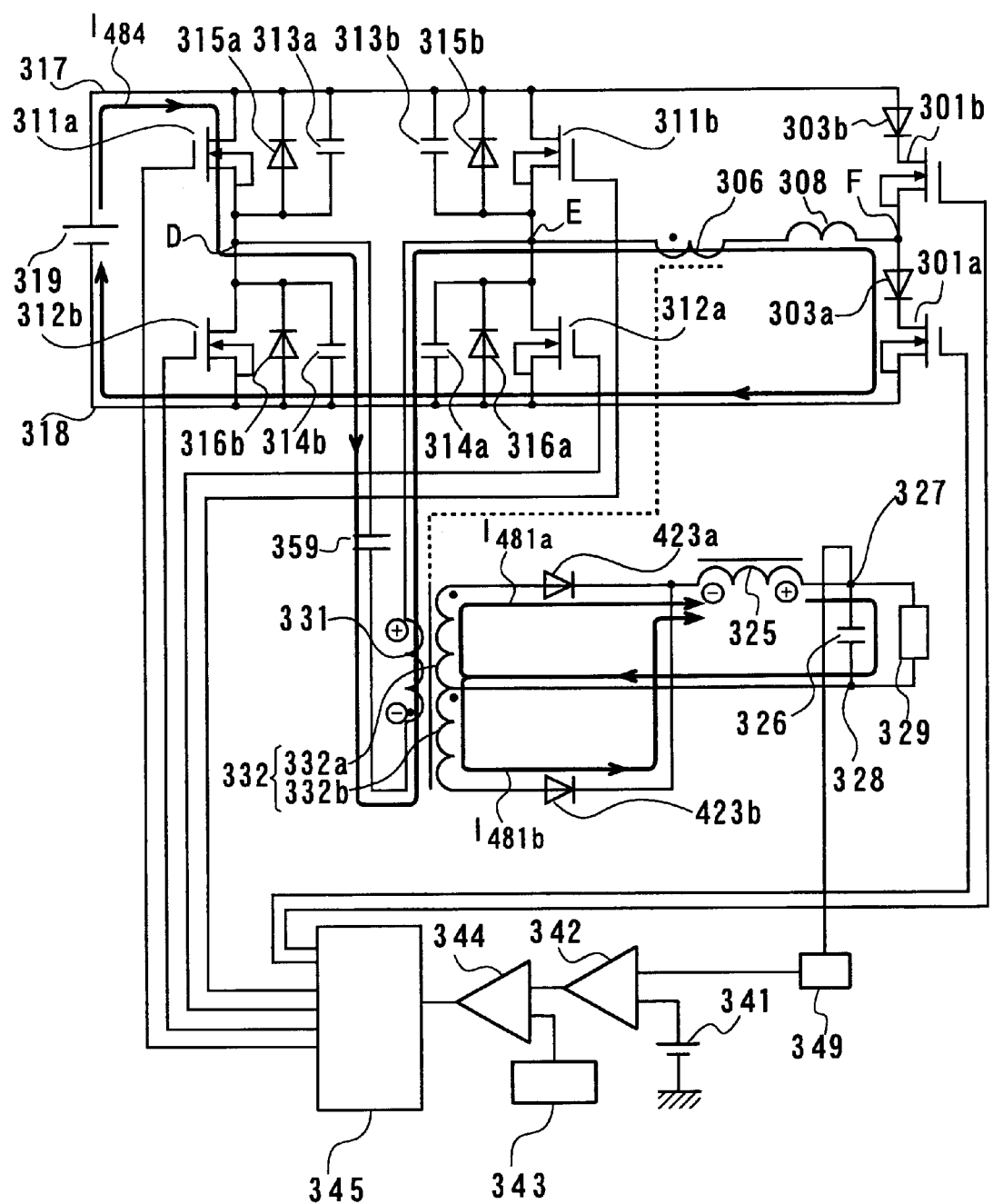
FIG. 27 is a second drawing for describing current flow in the power supply of the fourth embodiment.

Next, the A phase main switching element 315a and the A phase sub switching element 301a are tuned on, and currents $I_{484}$ flows in the main primary winding 311, as shown in FIG. 27.

Figure 28:
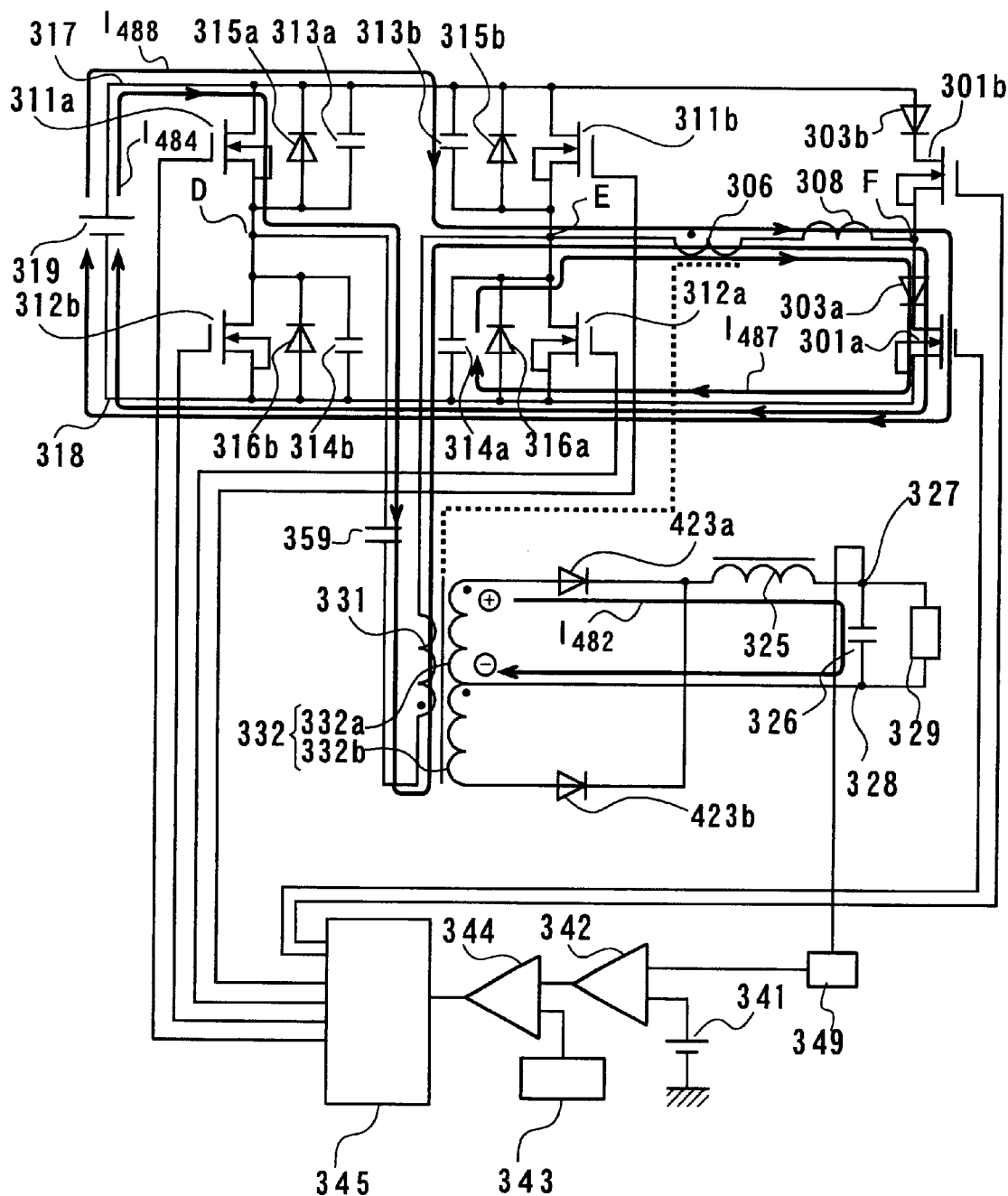
FIG. 28 is a third drawing for describing current flow in the power supply of the fourth embodiment.

When the current $I_{484}$ supplied from the D.C. voltage source 319 is increased, current $I_{481b}$ flowing in the B phase rectifier element 423b is reduces and at time $t_2$ when the current $I_{481a}$ flowing in the A phase rectifier element 423a increases, the current $I_{481b}$ flowing in the rectifier 423b becomes zero. Also, the resonance capacitor 314a is discharged, and as shown in FIG. 28 current $I_{487}$ flows in the resonance coil 308 and current flowing in the resonance coil 308 increases. Also, a voltage is induced in the auxiliary primary winding 306 and the main secondary winding 332.

Accompanying a drop in the voltage of the resonance capacitor 314a, current $I_{488}$ is supplied from the D.C. voltage source 319 and the B phase supply side resonance capacitor 313b is charged up.

Figure 29:
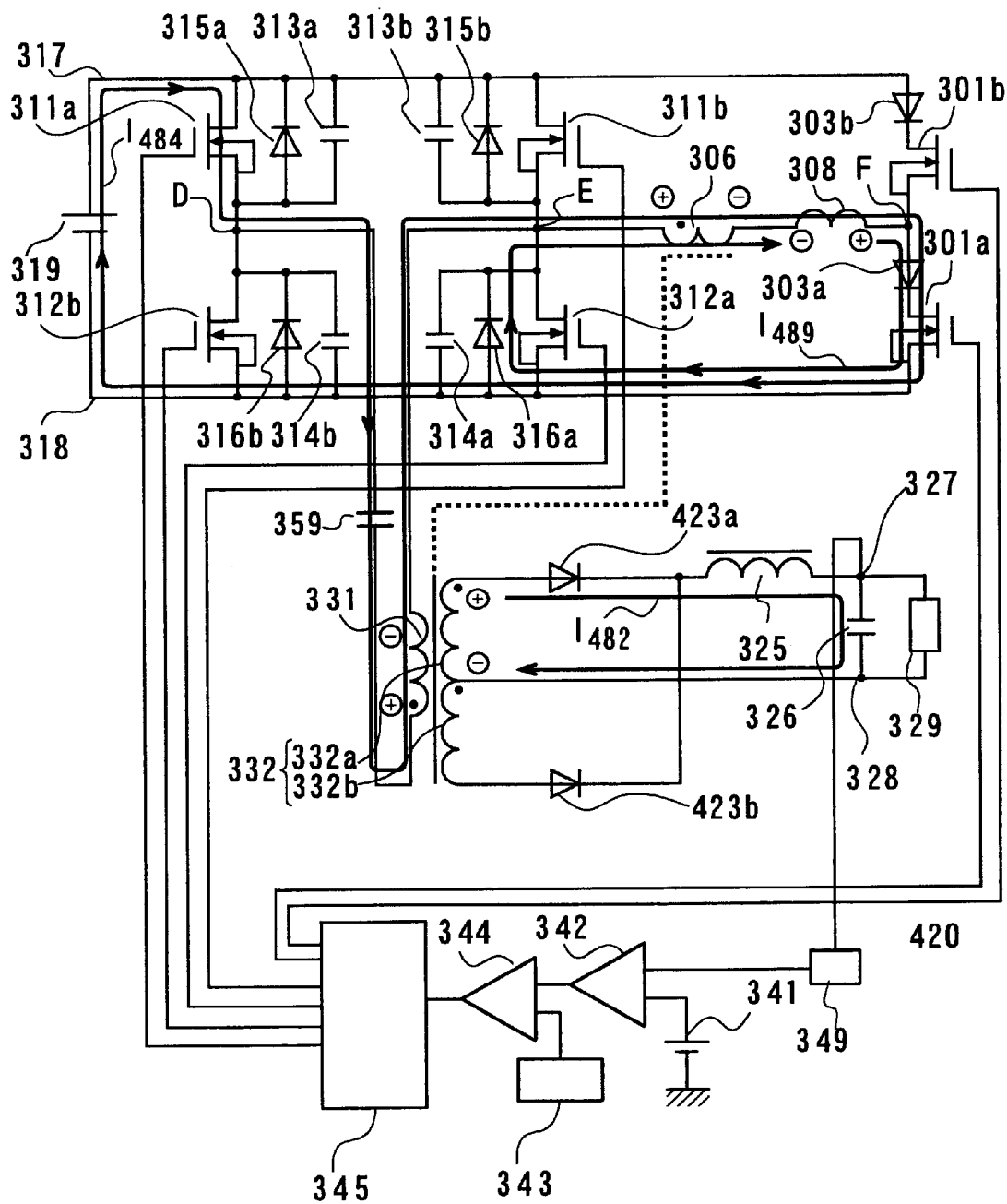
FIG. 29 is a fourth drawing for describing current flow in the power supply of the fourth embodiment.

Next, the resonance coil 308 is discharged due to resonant operation of the resonance capacitor 314a and the resonance coil 308, and as shown in FIG. 29 current $I_{489}$ flows in the parasitic diode 316a.

Figure 30:
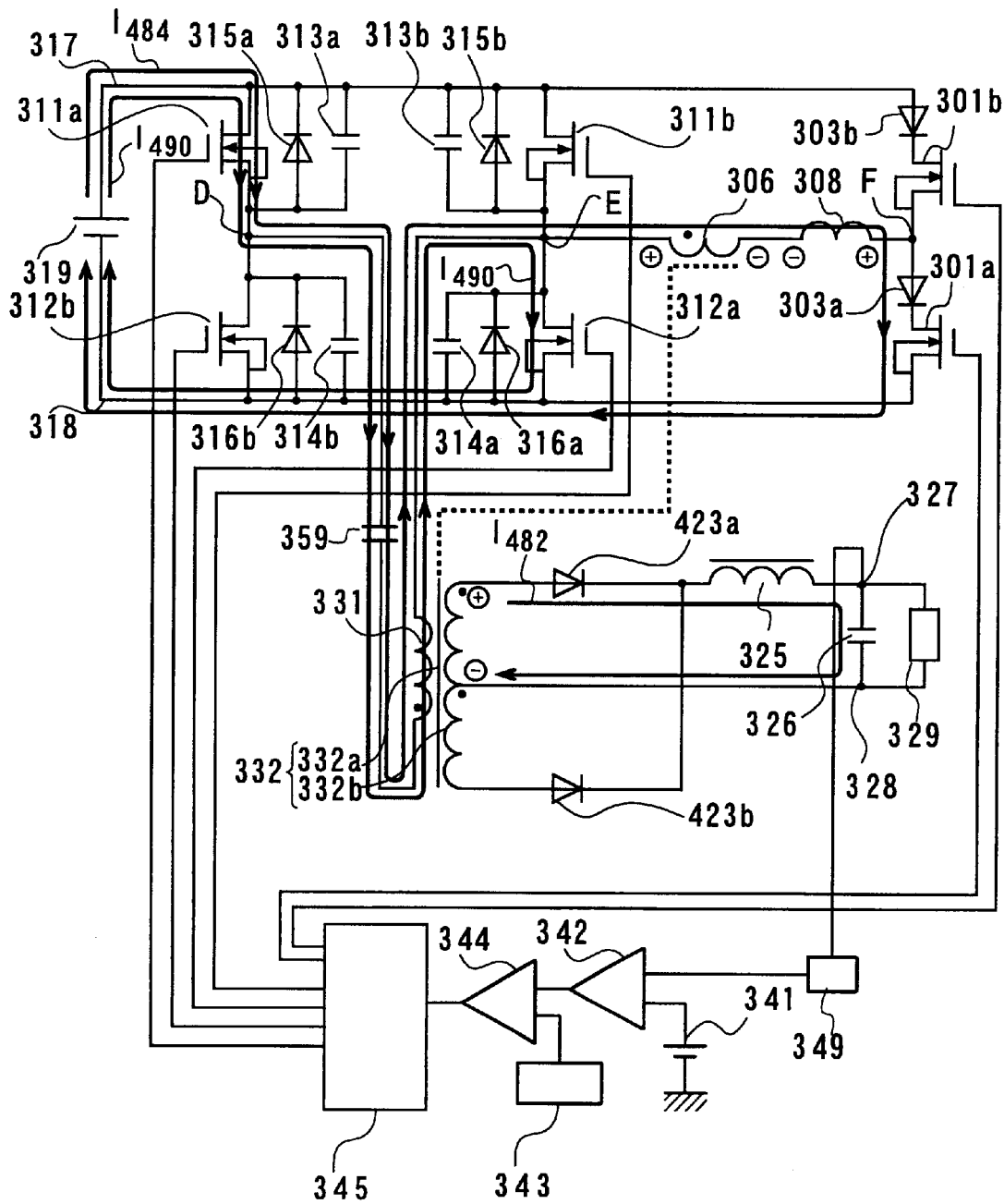
FIG. 30 is a fifth drawing for describing current flow in the power supply of the fourth embodiment.

In this state, when the A phase ground side main switching element 312a is turned on, current $I_{490}$ is supplied from the D.C. voltage source 319 to the main primary winding 331, as shown in FIG. 30.

Figure 31:
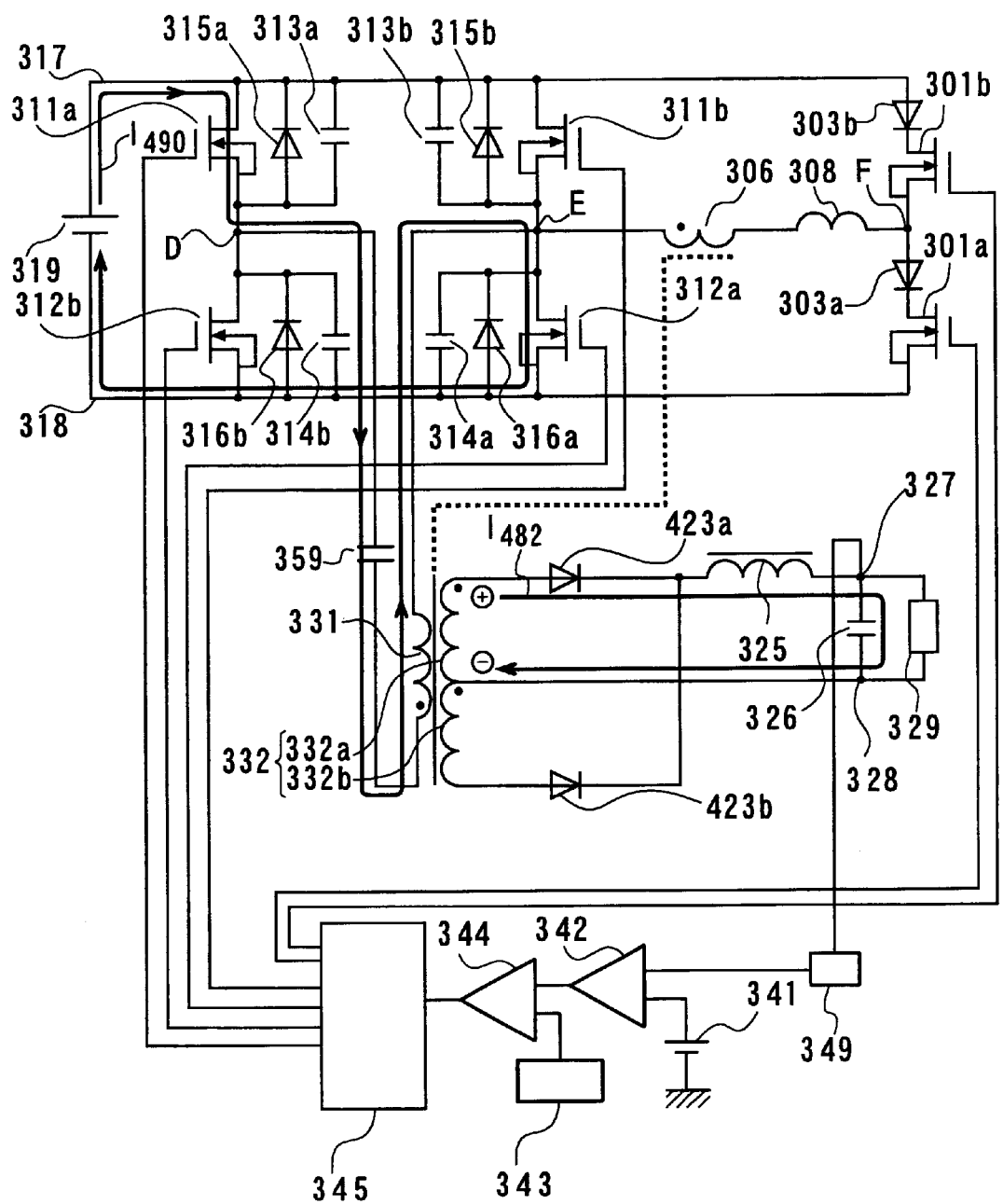
FIG. 31 is a sixth drawing for describing current flow in the power supply of the fourth embodiment.

The auxiliary rectifier element 303a is forward biased by the voltage induced in the auxiliary primary winding 306, and the current flowing in the resonance coil 308 becomes zero, as shown in FIG. 31. In the main secondary winding 332 side, energy is transferred to the A phase main secondary winding 332a and current is supplied to the choke coil 325.

Figure 32:
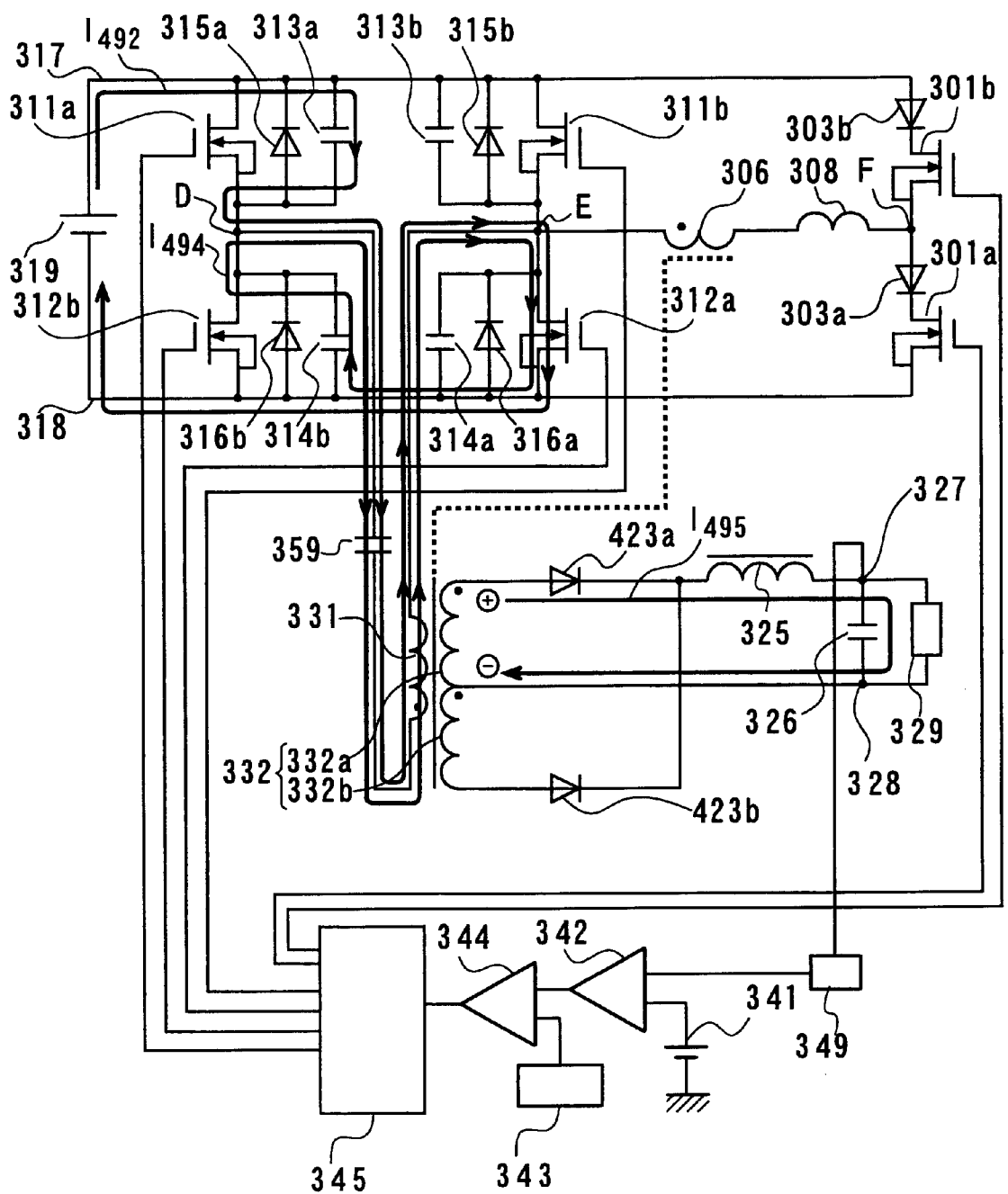
FIG. 32 is a seventh drawing for describing current flow in the power supply of the fourth embodiment.

From the state where the A phase main switching elements 311a and 312a are on, when the control circuit 340 first of all causes the A phase supply side main switching element 311a to be off, current $I_{492}$ for charging the resonance capacitor 313a connected in parallel with that main switching element 311a flows, as shown in FIG. 32. At the same time, the B phase ground side resonance capacitor 314b is discharged and current $I_{494}$ flows.

Figure 33:
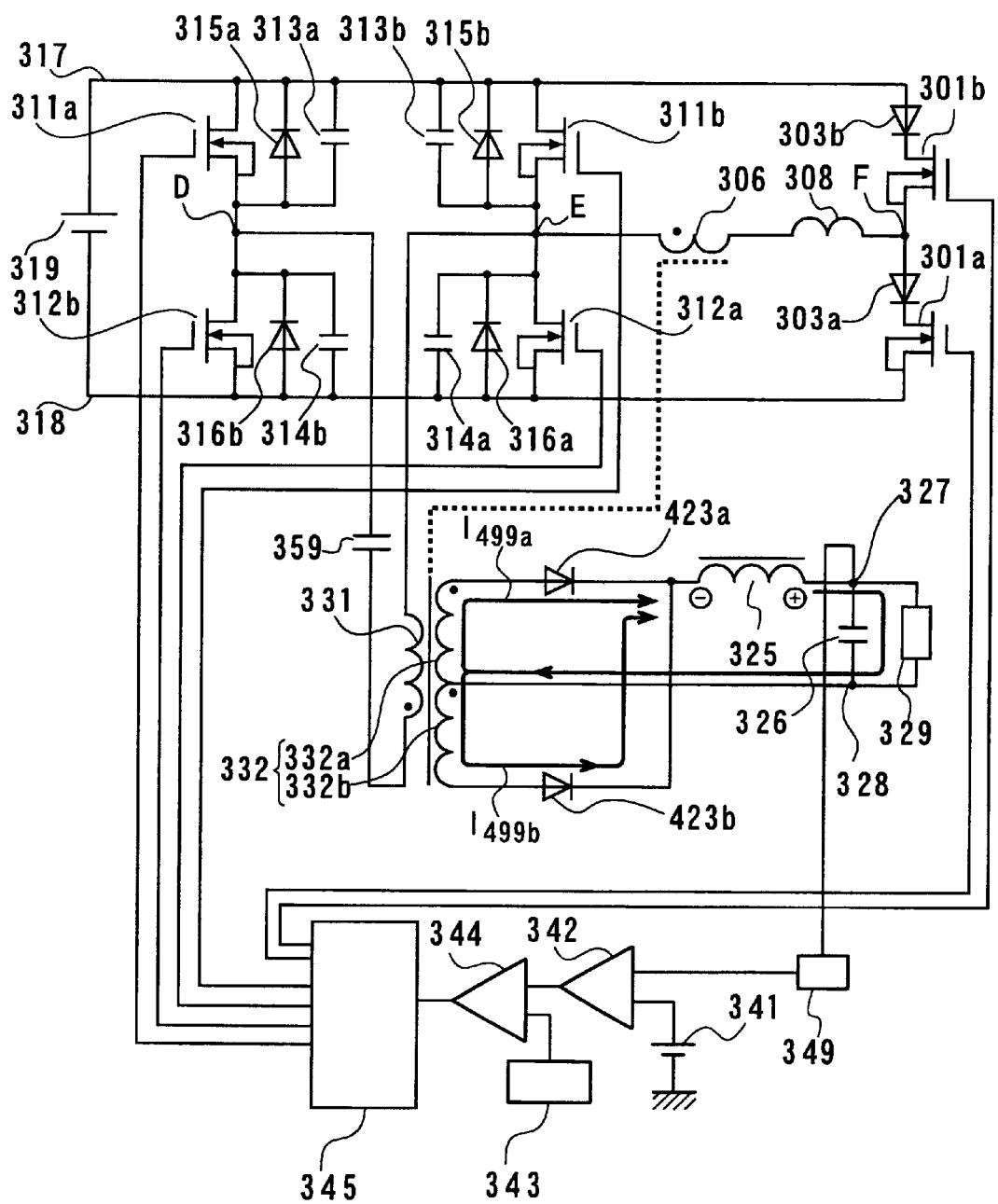
FIG. 33 is an eighth drawing for describing current flow in the power supply of the fourth embodiment.

When the current flowing in the main primary winding 331 is reduced, electromotive force is generated in the choke coil 325, and as shown in FIG. 33 currents $I_{499a}$ and $I_{499b}$ respectively flow in the A phase main secondary winding 332a and the B phase main secondary winding 332b.

Currents $I_{499}$ and $I_{499b}$ flowing in the A phase main secondary winding 332a and the B phase main secondary winding 332b are the same size, and since the number of turns of the A phase main secondary winding 332a and the number of turns of the B phase main secondary winding 332b are made the same, voltages induced in the main primary winding 331 cancel each other out and electromotive force does not arise in the main primary winding 331. This state is the same as the state shown in FIG. 26.

Next, after the B phase ground side main switching element 312b and the B phase sub switching element 301b have been turned on, the B phase supply voltage side main switching element 311b is turned on. When each of the B phase main switching element 311b, 312b and 301b are operating, the current flowing in the main primary winding 331, auxiliary primary winding 306 and resonance coil 308 is in the opposite direction to that during the A phase operation, and in the secondary side current flows in the B phase main secondary winding 332b, but the basic operation and ways in which the currents flow are the same as those for the A phase, and so description will be omitted.

In each of the above described embodiments, one end of the auxiliary primary winding 306 is connected to a second output point E of the main bridge circuit 310 and the other end of the auxiliary primary winding 306 is connected to a connection point F via the resonance coil 308, but the reverse is also possible, namely connecting one end of the resonance coil 308 to the second output point E and connecting the other end of the resonance coil 308 to the connection point F via the auxiliary primary winding 306. It is also possible to connect to the first output point D instead of the second output point E.

Also, the auxiliary rectifier elements 303a and 303b are connected to the drain terminal side of the sub switching elements 301a and 301b, but they can be connected to the source terminal side.

In each of the above described embodiments, one end of the main primary winding 331 is connected to the first output point D of the main bridge circuit 310 via a capacitor 359 for preventing offset excitation, but it is also possible for the capacitor 359 to be inserted between one end of the main primary winding 331 and either one or both of the first and second output terminals D and E. When there is no offset excitation, it is also possible to omit the capacitor 359.

Further, in each of the above described embodiments, the MOSFETs used are n-channel MOSFETs, but p-channel MOSFETs can also be used, and it is also possible to use both n-channel MOSFETs and p-channel MOSFETs in a single power supply.

Figure 35:
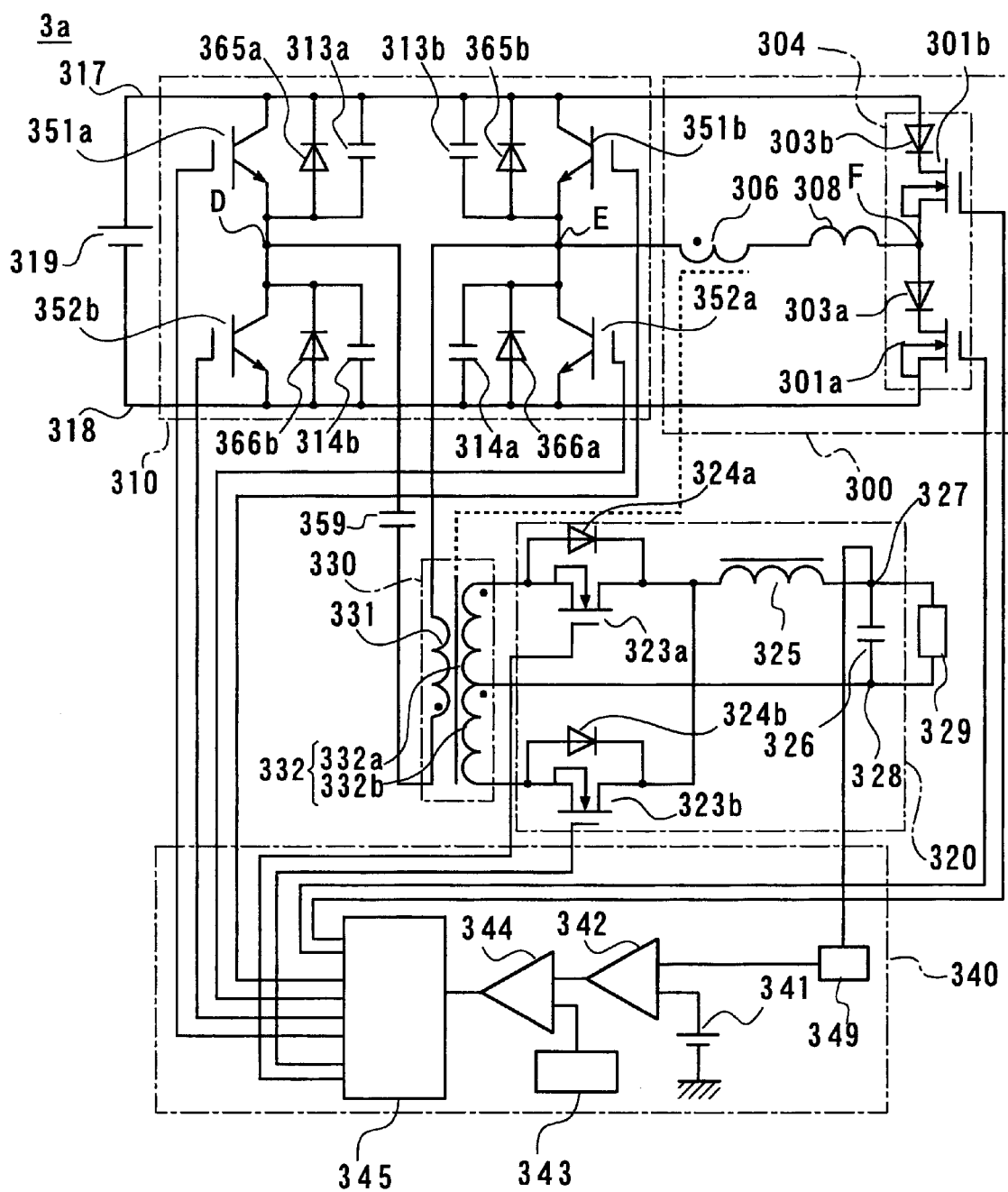
FIG. 35 is a drawing showing an example of the present invention when IGBTs are used.
Figure 36:
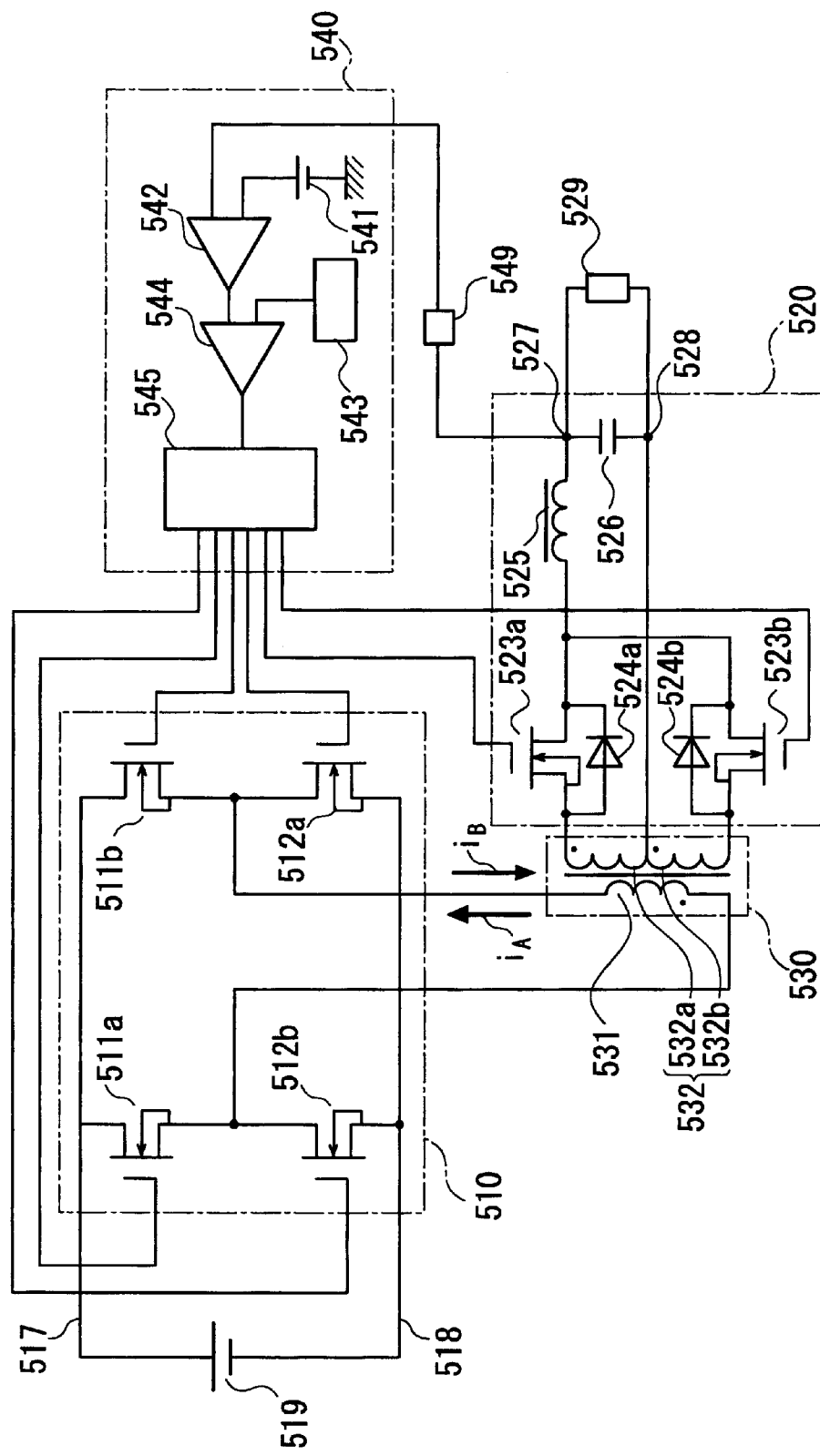
FIG. 36 is a circuit block diagram showing a related art of the present invention.
Figure 37:
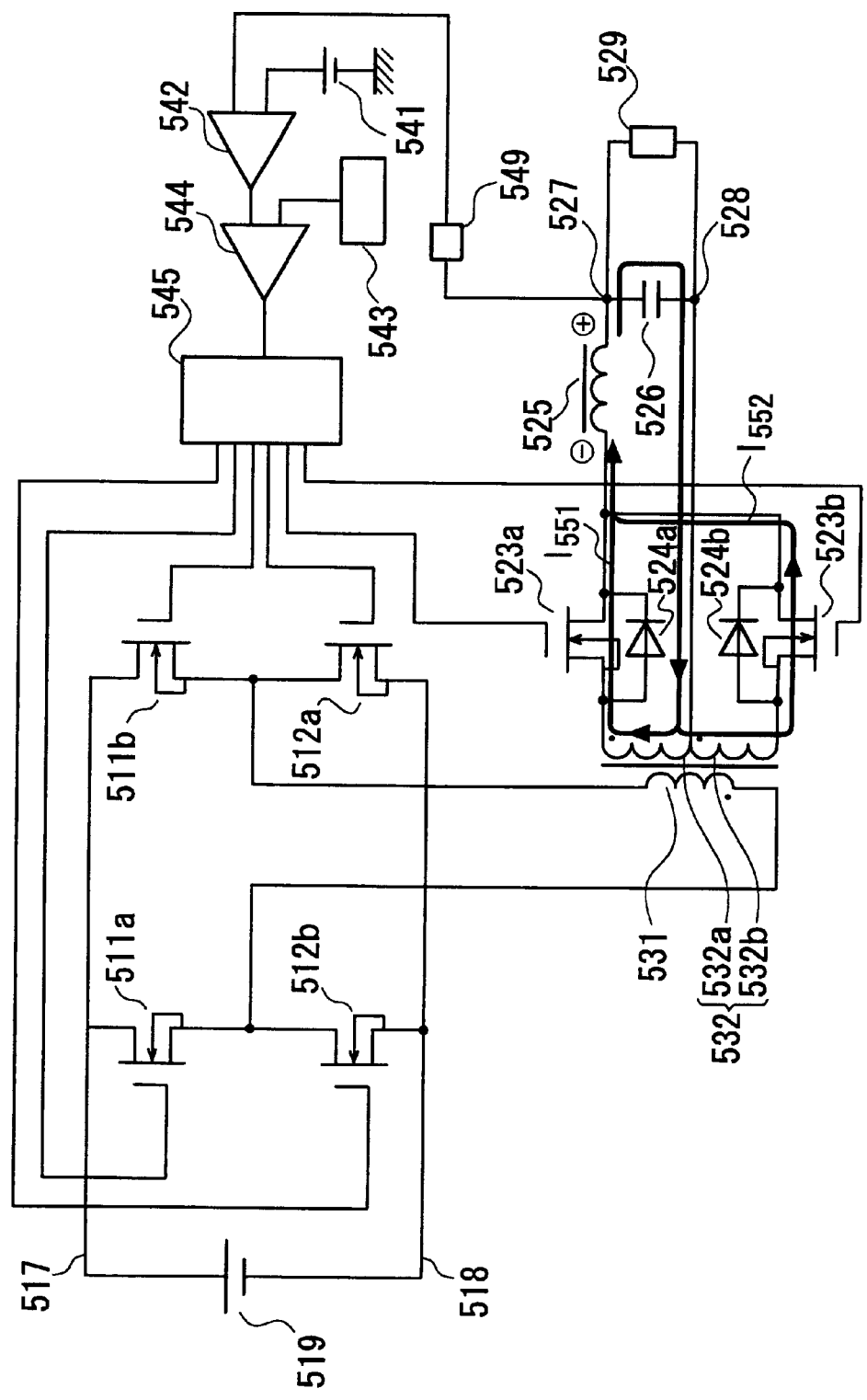
FIG. 37 is a first drawing for describing current flow in the power supply of the related art.
Figure 38:
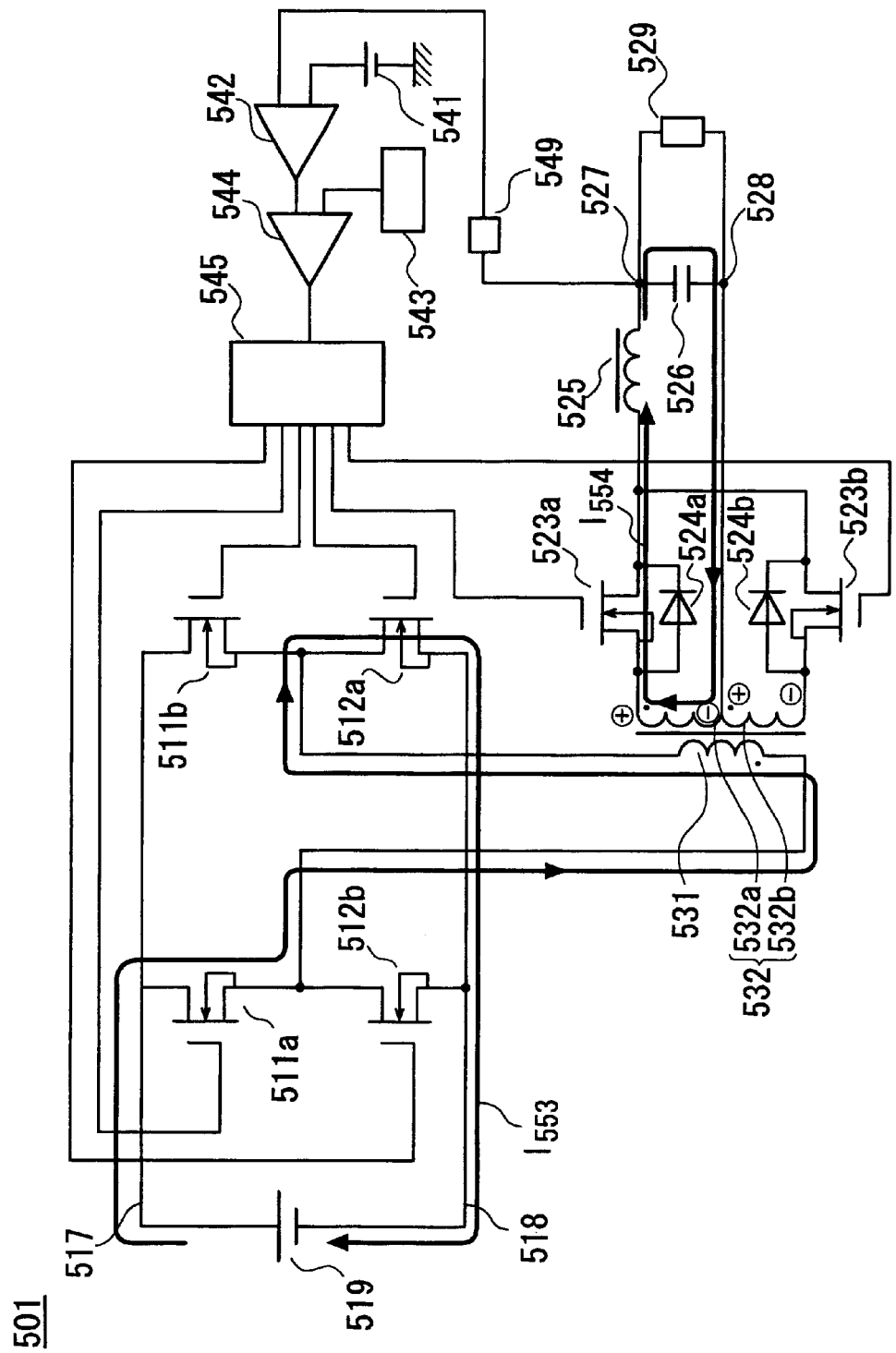
FIG. 38 is a second drawing for describing current flow in the power supply of the related art.
Figure 39:
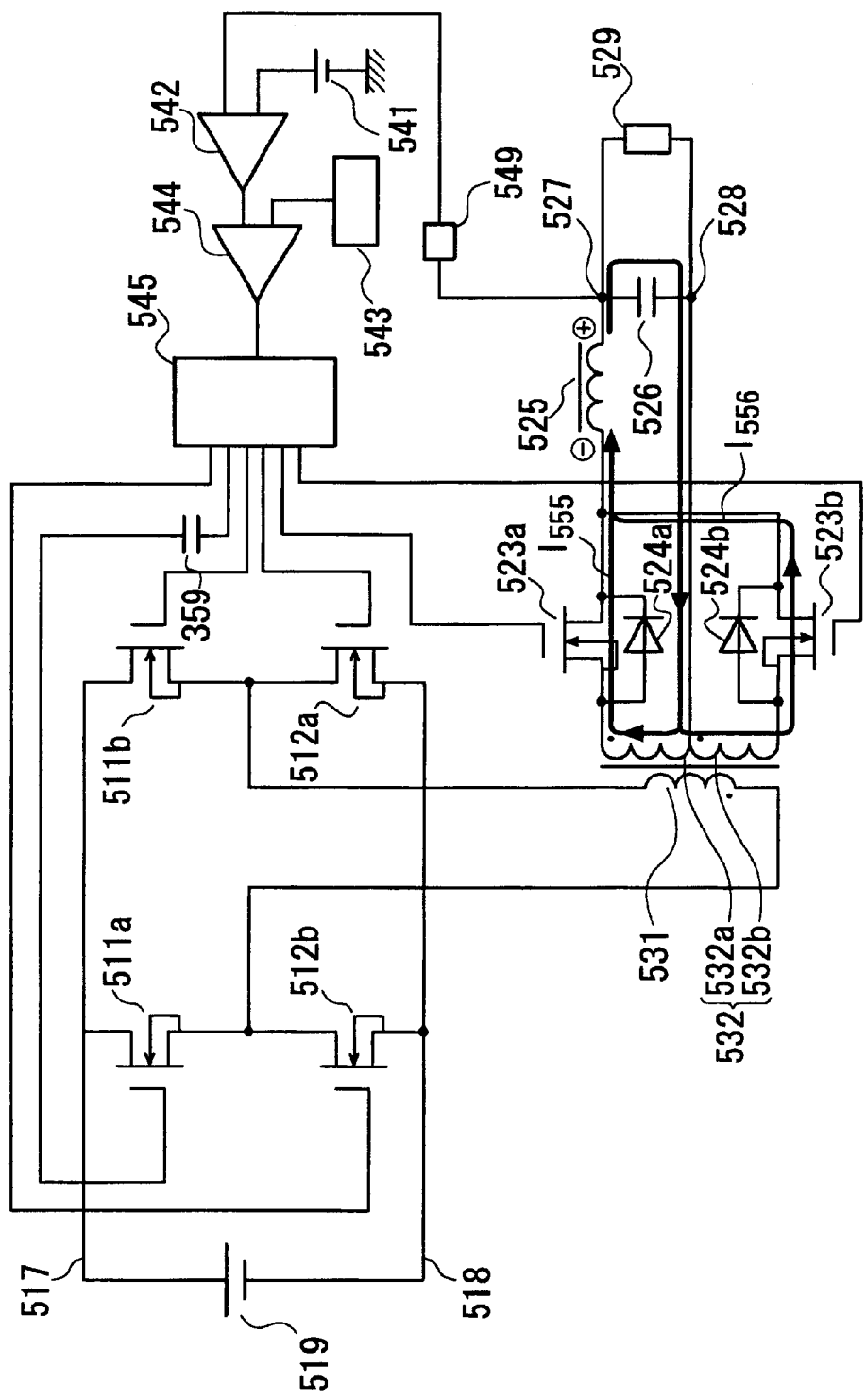
FIG. 39 is a third drawing for describing current flow in the power supply of the related art.
Figure 40:
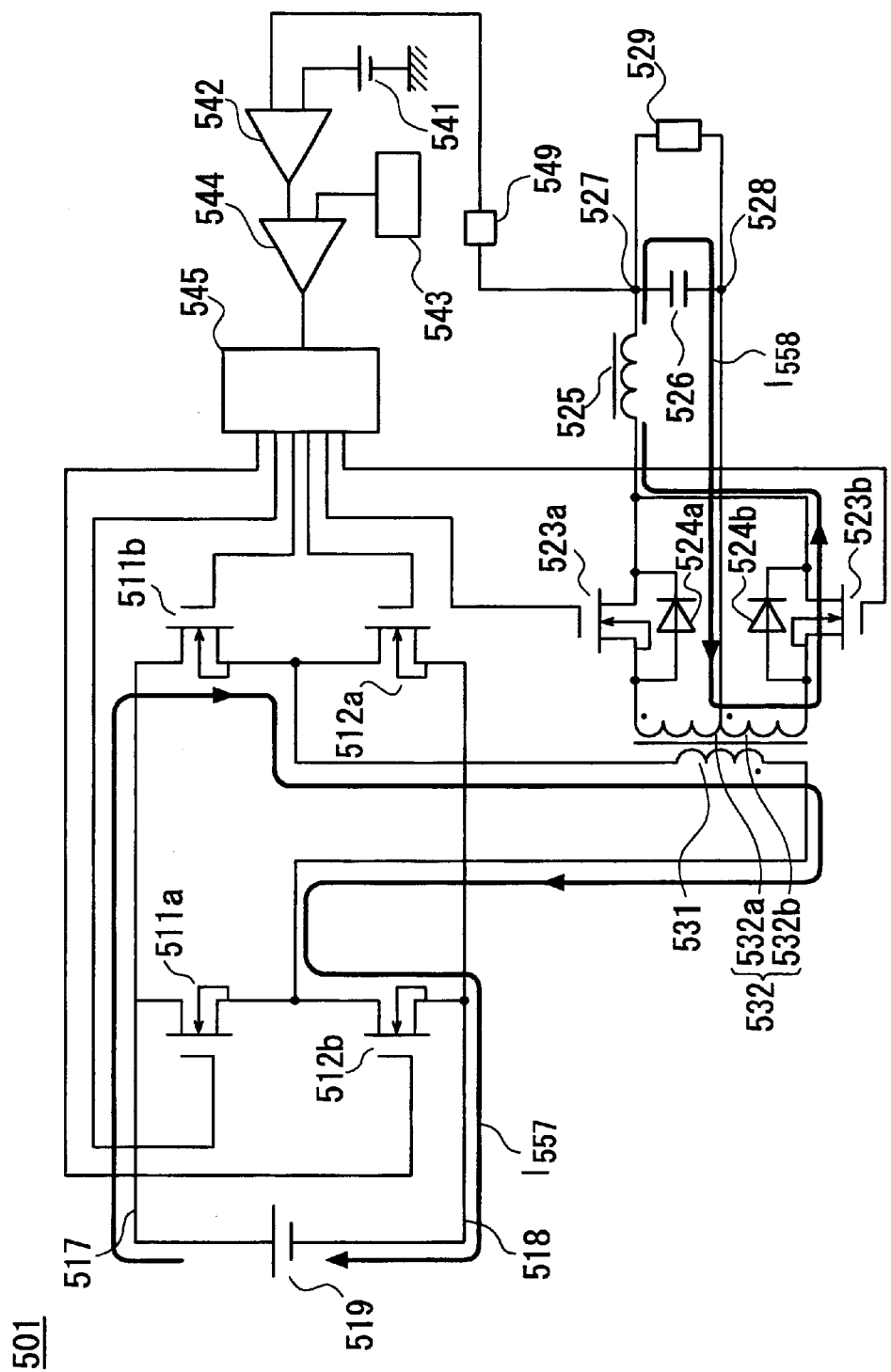
FIG. 40 is a fourth drawing for describing current flow in the power supply of the related art.
Figure 41:
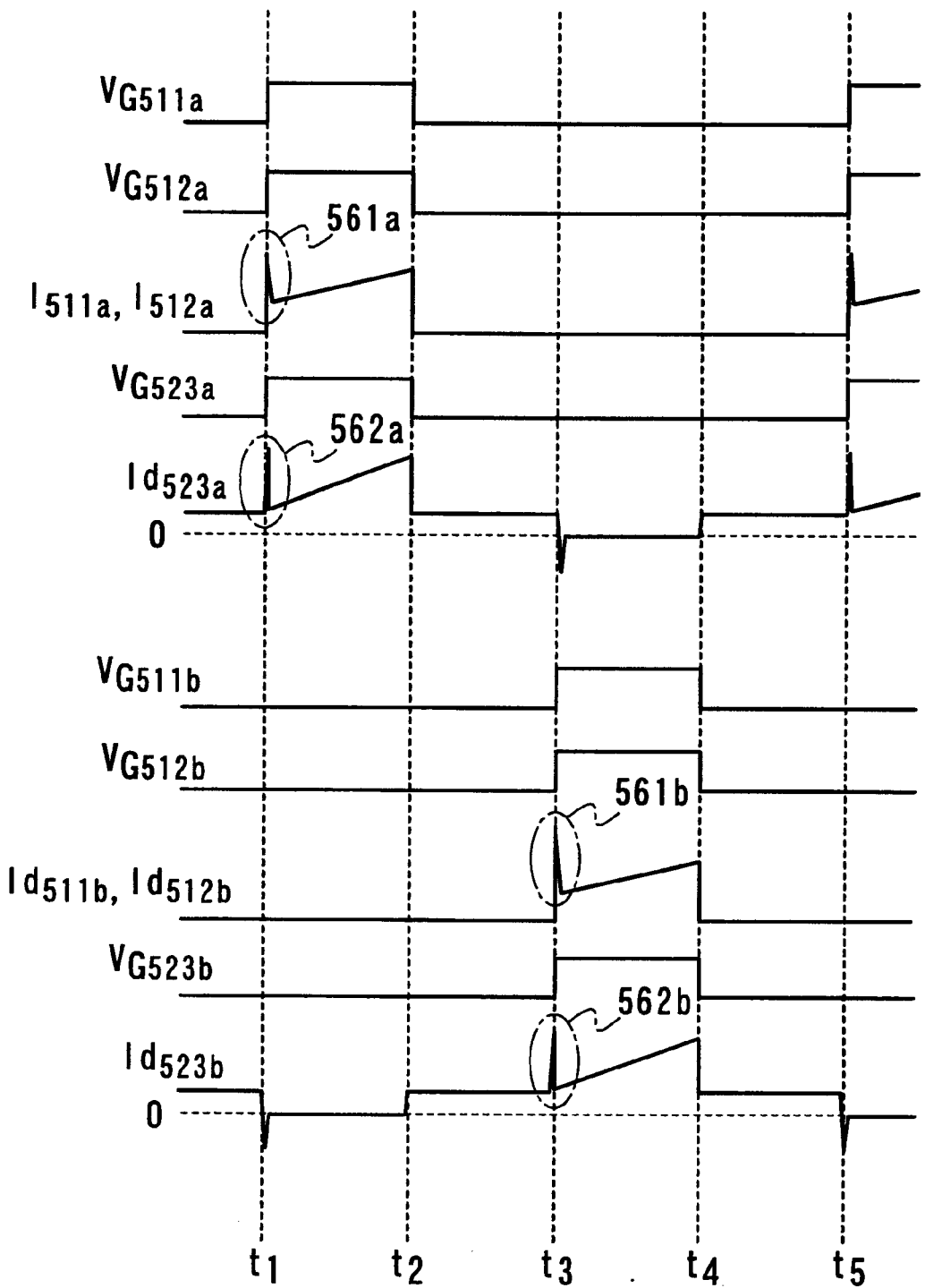
FIG. 41 is a timing chart showing the operation of the power supply of the related art.
Figure 42:
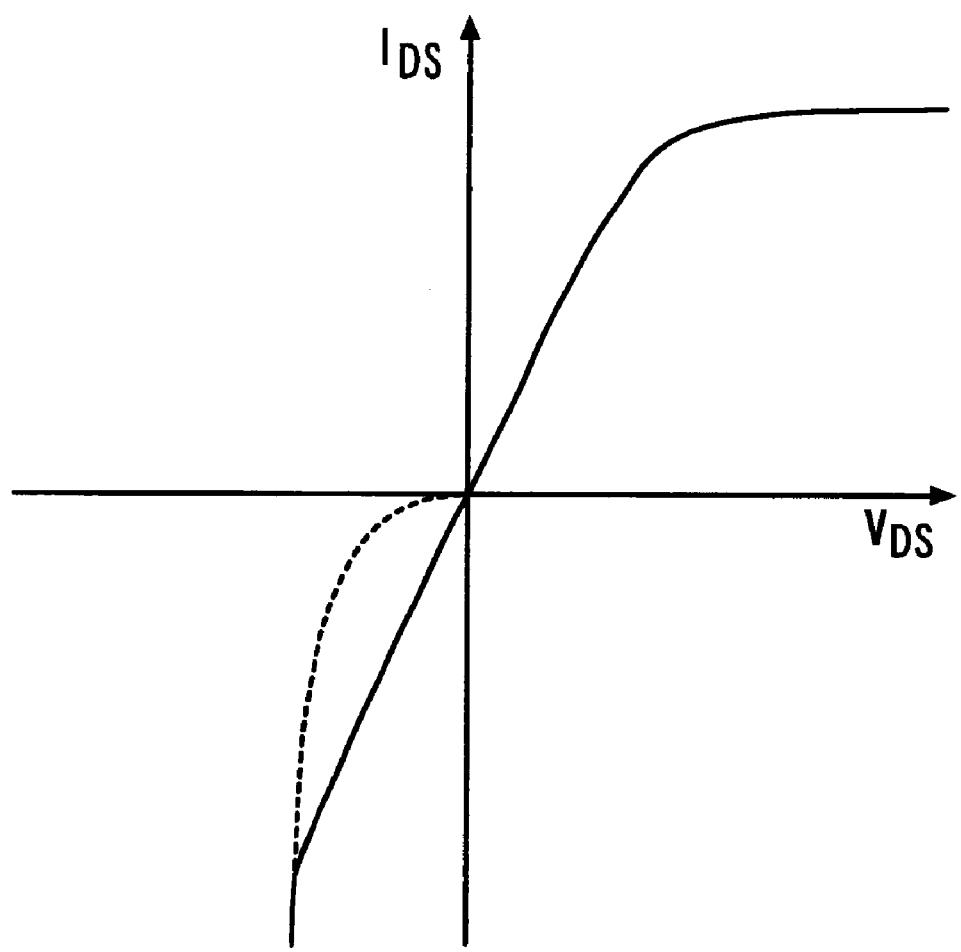
FIG. 42 is a graph for describing third quadrant operation of a MOSFET.

The main switching elements are not limited to using MOSFETs. Reference numeral 3a in FIG. 35 is a power supply which uses IGBTs in the main switching elements, with four IGBTs 351a, 351b, 352a and 352b being bridge connected.

When IGBTs are used, it is not possible to utilize an internal parasitic diode, and so external diode elements 365a, 365b, 366a and 366b are reverse parallel connected across each IGBT 351a, 351b, 352a and 352b, so that the operation is the same as when using MOSFETs.

It is also possible to use bipolar transistors instead of IGBTs. In this case also, it is necessary to reverse parallel connect diode elements across each bipolar transistor, but as the IGBTs in the power supply 3a in FIG. 35 can simply be replaced by bipolar transistors (NPN type bipolar transistors), the circuit diagram will be omitted.

What is claimed is:

1. A power supply, comprising:
   a main bridge circuit, having four main switching elements bridge connected, connected so as to supply current from a D.C. voltage source;
   a main primary winding located inside a main transformer and H-bridge connected to said main bridge circuit;
   A phase and B phase main secondary windings located inside said main transformer and magnetically coupled to said main primary winding;
   a main rectification and smoothing circuit for rectifying and smoothing a voltage induced in said A phase and B phase main secondary windings and supplying power to a load;
   a resonance capacitor connected in parallel with each of said main switching elements;
   a rectifier element inversely connected in parallel with each of said main switching elements;
   an A phase sub switching element and a B phase sub switching element connected in series with each other, with said series circuit connected in parallel with said main bridge circuit;
   a resonance coil between one end of said main primary winding and a connection point between said A phase sub switching element and said B phase sub switching element;
   a sub primary winding connected in series with said resonance coil and inserted between said connection point and the one end of said main primary winding; and
   a sub secondary winding magnetically coupled to said sub primary winding, and constructed so as to have a voltage induced by current flowing in said sub primary winding.

2. The power supply of claim 1, wherein said sub secondary winding applies current to said D.C. voltage source using an induced voltage.

3. The power supply of claim 2, wherein said resonance capacitor consists of a capacitance component of said main switching element.

4. The power supply of claim 2, wherein said resonance coil consists of a leakage inductance component of said sub primary winding.

5. The power supply of claim 2, further comprising:
   an A phase sub secondary winding and a B phase sub secondary winding constituting said sub secondary winding; and
   A phase and B phase sub rectifier elements for rectifying a voltage induced in said A phase and B phase sub secondary windings, wherein
   approximately the output voltage of said D.C. voltage source is applied to both ends of said A phase sub secondary winding or said B phase sub secondary winding when said A phase sub rectifier elements or said B phase sub rectifier elements are conducting.

6. The power supply of claim 2, wherein each of said main switching elements consists of a MOSFET and said inversely parallel connected rectifier elements consist of parasitic diodes inside each of said MOSFETS.

7. The power supply device of claim 2, wherein each of said main switching element consists of an IGBT.

8. The power supply of claim 2, wherein said main rectification and smoothing circuit comprises:
   A phase and B phase main rectifier elements for rectifying a voltage induced in said A phase and B phase main secondary windings; and
   a choke coil for smoothing a voltage output by said A phase and B phase main rectifier elements and supplying said voltage to a load.

9. The power supply of claim 1, wherein said sub secondary winding supplies power to a load using an induced voltage.

10. The power supply of claim 9, wherein said resonance capacitor consists of a capacitance component of said main switching element.

11. The power supply of claim 9, wherein said resonance coil consists of a leakage inductance component of said sub primary winding.

12. The power supply of claim 9, wherein each of said main switching elements consists of a MOSFET and said inversely parallel connected rectifier elements consist of parasitic diodes inside each of said MOSFETS.

13. The power supply device of claim 9, wherein each of said main switching element consists of an IGBT.

14. The power supply of claim 9, wherein said main rectification and smoothing circuit comprises:
   A phase and B phase main rectifier elements for rectifying a voltage induced in said A phase and B phase main secondary windings; and
   a choke coil for smoothing a voltage output by said A phase and B phase main rectifier elements and supplying said voltage to a load.

15. The power supply of claim 1, wherein said sub secondary winding is connected to a power consumption circuit and power is consumed by current flows in said power consumption circuit due to an induced voltage in said sub secondary winding.

16. The power supply of claim 15, wherein said resonance capacitor consists of a capacitance component of said main switching element.

17. The power supply of claim 16, further comprising:
   an A phase sub secondary winding and a B phase sub secondary winding constituting said sub secondary winding; and
   A phase and B phase sub rectifier elements for rectifying a voltage induced in said A phase and B phase sub secondary windings, wherein
   approximately the output voltage of said D.C. voltage source is applied to both ends of said A phase sub secondary winding or said B phase sub secondary winding when said A phase sub rectifier elements or said B phase sub rectifier elements are conducting.

18. The power supply of claim 15, wherein said resonance coil consists of a leakage inductance component of said sub primary winding.

19. The power supply of claim 18, further comprising:
   an A phase sub secondary winding and a B phase sub secondary winding constituting said sub secondary winding; and
   A phase and B phase sub rectifier elements for rectifying a voltage induced in said A phase and B phase sub secondary windings, wherein approximately the output voltage of said D.C. voltage source is applied to both ends of said A phase sub secondary winding or said B phase sub secondary winding when said A phase sub rectifier elements or said B phase sub rectifier elements are conducting.

20. The power supply of claim 15, further comprising:
an A phase sub secondary winding and a B phase sub secondary winding constituting said sub secondary winding; and
A phase and B phase sub rectifier elements for rectifying a voltage induced in said A phase and B phase sub secondary windings, wherein
approximately the output voltage of said D.C. voltage source is applied to both ends of said A phase sub secondary winding or said B phase sub secondary winding when said A phase sub rectifier elements or said B phase sub rectifier elements are conducting.

21. The power supply of claim 15, wherein each of said main switching elements consists of a MOSFET and said inversely parallel connected rectifier elements consist of parasitic diodes inside each of said MOSFETS.

22. The power supply device of claim 15, wherein each of said main switching element consists of an IGBT.

23. The power supply of claim 15, wherein said main rectification and smoothing circuit comprises:
A phase and B phase main rectifier elements for rectifying a voltage induced in said A phase and B phase main secondary windings; and
a choke coil for smoothing a voltage output by said A phase and B phase main rectifier elements and supplying said voltage to a load.

24. The power supply of claim 1, wherein said resonance capacitor consists of a capacitance component of said main switching element.

25. The power supply of claim 24, wherein said resonance coil consists of a leakage inductance component of said sub primary winding.

26. The power supply of claim 25, further comprising:
an A phase sub secondary winding and a B phase sub secondary winding constituting said sub secondary winding; and
A phase and B phase sub rectifier elements for rectifying a voltage induced in said A phase and B phase sub secondary windings, wherein
approximately the output voltage of said D.C. voltage source is applied to both ends of said A phase sub secondary winding or said B phase sub secondary winding when said A phase sub rectifier elements or said B phase sub rectifier elements are conducting.

27. The power supply of claim 1, wherein said resonance coil consists of a leakage inductance component of said sub primary winding.

28. The power supply of claim 1, further comprising:
an A phase sub secondary winding and a B phase sub secondary winding constituting said sub secondary winding; and
A phase and B phase sub rectifier elements for rectifying a voltage induced in said A phase and B phase sub secondary windings, wherein
approximately the output voltage of said D.C. voltage source is applied to both ends of said A phase sub secondary winding or said B phase sub secondary winding when said A phase sub rectifier elements or said B phase sub rectifier elements are conducting.

29. The power supply of claim 1, wherein each of said main switching elements consists of a MOSFET and said inversely parallel connected rectifier elements consist of parasitic diodes inside each of said MOSFETS.

30. The power supply device of claim 1, wherein each of said main switching element consists of an IGBT.

31. The power supply of claim 1, wherein said main rectification and smoothing circuit comprises:
A phase and B phase main rectifier elements for rectifying a voltage induced in said A phase and B phase main secondary windings; and
a choke coil for smoothing a voltage output by said A phase and B phase main rectifier elements and supplying said voltage to a load.

32. A power supply, comprising:
a main bridge circuit, having four main switching elements bridge connected, connected so as to supply current from a D.C. voltage source;
a main primary winding located inside a main transformer and H-bridge connected to an output point of said main bridge circuit;
A phase and B phase main secondary windings located inside said main transformer and magnetically coupled to said main primary winding;
a main rectification and smoothing circuit for rectifying and smoothing a voltage induced in said A phase and B phase main secondary windings;
a resonance capacitor connected in parallel with each of said main switching elements;
a rectifier element inversely connected in parallel with each of said main switching elements;
a sub bridge circuit made up of series-connected circuits comprised of a sub switching element and an auxiliary rectifier element further connected in series at a connecting point; and
an auxiliary primary winding and a resonance coil connected in series with each other, wherein
said sub bridge circuit is connected in parallel with said main bridge circuit, the circuit comprising said serially connected auxiliary primary winding and resonance coil is connected between said connecting point of said sub bridge circuit and said output point of said main bridge circuit, and said auxiliary primary winding is magnetically coupled to said main primary winding and said main secondary winding.

33. The power supply of claim 32, wherein said auxiliary primary winding is located inside said main transformer.

34. The power supply of claim 33, wherein said main rectification and smoothing circuit comprises:
A phase and B phase main rectifier elements for rectifying a voltage induced in said A phase and B phase main secondary windings; and
a choke coil in which current rectified by said A phase and B phase main rectifier elements flows.

35. The power supply of claim 33, wherein said resonance capacitor consists of a capacitance component of said main switching element.

36. The power supply of claim 33, wherein each of said main switching elements consists of a MOSFET and said inversely parallel connected rectifier elements consist of parasitic diodes inside each of said MOSFETS.

37. The power supply of claim 33, wherein said resonance coil consists of a leakage inductance component of said auxiliary primary winding.

38. The power supply device of claim 33, wherein each of said main switching elements consists of an IGBT.

39. The power supply of claim 32, wherein said resonance capacitor consists of a capacitance component of said main switching element.

40. The power supply of claim 39, wherein said resonance coil consists of a leakage inductance component of said auxiliary primary winding.

41. The power supply of claim 39, wherein each of said main switching elements consists of a MOSFET and said inversely parallel connected rectifier elements consist of parasitic diodes inside each of said MOSFETS.

42. The power supply device of claim 39, wherein each of said main switching elements consists of an IGBT.

43. The power supply of claim 39, wherein said main rectification and smoothing circuit comprises:

A phase and B phase main rectifier elements for rectifying a voltage induced in said A phase and B phase main secondary windings; and a choke coil in which current rectified by said A phase and B phase main rectifier elements flows.

44. The power supply of claim 32, wherein said resonance coil consists of a leakage inductance component of said auxiliary primary winding.

45. The power supply of claim 44, wherein each of said main switching elements consists of a MOSFET and said inversely parallel connected rectifier elements consist of parasitic diodes inside each of said MOSFETS.

46. The power supply device of claim 44, wherein each of said main switching elements consists of an IGBT.

47. The power supply of claim 44, wherein said main rectification and smoothing circuit comprises:

A phase and B phase main rectifier elements for rectifying a voltage induced in said A phase and B phase main secondary windings; and a choke coil in which current rectified by said A phase and B phase main rectifier elements flows.

48. The power supply of claim 32, wherein each of said main switching elements consists of a MOSFET and said inversely parallel connected rectifier elements consist of parasitic diodes inside each of said MOSFETS.

49. The power supply device of claim 32, wherein each of said main switching elements consists of an IGBT.

50. The power supply of claim 32, wherein said main rectification and smoothing circuit comprises:

A phase and B phase main rectifier elements for rectifying a voltage induced in said A phase and B phase main secondary windings; and a choke coil in which current rectified by said A phase and B phase main rectifier elements flows.

* * * * *